US011027961B2

(12) United States Patent
Showalter

(10) Patent No.: US 11,027,961 B2
(45) Date of Patent: Jun. 8, 2021

(54) APPARATUS, SYSTEMS AND METHODS FOR DISPENSING DRINKS, FOOD, AND OTHER LIQUIDS

(71) Applicant: Edward Showalter, Los Angeles, CA (US)

(72) Inventor: Edward Showalter, Los Angeles, CA (US)

(*) Notice: Subject to any disclaimer, the term of this patent is extended or adjusted under 35 U.S.C. 154(b) by 0 days.

(21) Appl. No.: 16/846,176

(22) Filed: Apr. 10, 2020

(65) Prior Publication Data
US 2021/0094814 A1 Apr. 1, 2021

Related U.S. Application Data

(60) Continuation-in-part of application No. 16/355,508, filed on Mar. 15, 2019, now Pat. No. 10,647,564, (Continued)

(51) Int. Cl.
*B01D 35/02* (2006.01)
*B01D 35/30* (2006.01)
(Continued)

(52) U.S. Cl.
CPC .......... *B67D 1/0804* (2013.01); *A47J 31/407* (2013.01); *A47J 31/46* (2013.01); *B01D 35/027* (2013.01);
(Continued)

(58) Field of Classification Search
CPC .. B67D 1/0804; B67D 1/0001; B67D 1/0004; B67D 1/0005; B67D 1/0021; B67D 1/0418; B67D 1/0871; B67D 1/0425; B67D 1/0431; B67D 1/0462; B67D 1/0043; B67D 1/0858; B67D 1/0864; B67D 2001/0811;
(Continued)

(56) References Cited

U.S. PATENT DOCUMENTS 2,894,270 A 7/1959 Manthos
2,897,994 A * 8/1959 Foss .................. B65D 81/3211
220/4.27
(Continued)

FOREIGN PATENT DOCUMENTS

| CN | 201771434 | 3/2011 |
|---|---|---|
| GB | 2252963 | 8/1994 |
| JP | 3080422 | 9/2001 |

*Primary Examiner* — Joseph W Drodge
(74) *Attorney, Agent, or Firm* — CIONCA IP Law P.C.; Marin Cionca

(57) ABSTRACT

Systems for filling and dispensing free-flowing contents into and out of a container, the container comprising: a top and a bottom, a plurality of vertical walls extending between the bottom and the top, an ice portal disposed in the top, the ice portal having a removable cap for filling an ice chamber with ice, a removable container cap, a tube vertically disposed in the container cap, the tube extending between a beverage bag and a gate valve above the container cap, an air hose disposed in the container cap parallel with the tube, an air bag attached to a bottom end of the air hose, the air bag being adjacent to the beverage bag, such that a volume between the bags and an interior of the plurality of vertical walls is the ice chamber, and a beverage flow portal protruding longitudinally from a side of the gate valve.

22 Claims, 44 Drawing Sheets

Related U.S. Application Data which is a continuation of application No. 15/975,700, filed on May 9, 2018, now Pat. No. 10,259,699, which is a division of application No. 15/607,395, filed on May 26, 2017, now Pat. No. 9,994,437, which is a continuation-in-part of application No. 14/586,741, filed on Dec. 30, 2014, now Pat. No. 10,040,042, and a continuation-in-part of application No. 14/586,782, filed on Dec. 30, 2014, now Pat. No. 10,647,563.

(51) Int. Cl.

| | |
|---|---|
| *A47J 31/40* | (2006.01) |
| *A47J 31/46* | (2006.01) |
| *B01F 3/04* | (2006.01) |
| *B01F 7/20* | (2006.01) |
| *B01F 15/02* | (2006.01) |
| *B67D 1/04* | (2006.01) |
| *B67D 1/08* | (2006.01) |
| *B67D 1/10* | (2006.01) |
| *B67D 1/12* | (2006.01) |
| *B01F 7/00* | (2006.01) |
| *B01F 15/00* | (2006.01) |
| *B67D 1/00* | (2006.01) |
| *B01D 35/027* | (2006.01) |

(52) U.S. Cl.
CPC .......... *B01D 35/30* (2013.01); *B01F 3/04794* (2013.01); *B01F 7/0025* (2013.01); *B01F 7/20* (2013.01); *B01F 15/00538* (2013.01); *B01F 15/00837* (2013.01); *B01F 15/0212* (2013.01); *B67D 1/0001* (2013.01); *B67D 1/0004* (2013.01); *B67D 1/0005* (2013.01); *B67D 1/0021* (2013.01); *B67D 1/0043* (2013.01); *B67D 1/0418* (2013.01); *B67D 1/0425* (2013.01); *B67D 1/0431* (2013.01); *B67D 1/0462* (2013.01); *B67D 1/0858* (2013.01); *B67D 1/0864* (2013.01); *B67D 1/0871* (2013.01); *B01F 2215/007* (2013.01); *B01F 2215/0022* (2013.01); *B01F 2215/0068* (2013.01); *B67D 1/0057* (2013.01); *B67D 1/0078* (2013.01); *B67D 1/0809* (2013.01); *B67D 1/0829* (2013.01); *B67D 1/0841* (2013.01); *B67D 1/0888* (2013.01); *B67D 1/10* (2013.01); *B67D 1/125* (2013.01); *B67D 1/1252* (2013.01); *B67D 2001/0097* (2013.01); *B67D 2001/0098* (2013.01); *B67D 2001/0811* (2013.01); *B67D 2001/0821* (2013.01); *B67D 2001/0827* (2013.01); *B67D 2001/0828* (2013.01)

(58) Field of Classification Search
CPC .. B67D 1/0057; B67D 1/0809; B67D 1/0829; B67D 1/10; B67D 1/125; B67D 1/1252; B67D 2001/0097; B67D 2001/0098; B67D 1/0078; B67D 2001/0821; 2001/0828; B67D 1/0841; B67D 2001/0827; B67D 1/0888; B67D 1/00; B67D 1/0042; B67D 1/0406; B67D 1/1858; B67D 1/0827; B67D 1/0828; A47J 31/46; A47J 31/407; A47J 31/4403; A47J 31/4492; B01F 3/04794; B01F 7/0025; B01F 15/00538; B01F 15/0212; B01F 7/20; B01F 15/00837; B01F 2215/0068; B01F 2215/007; B01F 2215/0022; B65D 35/14; B65D 35/20; B65D 35/24; B65D 35/242; B65D 35/28; B65D 35/285; B65D 35/44; B65D 69/00; F16L 21/00; F16L 21/08; B01D 35/02; B01D 35/027; B01D 35/0273; B01D 35/0276; B01D 35/30; B01D 2201/30; B01D 2201/301
USPC .... 366/101, 102, 279, 292, 293, 314, 325.1, 366/325.94; 222/95, 96, 153.01, 153.05, 222/226, 236, 239, 240, 241, 251, 335, 3, 222/94, 396, 397, 408.5, 511, 512, 516; 285/119, 399; 220/560.03
See application file for complete search history.

(56) References Cited

U.S. PATENT DOCUMENTS

| | | | |
|---|---|---|---|
| 2,944,616 A | 7/1960 | Bernard | |
| 3,083,875 A * | 4/1963 | Welty | B05B 9/0838 222/95 |
| 3,377,766 A * | 4/1968 | Nelson | B65D 83/0055 53/449 |
| 3,441,952 A | 4/1969 | Strader | |
| 3,530,800 A | 9/1970 | Watkins | |
| 3,752,362 A | 8/1973 | Risener | |
| 3,874,314 A | 4/1975 | Sanders | |
| 3,964,636 A | 6/1976 | Rehrig | |
| 4,149,556 A * | 4/1979 | Schwabe | A61M 16/0051 128/202.22 |
| 4,440,319 A | 4/1984 | Nitchman | |
| 4,722,001 A | 1/1988 | Rohrich | |
| 4,955,512 A * | 9/1990 | Sharples | B65D 83/0061 222/212 |
| 5,152,244 A | 10/1992 | Jarmillo | |
| 5,320,255 A * | 6/1994 | Stoffel | B65D 83/38 222/212 |
| 5,358,142 A * | 10/1994 | Holmes | B62J 9/22 222/1 |
| 5,499,758 A * | 3/1996 | McCann | B67D 1/045 222/386.5 |
| 5,690,976 A * | 11/1997 | Nakayama | A23G 9/08 426/515 |
| 5,772,665 A * | 6/1998 | Glad | A61M 5/284 604/82 |
| 6,112,504 A * | 9/2000 | McGregor | B65B 39/00 141/10 |
| D458,320 S | 6/2002 | Domingues | |
| 7,111,442 B1 * | 9/2006 | Van Baal | B65D 77/06 53/473 |
| 9,220,334 B1 * | 12/2015 | Dodgen | A45F 3/20 |
| 9,994,437 B2 * | 6/2018 | Showalter | B67D 1/0004 |
| 1,004,042 A1 | 8/2018 | Showalter | |
| 10,040,042 B2 * | 8/2018 | Showalter | B01F 15/00538 |
| 10,259,699 B2 * | 4/2019 | Showalter | B01F 3/04794 |
| 10,647,563 B2 * | 5/2020 | Showalter | B67D 1/00 |
| 10,647,564 B2 * | 5/2020 | Showalter | B01F 15/0212 |
| 2008/0050211 A1 | 2/2008 | Showalter | |
| 2008/0203105 A1 * | 8/2008 | Trotman | B65D 75/525 220/737 |
| 2010/0102086 A1 * | 4/2010 | Rabinovitch | B65D 55/10 222/105 |
| 2010/0252583 A1 | 10/2010 | Maas | |
| 2012/0031142 A1 * | 2/2012 | Marton | A61F 7/02 62/530 |
| 2012/0137637 A1 * | 6/2012 | Gillis | B65D 81/3897 53/468 |
| 2012/0187153 A1 * | 7/2012 | Burge | B67D 1/0462 222/386.5 |
| 2012/0217265 A1 | 8/2012 | Edwards | |
| 2012/0291627 A1 * | 11/2012 | Tom | F17C 1/00 95/8 |
| 2013/0105015 A1 * | 5/2013 | Deo | F16L 29/002 137/798 |
| 2016/0183715 A1 | 6/2016 | Showalter | |
| 2016/0185586 A1 | 6/2016 | Showalter | |

\* cited by examiner

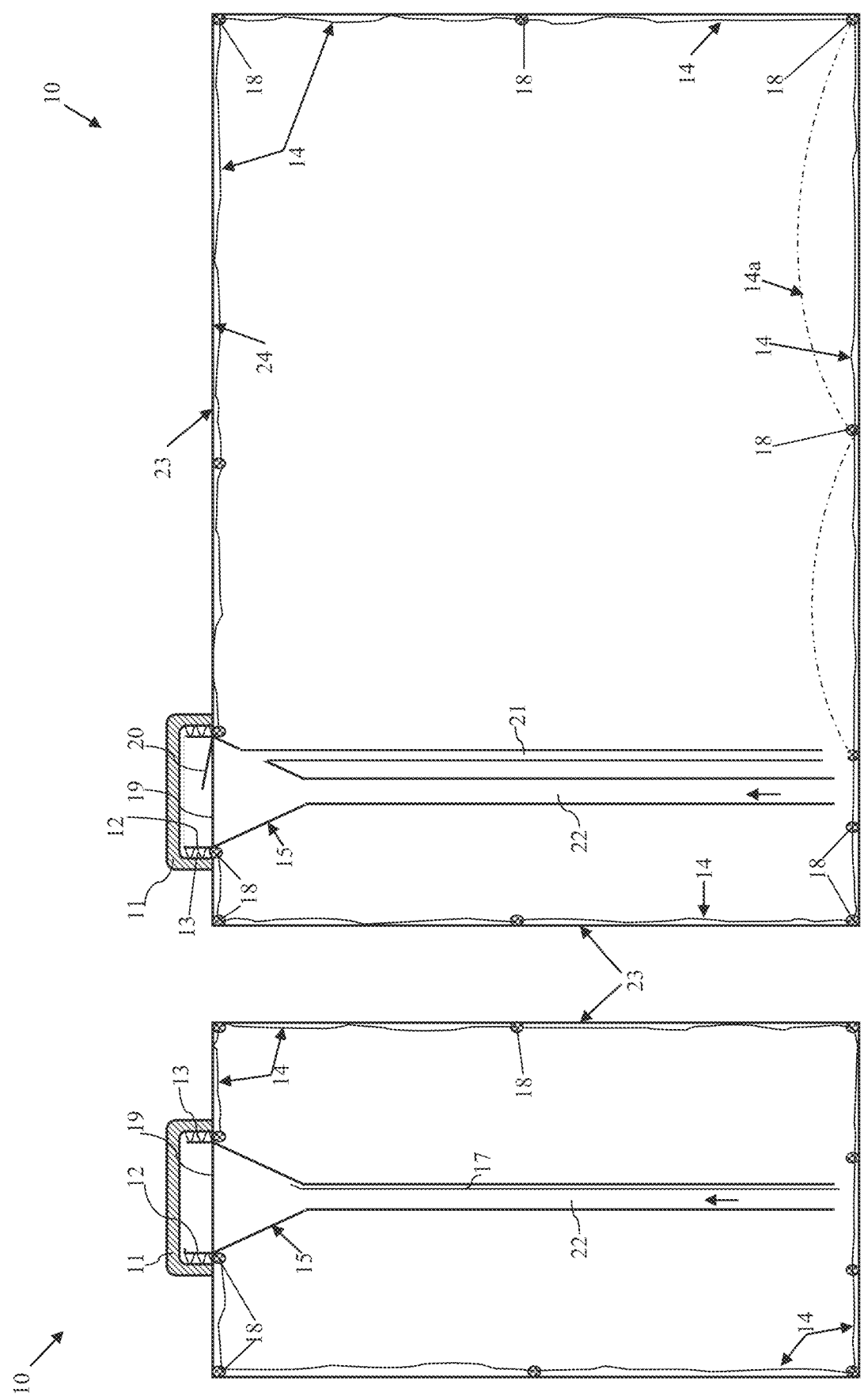

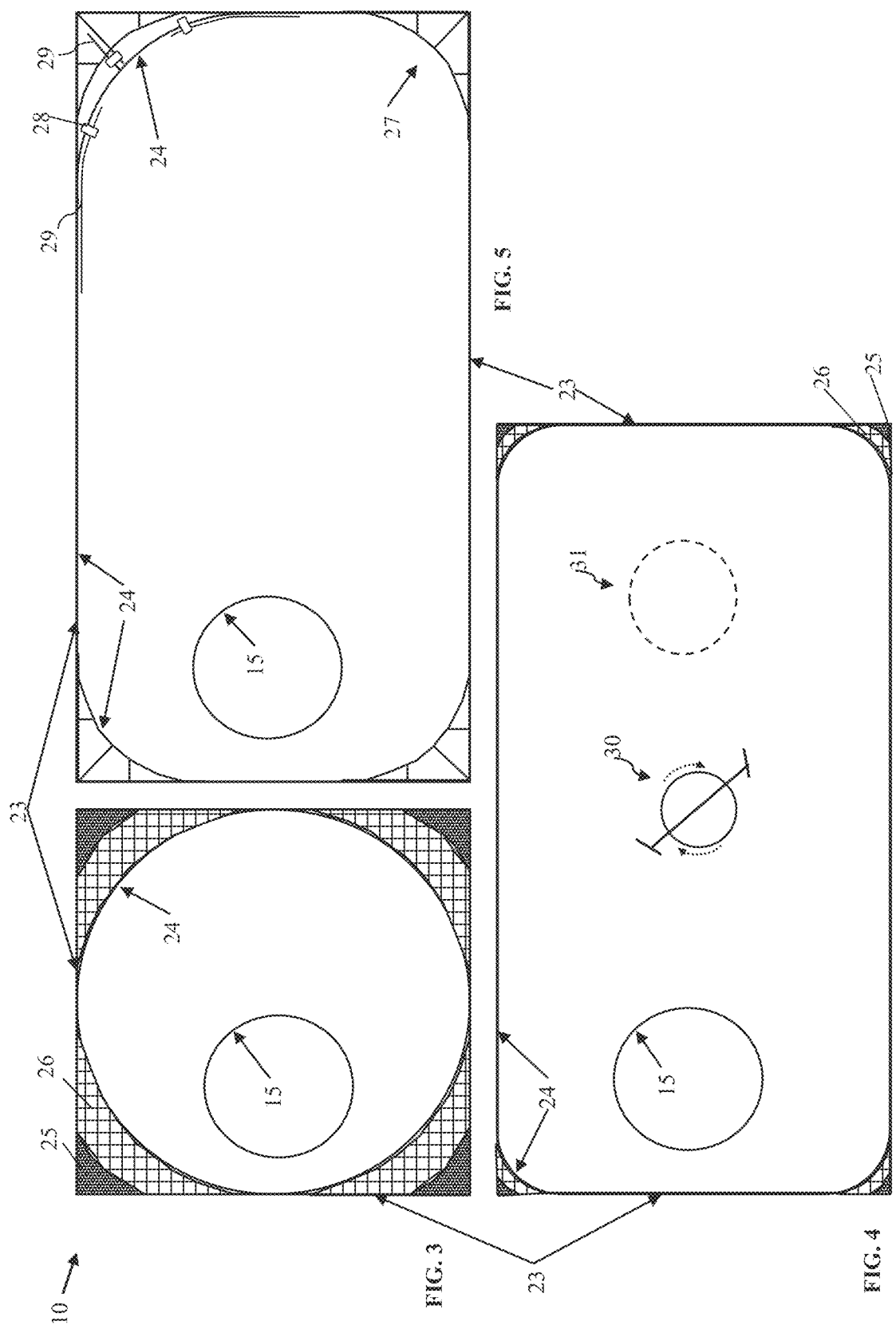

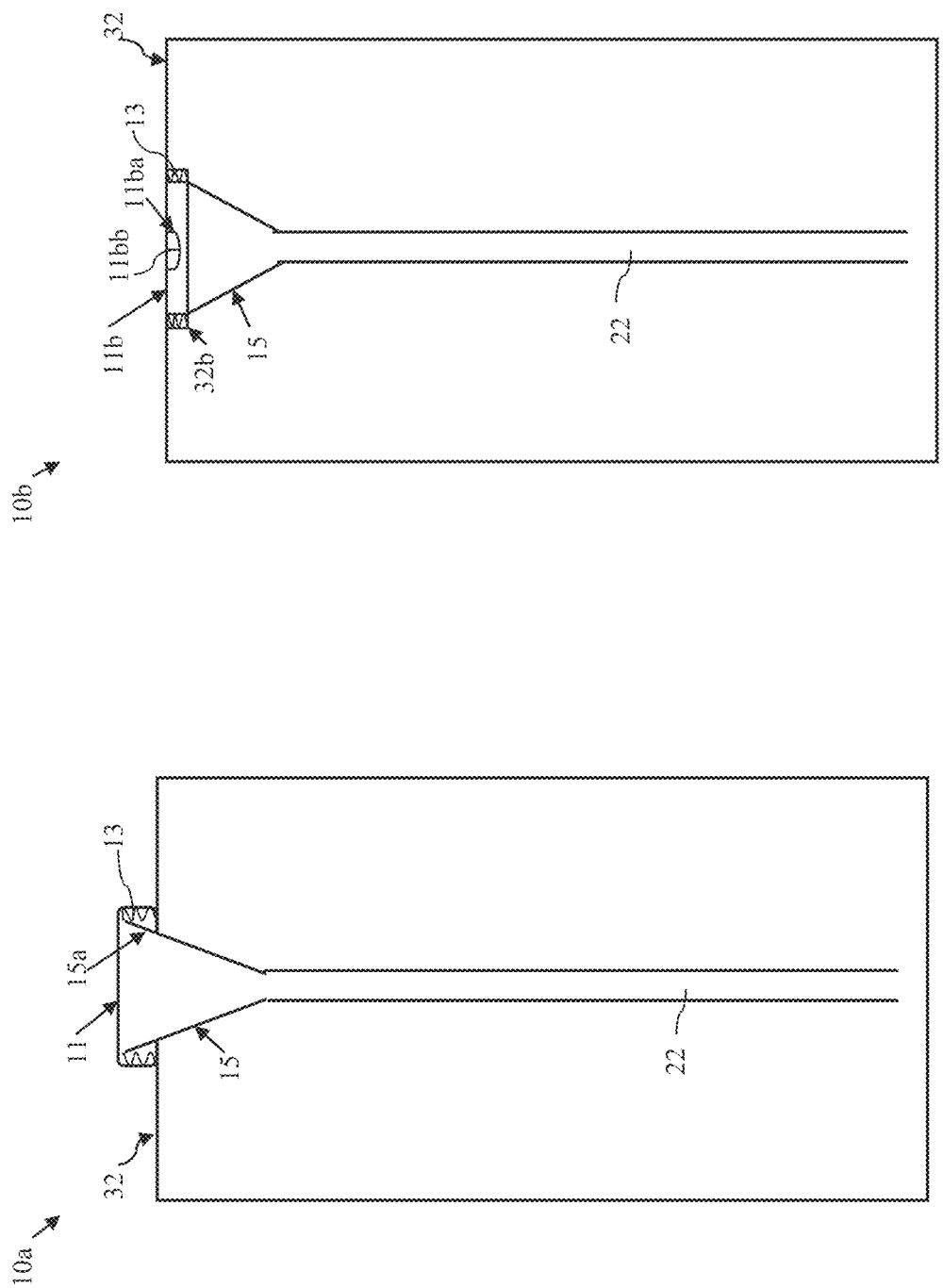

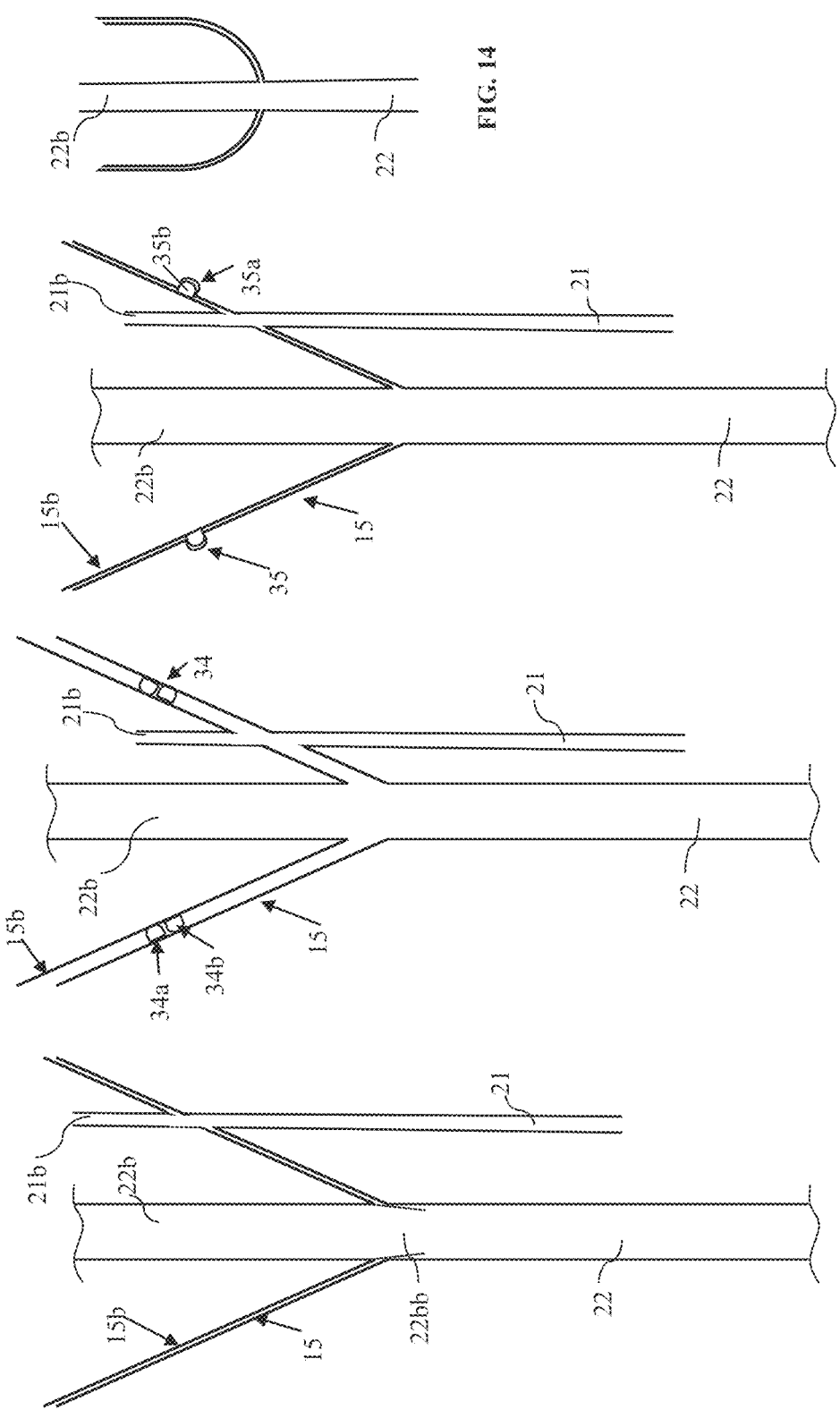

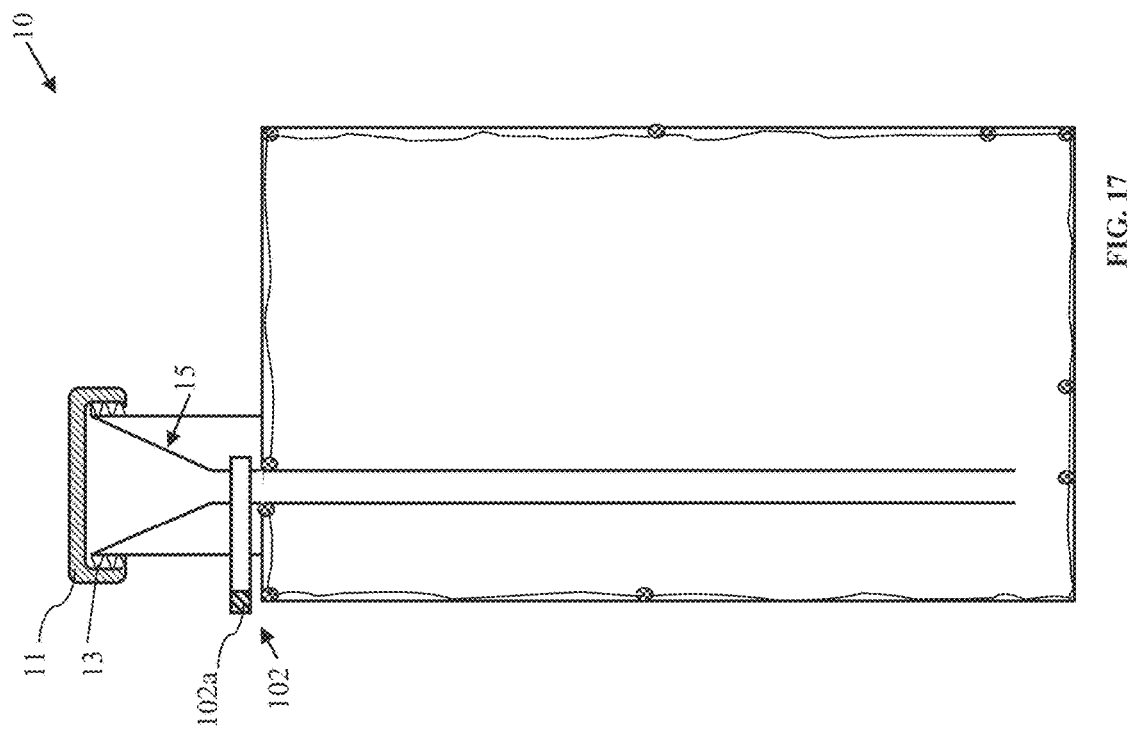
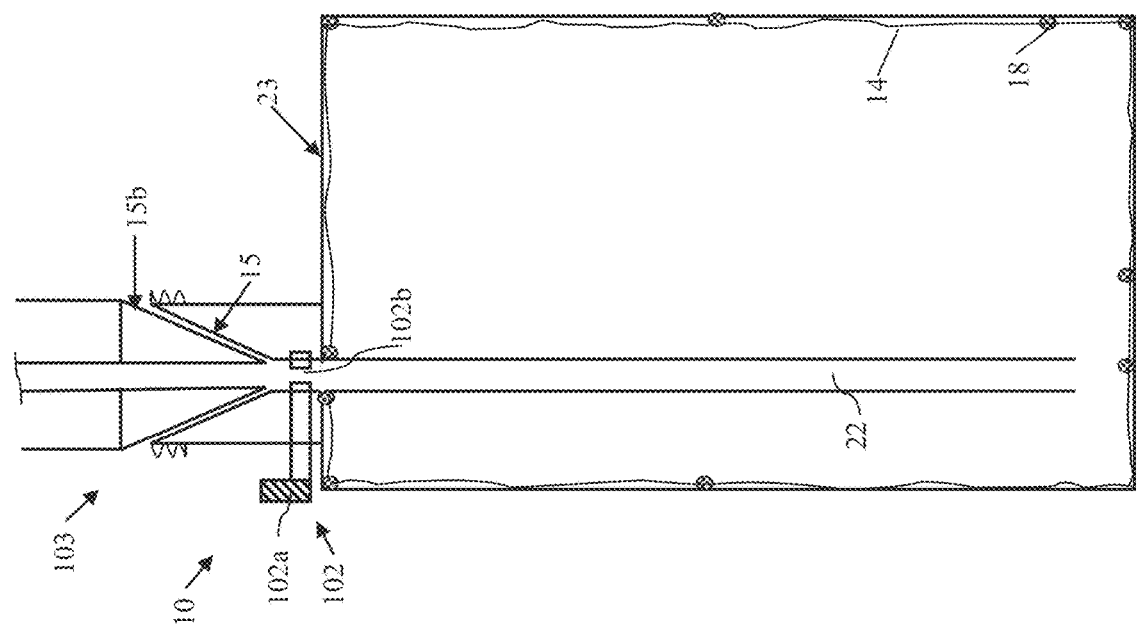

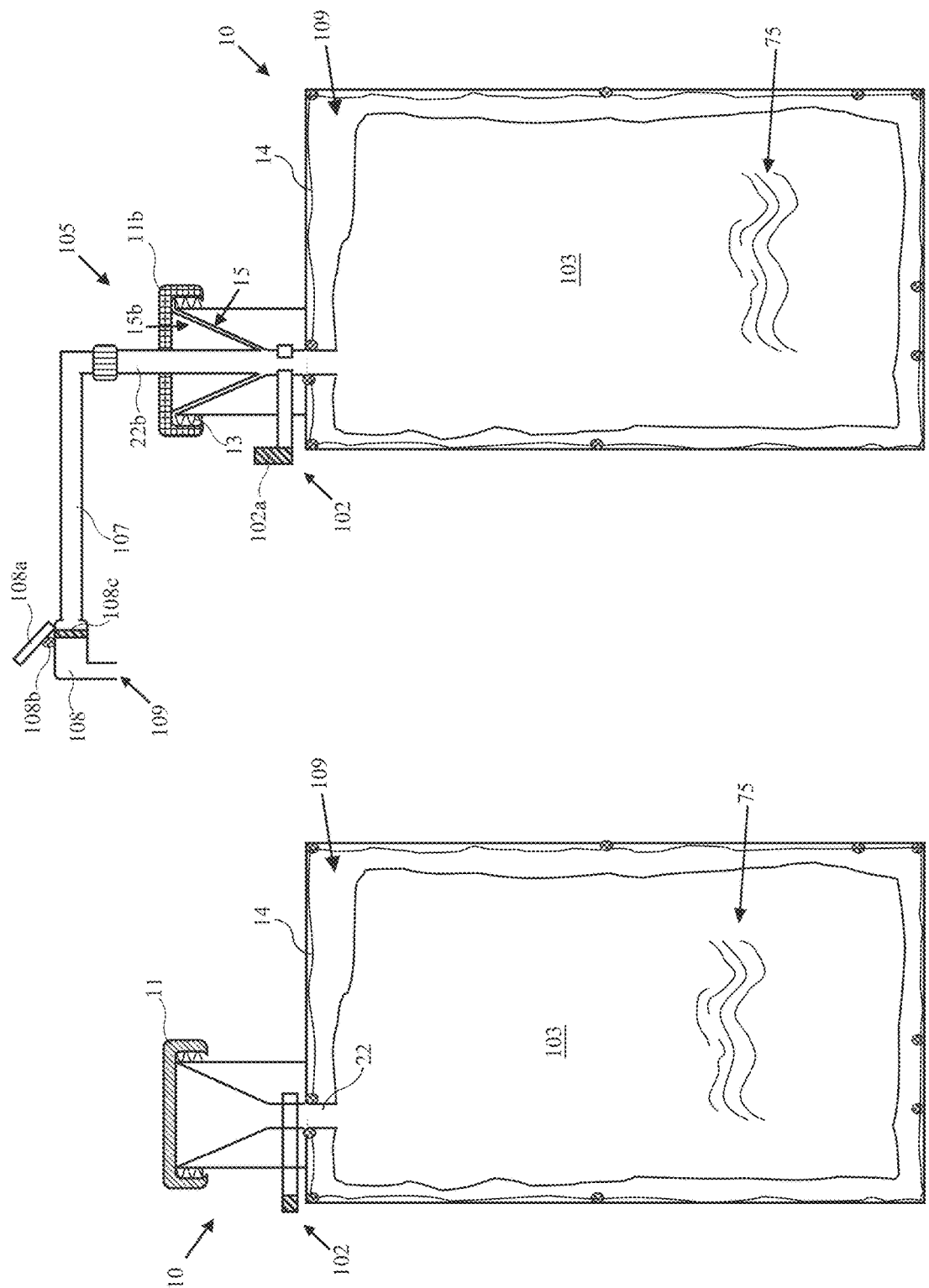

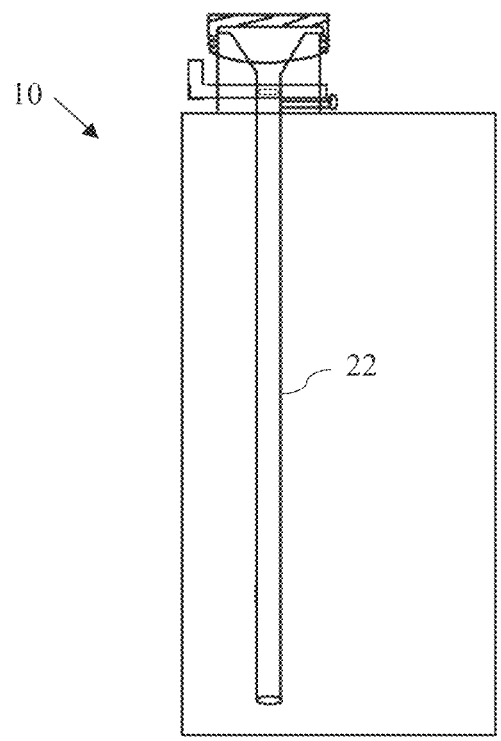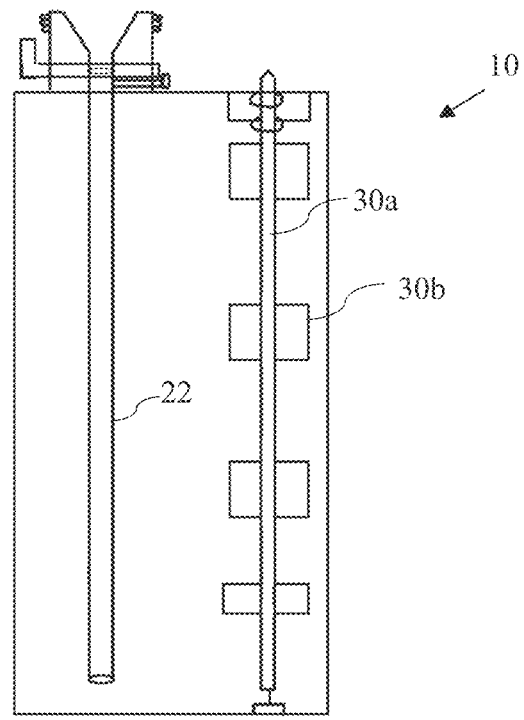
FIG. 22A  FIG. 22B
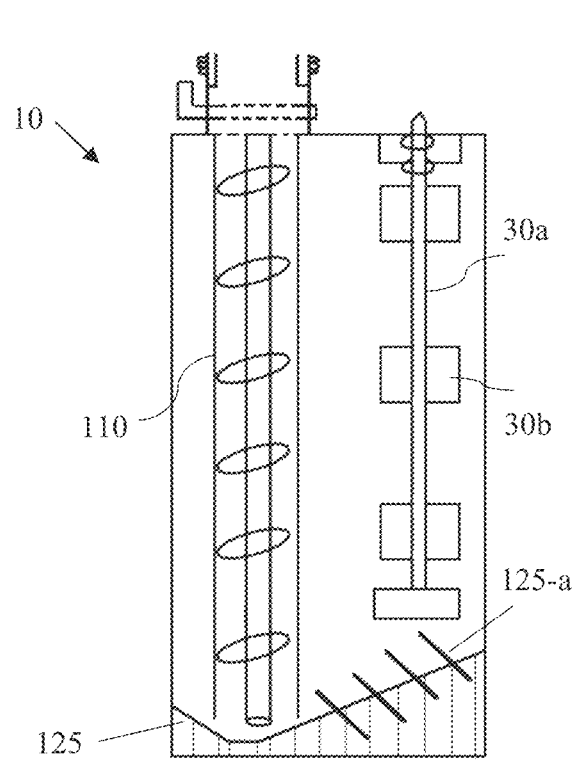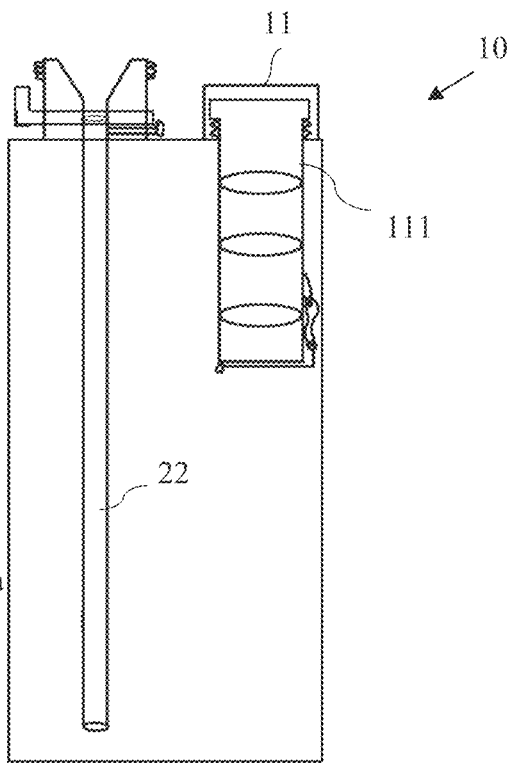
FIG. 22C  FIG. 22D

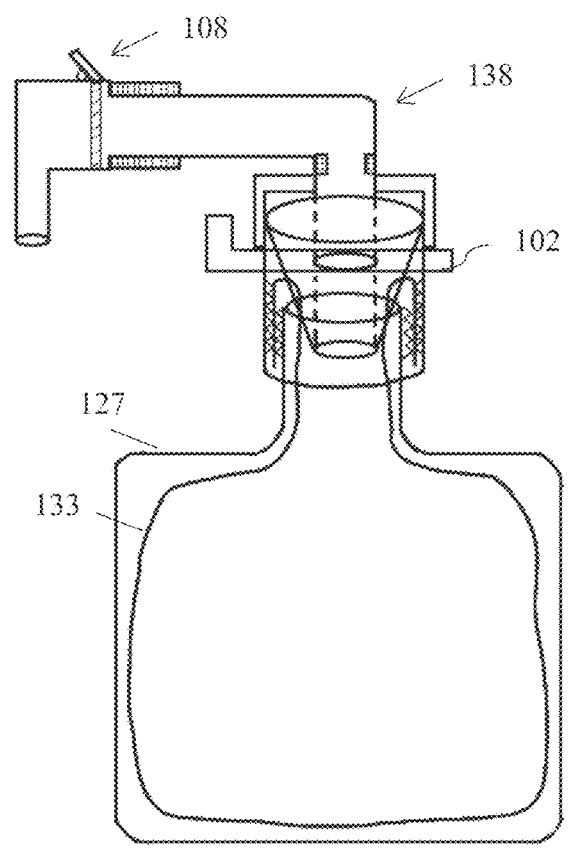
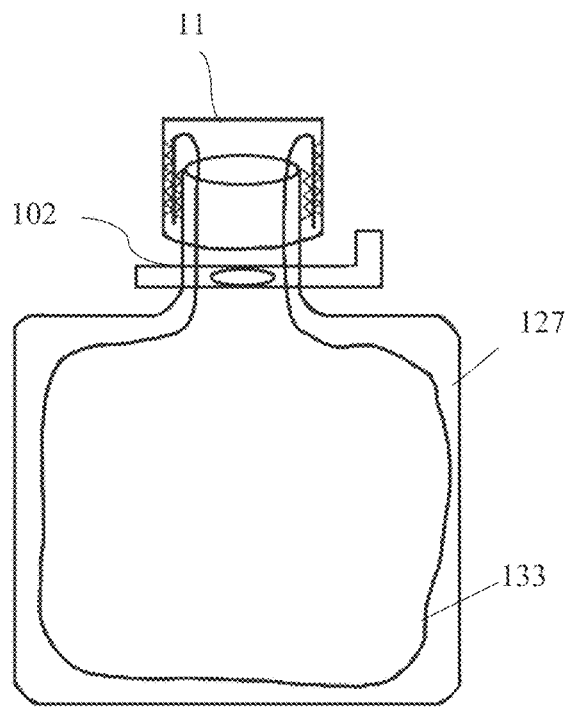
FIG. 32A
FIG. 32B
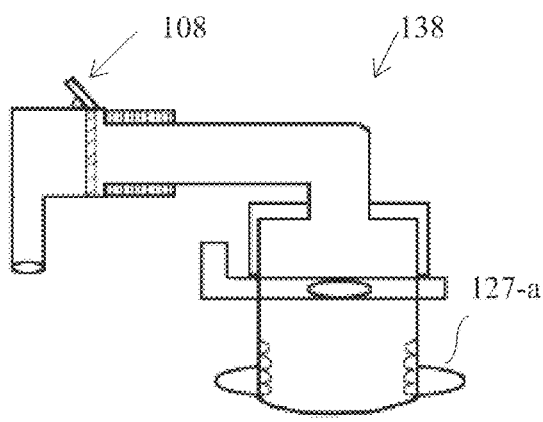
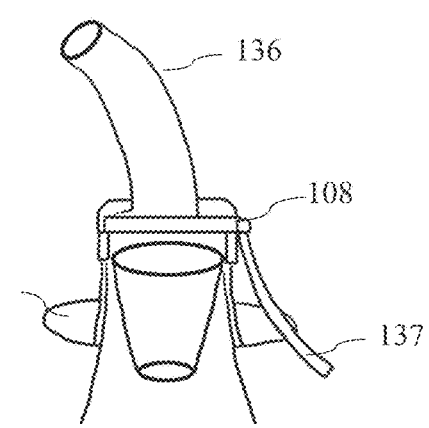
FIG. 32C
FIG. 32D

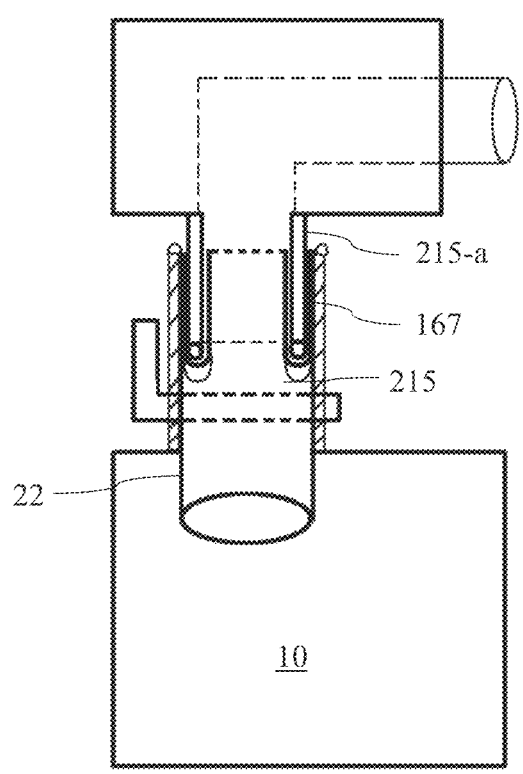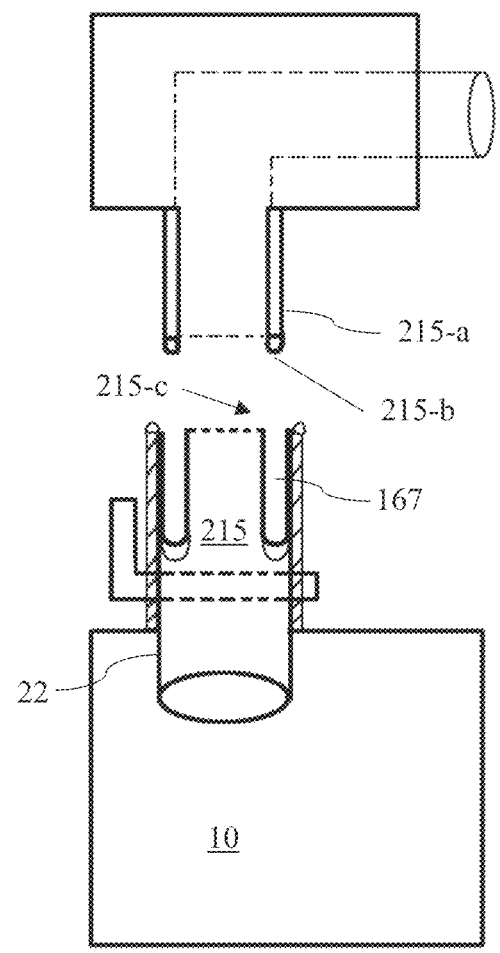
FIG. 33A
FIG. 33B

APPARATUS, SYSTEMS AND METHODS FOR DISPENSING DRINKS, FOOD, AND OTHER LIQUIDS

CROSS-REFERENCE TO RELATED APPLICATIONS

This application is a continuation-in-part of and claims the benefit of U.S. Non-Provisional application Ser. No. 16/355,508, filed on Mar. 15, 2019, which is a continuation of U.S. Non-Provisional application Ser. No. 15/975,700, filed on May 9, 2018, which is a divisional of U.S. Non-Provisional application Ser. No. 15/607,395, filed on May 26, 2017, which is a continuation-in-part of U.S. Non-Provisional application Ser. No. 14/586,741, filed on Dec. 30, 2014, and a continuation-in-part of U.S. Non-Provisional application Ser. No. 14/586,782, filed on Dec. 30, 2014, which are hereby incorporated by reference, to the extent that they are not conflicting with the present application.

BACKGROUND OF THE INVENTION

1. Field of the Invention

The invention relates generally to apparatuses, systems and methods for making and dispensing liquids and more particularly to apparatuses, systems and methods for making and dispensing drinks and soft serve foods (e.g., soup, yogurt, etc.).

2. Description of the Related Art

There are several apparatuses, systems and methods for making and dispensing drinks available on the market today. However, they have several limitations. For example, some must use ice to chill the beverages as they are not equipped with refrigeration systems to cool the beverages and/or keep them at a set or selected temperature. Others cannot brew hot beverages. Others can't mix beverages. Likewise, other beverage dispensers can't dispense both hot and chilled beverage from same spout. To accommodate all beverages, users might have to purchase four, five, six, seven, eight or more dispensers. That can be very expensive and also very inconvenient, to, for example, store all of those dispensers.

Some require steel kegs that need to be returned for washing and refilling. Large amounts of dollars are spent with water waste, carbon footprint and transportation. Because of high transportation costs, it is typically cost prohibitive for a beer brewery to ship draft beer from one location to around the world. The same can be true for wineries using wine steel and/or plastic kegs.

The global beverage industry can have a negative environmental impact. For example, many consumers do not separate materials before putting them into a recycling bin, rendering it costly to separate at the recycler. The result is that these materials may possibly be unrecyclable.

Thus, there is a need for new and improved apparatuses, systems and methods for making and dispensing drinks that solve the problems described above, by giving the user the versatility, convenience and the efficiency the user needs, while enabling the user to be environmentally responsible, by providing a one-size-fits-all, all-in-one beverage dispensing system that is eco-friendly. That way, the user only needs one apparatus to dispense any beverage.

There is also a need for easily recyclable beverage and food packaging, allowing the user to dispose of the package in single-stream recycling without the need to separate materials.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one exemplary embodiment, a V-friction coupling is provided that establishes airtight seal that allows beverage pumps to pump the beverage or food and that also prevents air contamination or spoilage of beverage in the provided beverage container or keg. The airtight seal also stops beverage spoilage by oxidation or beverage to go flat in taste. Further, it may prolong the life of beverage in some cases, like in the case of wine, beer or soda. Another advantage is that the same beverage pour spout of the provided dispensers may be operated with hot or chilled, carbonated or non-carbonated beverage.

In another exemplary embodiment, the beverage container is a disposable, one-way container, made of biodegradable materials. Among other advantages, this provides the advantage of lower shipping cost due to less weight of packaging.

In another exemplary embodiment, the container is provided with a cooling chamber for dispensing iced beverages or food from a beverage bag. The container may be adapted to allow beverages and/or food to be dispensed into the beverage bag or out of the beverage bag. The cooling chamber may prevent ice within the chamber from being exposed to ambient air, which slows the melting of the ice. Thus, an advantage may be that the beverage or food within the container may be chilled for longer periods of time. The container may also be provided with an air bag to allow the beverage or food within the beverage bag to be dispensed without the need for any electrically powered means. Thus, another advantage is that the container may be portable and can mechanically dispense beverages or food in any setting and without the need for electrical power.

In another exemplary embodiment, the container is provided with an attachable filling assembly having a threaded coupling attached to a flexible hose and a friction V-shaped coupling adapted to connect to a beverage tap. The attachable filling assembly is removably associated with the container, such that beverages from an external tap may be dispensed into the container via the threaded coupling and the filling hose. Thus, an advantage is that the container may be filled with beverage or food without the need to remove a lid from the container, preventing ambient air from entering the container.

In another exemplary embodiment, the container is provided with an attachable dispensing assembly having a threaded coupling attached to a flexible hose and a pour spout adapted to controllably dispense liquid. The attachable dispensing assembly is removably associated with the container, such that beverage or food within the container may be controllably dispensed into an external cup, bottle, bioplastic bag or other container. Thus, an advantage is that beverage and/or food within the container may be easily and controllably dispensed into any sized bottle or container.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIG. 1 illustrates a front sectional view of a drink container, according to an aspect.

FIG. 2 illustrates a side sectional view of the drink container from FIG. 1, according to an aspect.

FIGS. 3-5 illustrate top sectional views of the drink container from FIG. 1, depicting certain aspects, according to several embodiments.

FIGS. 8-9 illustrate front sectional views of alternative embodiments of a drink container.

FIGS. 11-14 illustrate sectional views of male-female couplings, according to several embodiments.

FIG. 16 illustrates a side sectional view of a drink container during filling at factory, according to an aspect.

FIG. 17 illustrates a side sectional view of the drink container from FIG. 16 ready for shipping, according to an aspect.

FIG. 20 illustrates a side sectional view of a drink container, ready for shipping or storage, according to another embodiment.

FIG. 21 illustrates a side sectional view of the drink container from FIG. 20, in use, according to an aspect.

FIGS. 22A-22D illustrate side sectional views of four examples of a drink container, having parts such as a water filter, mixing paddles, sloped floor, and an auger lift, according to an aspect.

FIG. 32A illustrates a side view of a bottle fitted with a bio-plastic gate valve pour spout with a manually operated nozzle, according to an aspect.

FIG. 32B illustrates a bottle with a bio-plastic screw-on top that may be used with a bottle for storing or shipping, according to an aspect.

FIG. 32C illustrates a male friction coupling pour spout, which may be V-shaped or cylindrical, having a gate valve, which may include a petcock valve, and finger pull tabs, according to an aspect.

FIG. 32D illustrates an airtight seal bottle cap and pour spout that may be used with any existing bottle, such as, for example, a wine, champagne, or water bottle, according to an aspect.

FIGS. 33A-33B illustrate side views of a cylindrical friction coupling in a coupled state and uncoupled state, respectively, that may be used with a keg, according to an aspect.

DETAILED DESCRIPTION

Figure 7:
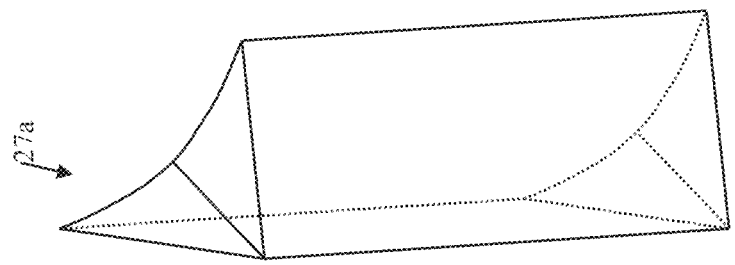
FIG. 7 illustrates a fixed, non-adjustable corner brace for the drink container from FIG. 1, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

For the following description, it can be assumed that most correspondingly labeled elements across the figures possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates a front sectional view of a drink container, according to an aspect. FIG. 2 illustrates a side sectional view of the drink container from FIG. 1, according to an aspect. It should be understood that while the container 10 will be described herein as a drink container, its uses may be expanded to other liquids (e.g., cooking oil, motor oil), pastes or viscous materials (e.g., liquid soap, ketchup), or soft serve foods (e.g., soups, smoothies, ice cream, yogurt, etc.) to take advantage of its unique features, such as the V-coupling. As shown, the drink container 10 may be a rectangular box or keg having an exterior surface 23 and an interior surface 24. The drink container 10 may also be square. The drink container 10 may be made from biodegradable cardboard or recyclable plastic that is strong enough to maintain the container's shape. It should be understood that the container 10 and all other components described herein may be made from biodegradable materials. The drink container 10 may have a spout 12, which, after filling the container with the drink, is preferably airtight sealed by a foil seal 19. The foil seal 19 may be removed by a user by pulling on the seal tab 20. On the outside, the spout 12 may have threads 13 corresponding with the threads of a cap 11, such that to allow a user to fasten the cap 11 onto the spout 12 or to remove it when necessary.

The container 10 further includes a V-shaped female coupling 15 made of hard plastic for example, which communicates at its upper end with the spout 12 and at its lower end with a beverage well tube 22. As it will be described in more details later in this disclosure, the V-shape (e.g., funnel shape) female coupling 15 is configured to receive a corresponding V-shape male coupling 15b (see FIG. 11 for example) to quickly create a friction air tight seal under the influence of a weight load applied to the V-shape male coupling.

A plastic liner bag 14, preferably biodegradable, is also preferably provided to receive and hold the drink (e.g., wine) stored in container 10. As shown, the plastic liner bag 14 is preferably fastened, using glue for example, to the interior wall 24 of the container 10 at several fastening locations 18, including the corners of the container 10. During the removal (e.g., pumping it out by suction) of the liquid/drink from box 10, the liner bag 14 may have the tendency to move away from the interior wall 24 of container 10, as shown at 14a. Thus, without the fastening points 18, the liner bag 14 may clog the well tube 22. The clogging of the well tube 22 is prevented by the fastening points 18, and as such, the drink is able to flow easily through the well tube 22 out of container 10.

As shown, the container 10 may be equipped with a beverage level sensor strip 17, which may assist a user in knowing the level of beverage remaining in the container 10 during use and/or alert the user to acquire a new/filled container. Furthermore, the container 10 may be also equipped with a container $CO_2$ line 21 for use with carbonated beverages. The operation and functions of these two features of the container 10 will also be described in more details later in this disclosure.

The container 10 may be used as a mini keg ranging in size from, for example, ½ gallons to 2.5 gallons, or 6 or 10 gallons, or it may be used as larger kegs. The container 10 may be, for example, 4-inch-wide, 12-inch-long and 8 inch high.

Figure 6:
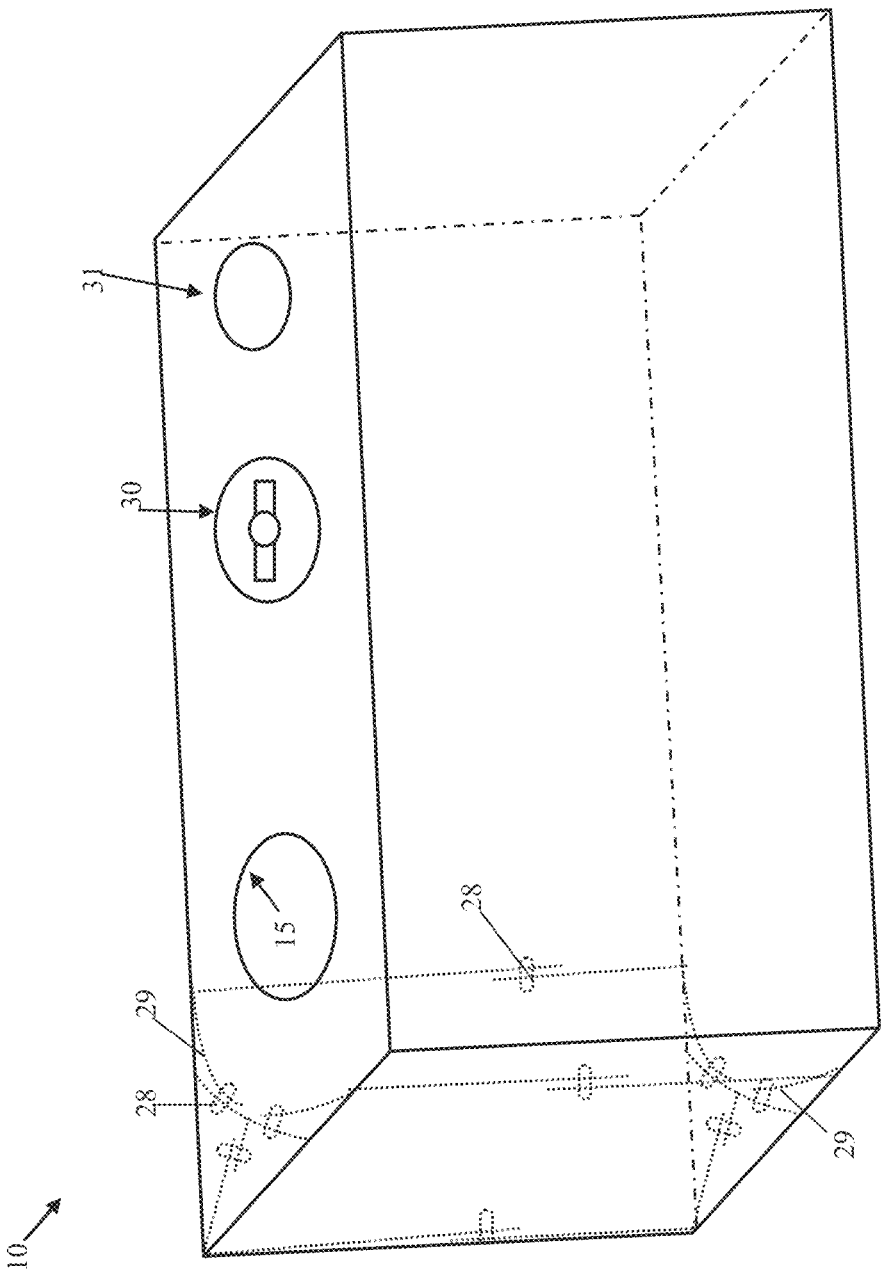
FIG. 6 illustrates a top-side perspective view of the drink container from FIG. 1, depicting certain aspects, according to several embodiments.

FIGS. 3-5 illustrate top sectional views of the drink container from FIG. 1, depicting certain aspects, according to several embodiments. FIG. 6 illustrates a top-side perspective view of the drink container from FIG. 1, depicting certain aspects, according to several embodiments. FIG. 7 illustrates a fixed, non-adjustable corner brace for the drink container from FIG. 1, according to an aspect. The corner brace may also be provided in an adjustable form and may fit into different sizes of containers. It is known that $CO_2$ (carbon dioxide) and other gases, such as compressed air are typically stored/packaged in cartridges or canister cylinders or the like, so that gas is evenly distributed on the wall of packaging. This is why cylinder shapes of gas containers are typically used, to obtain and maintain equal wall PSI. Right angles in gas containers are typically avoided also because, for example, the gas can be trapped in right angle pockets. Round corners allow the gas to flow easily out of the container.

Thus, when the container 10 is intended to be used for example for carbonated drinks, it may be constructed with fixed or adjustable interior curved corners (see FIGS. 3-7) that are reinforced to hold for example up to 35 PSI. This creates a cylinder effect inside the container/box/keg 10. Thus, the container 10 may be constructed with right angles on the outside, which may be useful for stacking and transportation purposes for example, and round corners on the inside to accommodate the equal distribution of the gas inside. In other words, the inside of the box 10 may be cylinder (see FIG. 3) or oblong (see FIGS. 4-5) shaped, depending on the configuration of the outer skeleton of the container (square, rectangular, etc).

To reinforce the corners of the container 10 and to obtain the round corners desired, plastic 25 and/or corrugated cardboard 26, or a combination thereof, preferably biodegradable, may be used to fill the corners as shown in FIGS. 3-4 and/or to construct fixed or adjustable braces. The fixed or adjustable corner braces may have solid walls made from plastic and/or cardboard, sample structures of which are shown in FIG. 5 at 27 and in FIG. 7 at 27a.

A container may be made with all corners having fixed corner braces 27, 27a, fastened (e.g., by glue) to them, to obtain inside the cylinder or oblong shape needed to protect the right-angle interior corners of the container from gas pressure. Thus, for example in FIG. 3, the exterior surface 23 of the container has a square shape while the interior surface 24 has a cylindrical shape.

Again, the corner braces may also be adjustable to accommodate various container sizes. To accomplish this, as shown for exemplification purposes in FIGS. 5-6, they may be constructed from a plurality of solid walls 29 made from plastic or cardboard that can slide with the aid of the sliding braces 28. The sliding braces 28 also keep the movable walls 29 in place after their sliding in or out. The adjustable corner braces offer the advantage of being capable of being used in different size boxes. Thus, a manufacturer would need only to manufacture a universal, one-size-fits-all adjustable corner brace. It should be observed also that container 10 having a rectangular (or square) shape on the outside and round corners on the inside has the advantage of having more interior volume than a container/box/keg that is round inside and outside (see FIG. 10). Thus, container 10 can carry more beverage than a container/box/keg that is round inside and outside. Further, the manufacturing costs are likely lower for container 10 than a container that is round inside and outside.

It should be noted that, when beverage or CO2, air, or gas is placed inside bladder 14, because of the interior box rounded corner construction, the plastic liner or bladder 14 takes the shape of a balloon which forms a cylinder-like beverage packaging similar to a traditional steel keg, plastic soda or beverage bottle, glass bottle, can, etc. The unique rounded and reinforced corners of the container 10 prevent collapse of the container's walls and corners.

At 30 a beverage mixer and at 31 an opening for adding ingredients to the drink inside container are depicted. Both elements will be described in detail later in this disclosure.

FIGS. 8-9 illustrate front sectional views of alternative embodiments of a drink container. The drink container 10a has the V-shape female coupling 15 extending out of the container, above the upper surface 32 of the container 10a. The thread element 13 for fastening cap 11 is provided as shown outside and around the portion 15a of the V-shape female coupling extending out of the container. This configuration may be advantageous for, for example, making it easier for the corresponding V-shape male coupling to slide into the V-shape female coupling 15, without the interference of spout 12 (FIG. 1).

The drink container 10b has a recess 32b, which has the thread element 13 on its vertical surface to enable the receipt and fastening of cap 11b for closing the container 10b. The cap 11b may have a concave portion 11ba divided by a separator 11bb to enable a user to screw/unscrew cap 11b. As shown, V-shape female coupling 15 extends upwards only to the bottom of recess 32b. This configuration may be advantageous for, for example, maximizing the space inside drink dispensers' chambers and for easy stacking of the containers during transportation or storage. This is facilitated by the fact that, as shown, the upper surface of cap 11b is even in this configuration with the upper surface 32 of the container.

It should be understood that the container's alternative embodiments depicted in FIGS. 8-9 are shown as examples only. Various other similar alternatives may be adopted without departing from the scope of the invention. What is important is the V-shape (e.g., funnel shape) female coupling 15, which is configured to receive a corresponding V-shape male coupling 15b (see FIG. 11 for example) to quickly create a friction air tight seal under the influence of a weight load applied to the V-shape male coupling.

Figure 10:
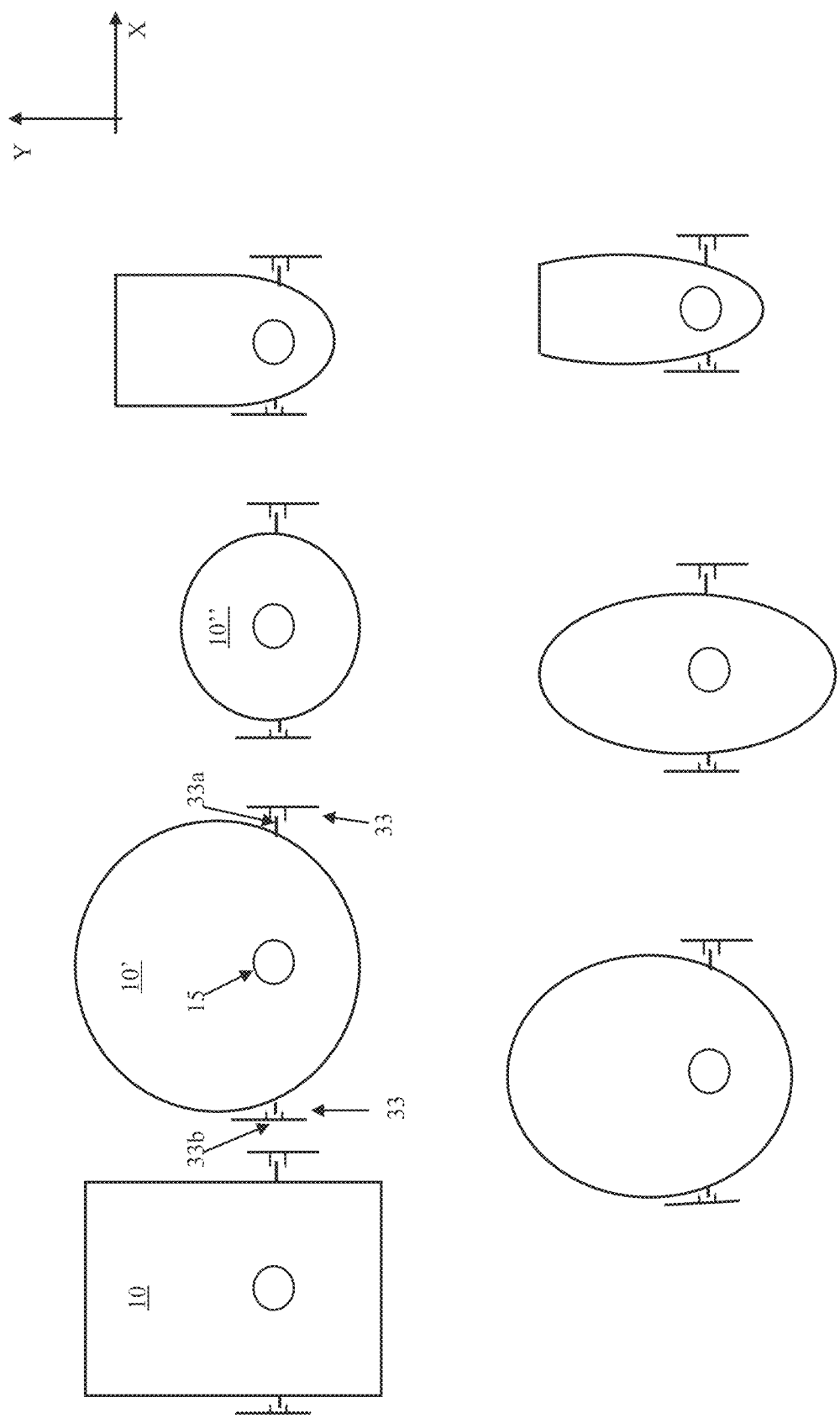
FIG. 10 illustrates top views of alternative embodiments of a drink container.

FIG. 10 illustrates top views of alternative embodiments of a drink container. As illustrated, the drink container may have various sizes and shapes, such as a rectangular (or square) box shape 10, a cylindrical shape 10' and 10" and other shapes as shown in FIG. 10 for exemplification purposes. A rectangular box may be adopted for example for a flat drink, while a container having round corners (e.g., a cylindrical container) may be adopted to carry carbonated drinks, to accommodate the pressurized gas inside as described earlier when referring to FIGS. 3-7. To accommodate for the variation in the drink container's sizes and shapes, while still ensuring proper alignment between the V-shape female coupling 15 of the container and the corresponding V-shape male coupling 15b (see FIG. 11 for example) of a drink dispenser, the container may be equipped with a guiding fin 33a to be received by a guiding slot 33b associated with the interior wall of the dispenser's chamber which receives the container. The guiding mechanism 33 including the guiding fin 33a and the guiding slot 33b ensures alignment of the V-shape couplings in a direction (Y), while the central location widthwise of the V-shape female coupling 15 in the container 10 ensures alignment in another, perpendicular direction (X). The combined effect is to ensure proper alignment between the female and male coupling.

FIGS. 11-14 illustrate sectional views of male-female couplings, according to several embodiments. In FIG. 11 the V-shape female 15 and male 15b coupling is depicted as earlier described when referring to the preceding figures. In FIG. 11, an alternative embodiment is depicted in which a ridge system 34 may be employed to create the seal between the male and female coupling. A ridge 34a may be present all around the interior surface of the V-shape female coupling 15, and similarly, ridge 34b may be present all around the exterior surface of the V-shape male coupling 15b. When the V-shape male coupling 15b descends into the V-shape female coupling 15, as shown, ridge 34b is preferably configured to pass ridge 34a, such that the two ridges sit next to each other, to create a seal. It should be noted also that the two ridges 34a-b are squeezed between the two couplings proportionally with the weight applied to the male coupling. This is because the V-shape (e.g., funnel) is narrower at the bottom. Thus, in this embodiment as well, the seal is stronger if more weight is applied to the male coupling 15b.

In FIG. 13, a channel 35a may be present all around the interior surface of the V-shape female coupling 15, and a ridge 35b may be present all around the exterior surface of the V-shape male coupling 15b. When the V-shape male coupling 15b descends into the V-shape female coupling 15, as shown, channel 35a is preferably configured to receive ridge 35b, to lock the couplings and create a seal in addition to the seal between the interior surface of the V-shape female coupling 15 and the exterior surface of the V-shape male coupling 15b. This embodiment may be preferred when for example the strength of the seal between the two couplings has to be controlled. The locking aspect of the channel-ridge system 35 makes that possible.

FIG. 14 is offered as an example to illustrate that the male-female friction coupling described herein may have other shapes, besides the V-shapes (e.g., funnel shape). For example, the male-female friction couplings may have a U-shape or bullet shape as shown in FIG. 14. Other shapes may be adopted, such as cylindrical shape, prism shape, and so on. An advantage of the V-shape is that it also aids to guide and center the V-shape male coupling 15b as it enters the V-shape female coupling 15. Further, the V-shape coupling lends itself to a tighter seal. In addition, when, for example, the male coupling's pipe 22b has a beveled lower end or is extended with a beveled nose 22bb (see FIG. 11), it can slide inside well tube 22 creating an even tighter seal, and thus allowing better suction for the pump 56.

Figure 15:
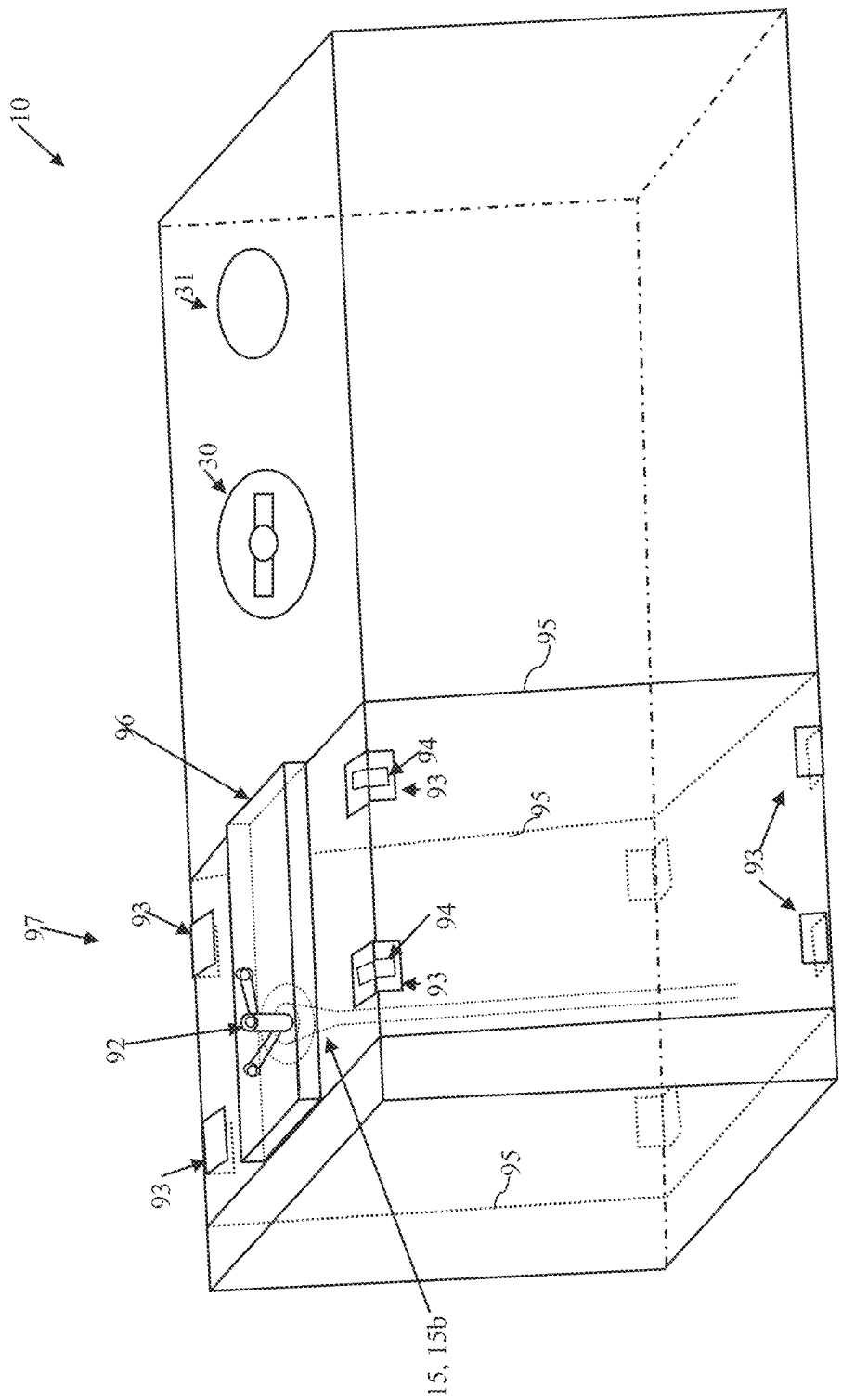
FIG. 15 illustrates the perspective view of a drink container equipped with a coupling adapter, according to an aspect.

FIG. 15 illustrates the perspective view of a drink container equipped with a coupling adapter, according to an aspect. The cost of a commercial size container/keg 10 as described herein, versus the cost of traditional stainless-steel kegs is significantly lower. This is because the container 10 is preferably made from biodegradable materials and as such is a one-way keg. There is no need to return the container/keg 10 to the drink manufacturer. Further, there is no need to or expense with washing the keg. The container 10 can simply and safely be discarded after use. Thus, besides making the container 10 work with a dispenser, there may be a need to make container 10 have the V-shape female coupling 15 and all of its other elements disclosed herein work also with traditional keg system tri-clove fitting used in the beer and wine industry today. This is simply because, for example, some users would not want to incur the expense associated with the replacement of their existing keg systems. For this purpose, a coupling adapter 97 may be provided, which can be configured to adapt to any existing keg systems, the uniqueness being the adapter's V-friction male coupling 15b, creating a friction seal with the V-friction female coupling 15 of container 10 as described earlier in this disclosure.

The coupling adapter 97, as shown in FIG. 15 may include a strap 95, made from stainless steel for example, and having hinges 93 on all four corners of container 10 and snap closed/open buckles 94 on one of the corners, to close/lock the strap 95. Preferably, eight hinges 93 total are provided. As shown, the coupling adapter 97 may include a traditional keg system coupling 92 (tri-clove) on top, so that existing line couplings can fasten into it. The traditional coupling 92 communicates preferably with a V-shape male coupling 15b placed underneath of strap 95 and secured by it after entering the V-shape female coupling 15 of container 10. A plate 96 may also be provided to provide depth and to reinforce the fastening of the traditional keg coupling 92 to the adapter strap 95. The corner hinges 93, snap closed/open buckles 94 and strap 95 create pressure on the underside V-shape male coupling 15b to create the friction seal with the V-shape female coupling 15 of the container 10.

FIG. 16 illustrates a side sectional view of a drink container during filling at factory, according to an aspect. It is well known that certain drinks such as wine are sensitive to air. For example, the taste of the drink may be negatively affected if air is allowed to mix with the drink. Further, air may contain chemical and/or biological elements that may contaminate the drink inside container 10. To prevent this, container 10 may be equipped with means that can be selectively engaged to prevent the air from entering container 10 and spoil the drink inside it. For example, container 10 may be equipped with a valve (e.g., a petcock valve) 102, which can close and open the well tube 22 of container 10.

As shown for exemplification purposes, if this approach is adopted, the well tube 22 may be extended above the upper surface 23 of container 10, to accommodate a placement of the valve 102 such that it can be easily accessed by a user for example. Thus, when container 10 is to be filled at the factory, lever 102a of valve 102 may be moved up for example, to open the valve 102, and thus well tube 22 (see valve opening 102b being aligned with well tube 22), such that liquid/beverage can be inserted in container 10 by factory equipment 103. It should be noted that preferably, in order to prevent air from entering container 10, valve 102 should be opened after the air tight friction seal is achieved between the V-shape female coupling 15 of container 10 and the V-shape male coupling 15b (similar to that of dispenser 50) with which the factory equipment 103 is preferably equipped.

It should be understood that valve 102, at the factory or when in the dispenser, may be opened or closed manually by a user, automatically through a mechanical leverage system (not shown), or, if the valve 102 is a solenoid valve, it could be actuated electrically (e.g., automatic command by computer 82).

It should be noted that all the other elements and functions of the container 10 disclosed herein remain otherwise the same if not conflicting with the modification(s) depicted in FIGS. 29-32 (raised well tube and coupling; valve on well tube). It should be further noted that all the elements and functions of dispenser 50 disclosed herein remain otherwise the same, with the exception of slight modifications that would be apparent to one of ordinary skills in the art, that may be needed to accommodate the raised well tube and valve and/or the presence of a valve.

FIG. 17 illustrates a side sectional view of the drink container from FIG. 16 ready for storage and/or shipping, according to an aspect. After container 10 is filled at the factory, valve 102 is preferably closed, by for example, turning lever 102a down (see FIG. 16), such that to prevent air from entering via well tube 22 into container 10. Next, factory V-shape male coupling 15b is disconnected. Next, container 10 is preferably sealed with foil seal 19 (see FIGS. 1-2) and with cap 11, fasten-able using threads 13, for example. The filled container 10 can now be shipped and/or stored.

Figure 18:
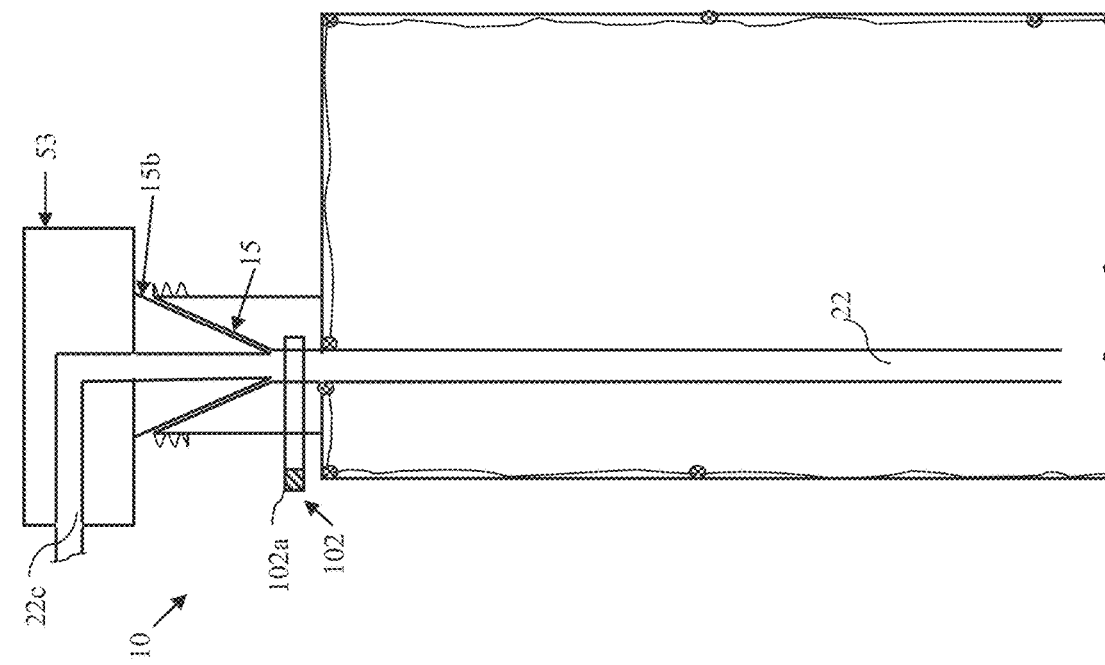
FIG. 18 illustrates a side sectional view of the drink container from FIG. 17 placed in a dispenser, according to an aspect.

FIG. 18 illustrates a side sectional view of the drink container from FIG. 17 placed in a dispenser, according to an aspect. When the filled container 10 arrives at the user, foil seal 19 (see FIGS. 1-2) and cap 11 may be removed and container 10 may be placed in the chamber 52 of a dispenser 50 as earlier described herein, while the valve 102 is still closed (see FIG. 18).

As described, the dispenser preferably has a corresponding V-shape male coupling 15b associated preferably with the top lid housing 53. After the airtight seal between the V-shape female coupling 15 and V-shape male coupling 15b is established as earlier described, valve 102 may be opened (see FIG. 19) by, for example, turning lever 102a upward, as shown. The opening 102b of valve 102 is again aligned with the well tube 22 and thus pump 56 can draw the beverage from container 10 and pour it into user's glass, as an example.

Figure 19:
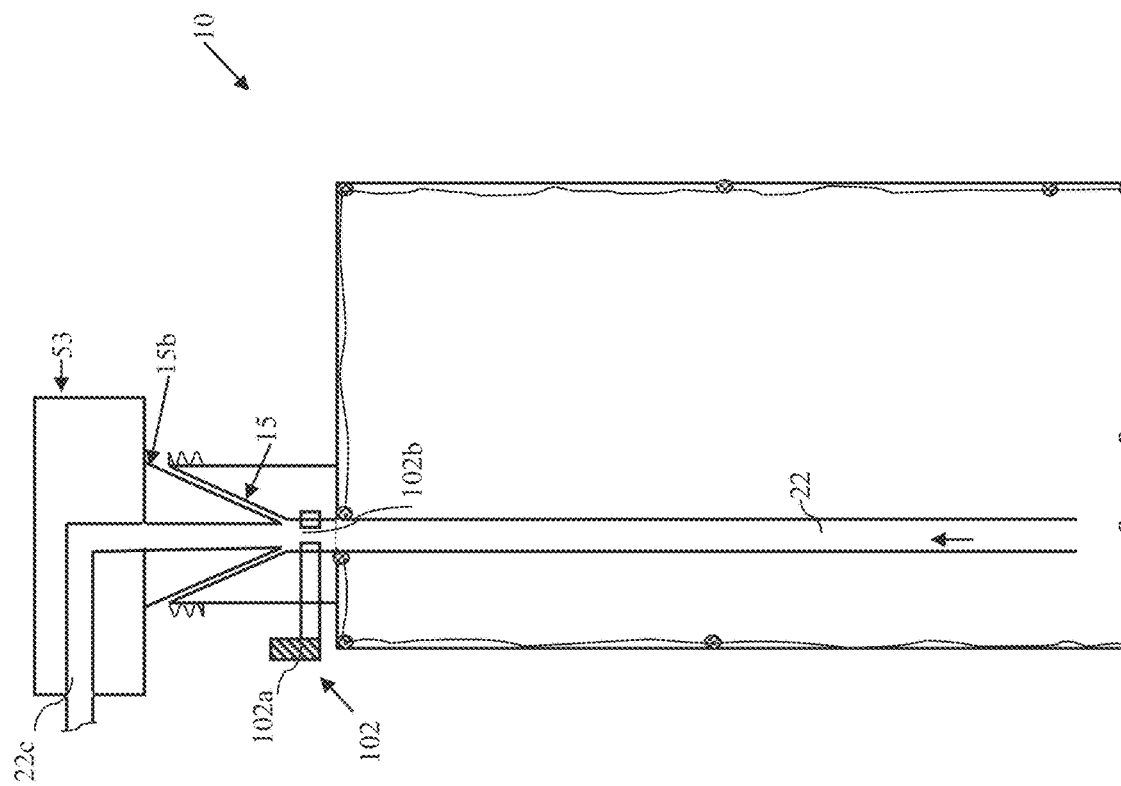
FIG. 19 illustrates a side sectional view of the drink container from FIG. 18 in a different state, according to an aspect.

It should be noted that this is a complete closed loop process, from the beverage factory to user, preventing air from spoiling or contaminating the beverage inside container 10. Again, FIG. 19 illustrates a side sectional view of the drink container from FIG. 18 in a different state (i.e., valve 102 open), according to an aspect.

FIG. 20 illustrates a side sectional view of a drink container, ready for shipping or storage, according to another embodiment. As shown the drink container 10, may be adapted to be used for example for a picnic or a pool party, without the need of using a dispenser described earlier in this disclosure. To that end, it should be noted that container 10 may have two bags inside, 14 and 103. Liner bag 14 was described earlier when referring for example to FIGS. 1-2. The inner bag 103 is sealed at the top as shown to a shortened well tube 22 and it is the bag 103 that holds the beverage 75.

Container 10 may be equipped also with an air valve 104 (e.g., a typical bicycle air valve, shown in FIG. 23A), which may be used to pump air in the space 109 between the liner bag 14 and inner bag 103, and thus force out the beverage 75 inside the inner bag 103. Any commonly available air pump (e.g., hand air pump, tire pump or compressor, etc.) may be used to connect to air valve 104 and pump air in space 109. It should be understood that if container 10 is hermetically built, such as to prevent the escape of the air from its inside, liner bag 14 may be eliminated in this embodiment. It should be noted that well valve 102 is closed at this time, to prevent air from entering inside inner bag 103 and thus prevent spoilage or contamination of beverage 75, as earlier described when referring to FIG. 16-19.

FIG. 21 illustrates a side sectional view of the drink container from FIG. 20, in use, according to an aspect. Again, container 10 as described when referring to FIG. 20 is configured to be used without a dispenser. This may be very useful, for example, for limited budget parties, such as family picnics or pool parties, student parties, and so on. As shown in FIG. 21, when a user wishes to use container 10, user may first remove cap 11 (FIG. 20) and replace it with the picnic coupling 105. As shown, the picnic friction coupling 105 may include a male coupling's pipe 22b, a V-shape male coupling 15b and a picnic cap 11b.

The picnic friction coupling 105 may be fastened to the container 10 by simply screwing picnic cap 11b onto the threads 13. It should be noted that an airtight seal is created between V-shape male coupling 15b of the picnic coupling 105 and the V-shape female coupling 15 of the container 10, as earlier described in this disclosure. Next, the user may connect one end of a hose 107, using joint 106, to the upper end of male coupling's pipe 22b. The other end of hose 107, as shown, may have a beverage valve 108 associated with it. The beverage valve 108, may have a gate 108c, which may be lifted to allow beverage flow to picnic beverage spout 109, by pressing down a lever 108a, which is loaded with a spring 108b, to cause the lever 108a to return upon its release, and close the gate 108c.

Next, the user may open well valve 102, such that well valve opening 102a is aligned with the male coupling's pipe 22b. It should be noted that because of the previously established airtight seal between the V-shape couplings 15 and 15b, air will be prevented from entering the inner bag 103 and beverage 75.

Next, the user may connect an air pump (shown as 120 in FIG. 25) to air valve 104 and use the pump to push air in the space 109, between the inner bag 103 and liner bag 14. The pumped air in the space 109 will press against inner beverage bag 103, propelling beverage 75 outward via male coupling's pipe 22b and hose 107. Beverage can now be poured via picnic spout 109 by simply pressing down lever 108a of beverage valve 108.

It should be understood that the order of the above steps is just an example. The user may for example pump the air inside container 10 at home, and then, when at the picnic site, open well valve 102 and pour the beverage by opening picnic valve 108.

It should be understood that picnic container 10 can be reusable, disposable and/or recyclable. Same may be true for the picnic friction coupling 105, hose 107 and/or picnic valve 108.

It should be noted that while this disclosure emphasized the use of the described systems and methods for dispensing drinks, similarly, they can be used for dispensing other liquids (e.g., liquid soap, soft serve foods, ice cream, yogurt, etc.).

The beverage container 10 disclosed herein can be made from cardboard, plastic, glass, metal or any combination of these or other suitable materials.

FIGS. 22A-22D illustrate side sectional views of four examples of a drink container 10, according to an aspect. As shown, the drink container 10 may be a rectangular box or keg. The keg 10 may be constructed of plant-based bioplastic, bio-cardboard, regular plastic, regular cardboard, or steel. The keg 10 is preferably constructed from biodegradable materials.

FIG. 22A illustrates a keg 10 that may be used for water or another beverage that does not need to be mixed or stirred.

A well tube 22 may extend down into the keg 10, through which liquids or soft serve foods may be drawn.

FIG. 22B illustrates a keg 10 with a mix/stir shaft 30a that may be used for beverages that may need to be stirred or mixed, such as, for example, juices, energy drinks, chocolate milk, pre-mixed cocktails, coffee, tea, lemonade, and so on. The mix/stir shaft 30a may extend down as shown into the container 10. The mix/stir shaft 30a may have several rotating paddle blades 30b to properly mix/stir beverages, cocktails or soft serve-food, ice cream, yogurt, soup, stews, pasta, rice and meat, poultry, fish, smoothies, juice, cocktails and so on.

FIG. 22C illustrates a keg 10 that may be used for soft serve foods such as, for example, ice cream, yogurt, soups, stews, macaroni and cheese, and so on. The keg 10 may include a mix/stir shaft 30a having paddle blades 30b and may have an auger conveyor/lifting silo 110, which may be capable of vertical or horizontal ushering of the food or liquid. The keg 10 may also have a sloped floor 125, which may assist in guiding the soft serve foods to the auger conveyor/lifting silo 110. The keg 10 may also include horizontal ushering 125-a to move soft serve food.

FIG. 22D illustrates a keg 10 that may be used for dispensing tap water, or water found at, for example, a camping site. The keg 10 may be fitted with a biodegradable water filter 111, such that water is poured into the keg 10 through the filter 111 and the keg 10 may then be closed with a removable cap 11. After water is poured into the keg 10 through the filter 111, it may be drawn out through the well tube 22. The well tube 22 may also include a second water filter (not shown), for added protection. The biodegradable water filter 111 may be single use or multiple use. An advantage of the single use filter may be that using the same water filter for an extended period of time may be unhealthy and may collect impurities. The keg 10 may be constructed in sizes ranging from ½ gallon or smaller to 10 gallons or larger.

It should be understood that a keg may include a plurality of chambers, each of which may include the components shown in FIGS. 22A-22D. Each chamber may house a different type of liquid or food, and may include various components for mixing, for example. As an example, a keg may include two or four chambers with a beverage in some and soft serve food in the other chambers. The various chambers may be used with a dispenser, which may include a bar code reader, a microphone for voice commands, or a user ID scanner, for example. The various chambers may include barriers in between, such that heat or cold are shielded from other nearby chambers.

Figure 23A:
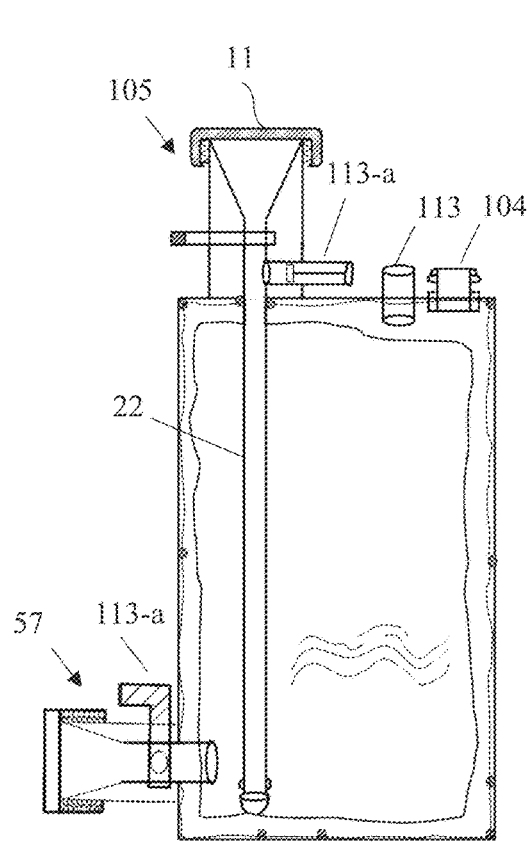
FIGS. 23A-23B illustrate side views of a drink container or keg with a screw-on cap, two couplings, two safety valves, and well tube, according to an aspect.
Figure 23B:
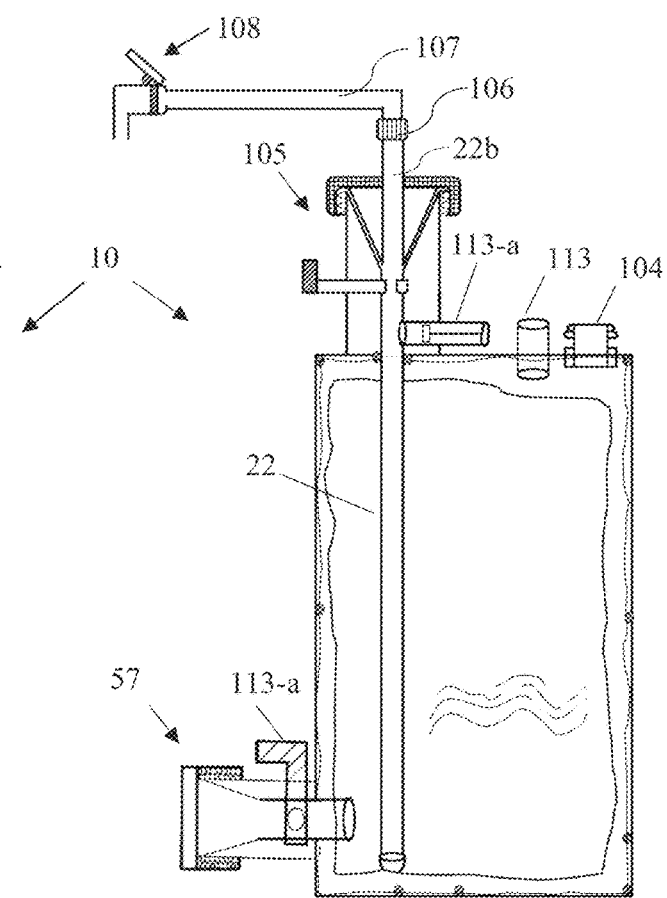

FIGS. 23A-23B illustrate side views of a drink container or keg with a screw-on cap, two couplings, two safety valves, and a well tube 22, according to an aspect. The keg 10 may include a pressure relief safety valve 113, and another pressure relief safety valve 113-a at the pour spouts 105, 57. The keg 10 may also include an air valve 104, which was previously described when referring to FIG. 21. Again, the user may connect one end of a hose 107, using joint 106, to the upper end of male coupling's pipe 22b. The other end of hose 107, as shown, may have a beverage valve 108 associated with it. The keg may include two pour spouts, a pour spout 105 at the top, and another pour spout 57 at the bottom.

Figure 23C:
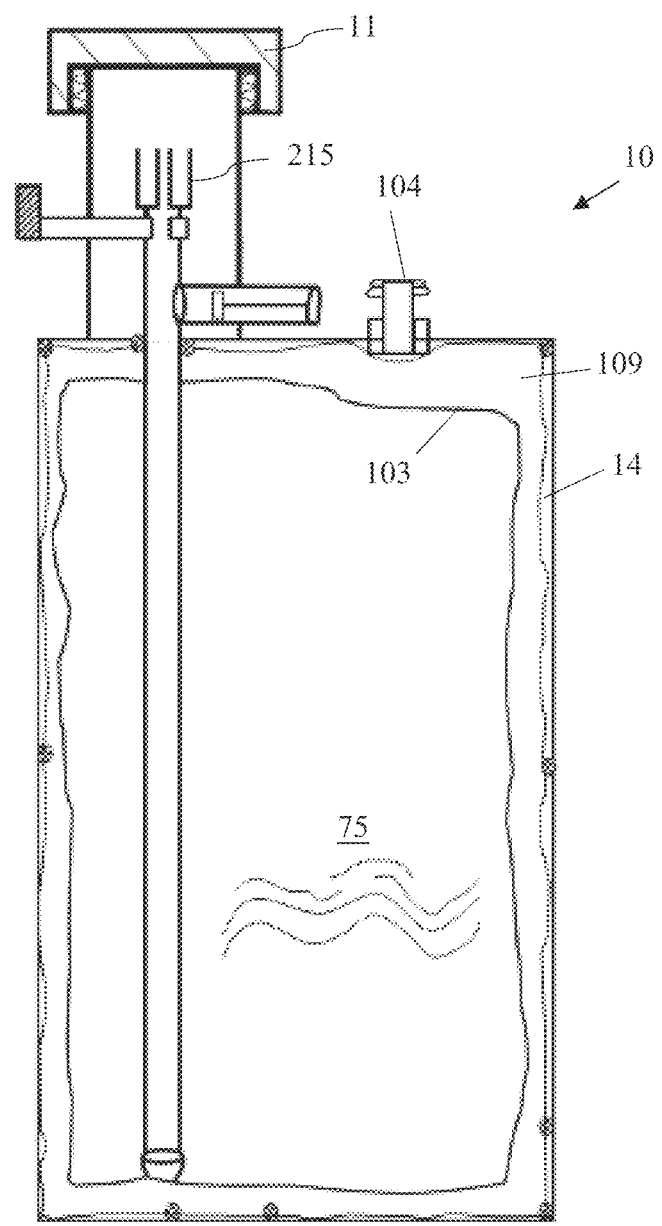
FIG. 23C illustrates a side view of a drink container or keg with a screw-on cap and female cylindrical coupling, according to an aspect.

FIG. 23C illustrates a side view of a drink container or keg 10 with a screw-on cap 11 and female cylindrical coupling 215, according to an aspect. The cylindrical coupling 215 may be a U-shaped channel as shown, which may accommodate a bull-nose male coupling (not shown), for example. The channel may have a concave bottom, or may have a flat horizontal level bottom, as shown. The keg may also include an air valve 104 for, again, pumping air in the space 109 between the liner bag 14 and inner bag 103, to thus force out the beverage 75 inside the inner bag 103.

Figure 23D:
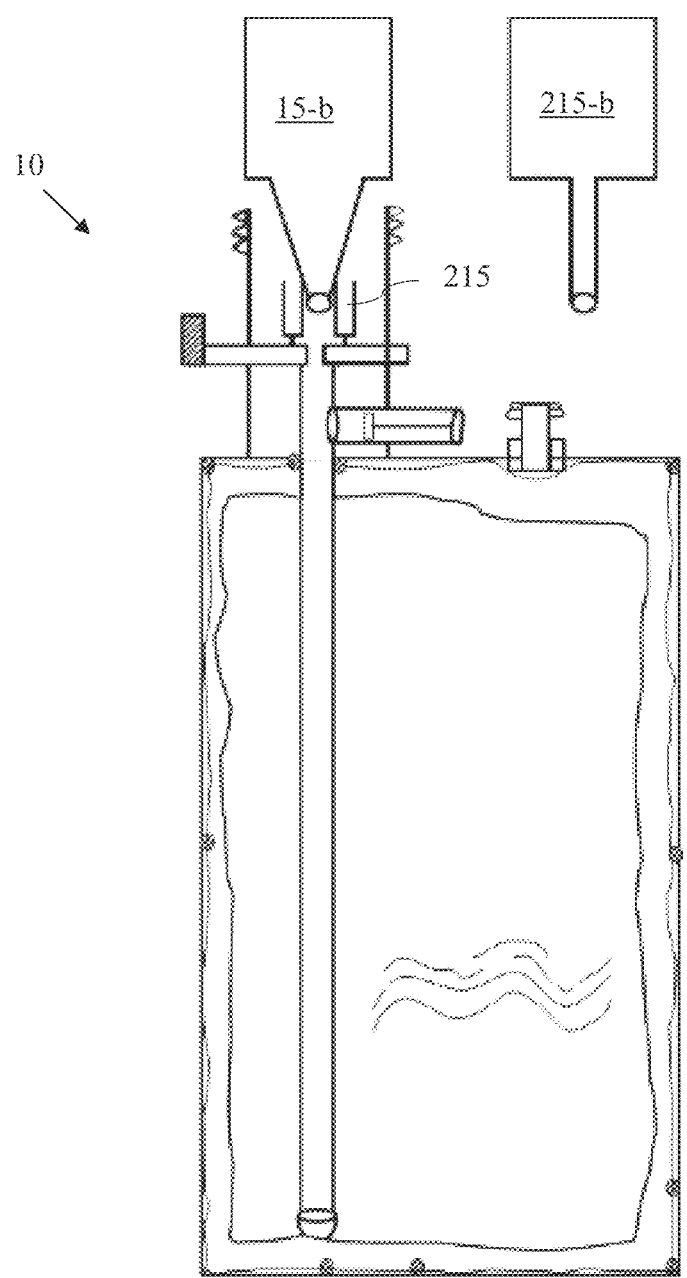
FIG. 23D illustrates a side view of a drink container or keg with a V-shape male friction coupling that may be a part of a factory filling line, according to an aspect.

FIG. 23D illustrates a side view of a drink container or keg 10 with a V-shape male friction coupling 15-b that may be a part of a factory filling line, according to an aspect. The V-shape male friction coupling 15-b may be used with a cylindrical female coupling 215. The lid and coupling may also be a male cylindrical coupling 215-b, which may correspond to a female cylindrical coupling 215, as shown in FIG. 23C according to an aspect.

Figure 23E:
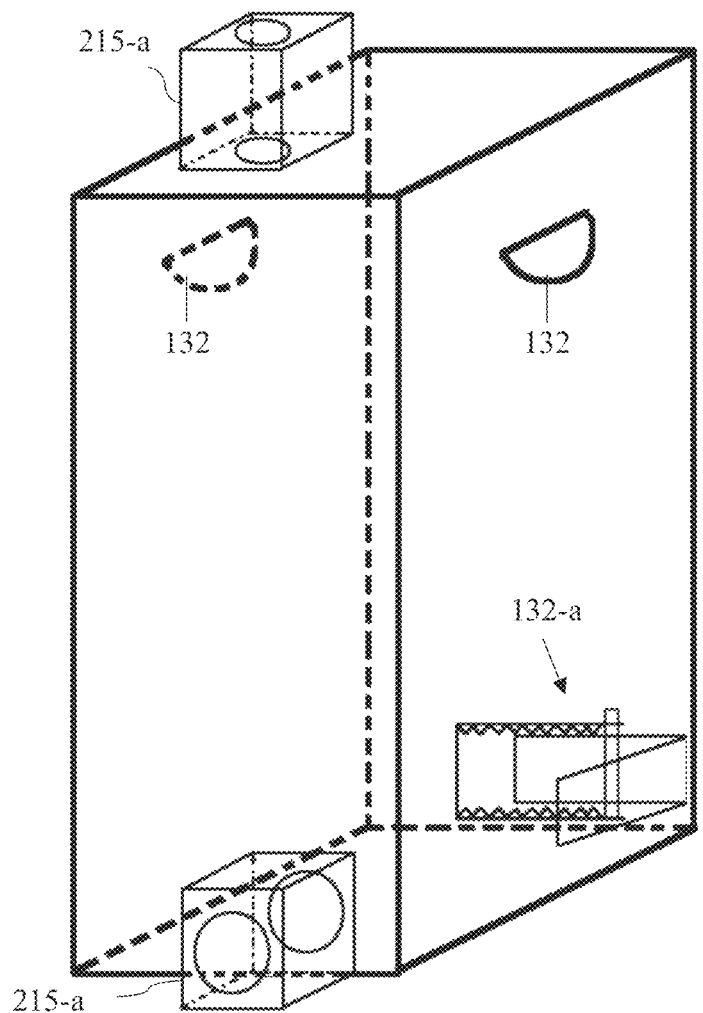
FIG. 23E illustrates a perspective view of a drink container or keg showing examples of where a V-shaped or cylindrical coupling may be placed, according to an aspect.

FIG. 23E illustrates a perspective view of a drink container or keg 10 showing examples of where a V-shaped or cylindrical coupling may be placed, according to an aspect. The female coupling for a receiving a corresponding male coupling, shown by 215-a, may be either V-shaped or cylindrical. The keg 10 may also include handles 132 on the keg's side walls, as shown. The keg 10 may also include at least a corner brace 132-a (with some portions not shown for visual clarity, shown in more detail in FIG. 23F), which may be provided at one corner of the keg 10 or more than one corner, as an example.

Figure 23F:
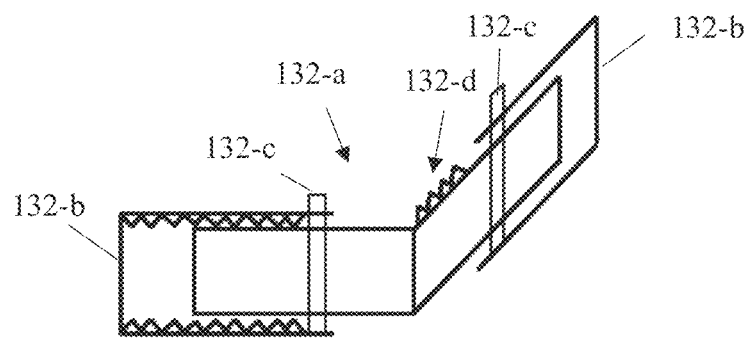
FIG. 23F illustrates a detailed perspective view of the corner brace of FIG. 23E.

FIG. 23F illustrates a detailed perspective view of the corner brace 132-a of FIG. 23E. The corner brace 132-a may include sliding portions 132-b for extending or adjusting the size of the brace such that the corner brace may be used in different sizes or models of kegs, for example. The sliding portions 132-b may be locked into place with a pin 132-c, for example, or any other suitable means. The corner brace may also include teeth 132-d (not shown in all areas for visual clarity) for the sliding portions 132-b to grip with the main corner brace 132-a.

FIGS. 24A-24G show sectional top perspective views of examples of a bioplastic pressure relief safety valve 113, preferably biodegradable, which may be manually adjusted for different PSI, and may be reset if activated to release pressure inside of the keg, according to an aspect. The resetting may be automatic, and the pressure relief safety valve may "self-reset." As an example, the weight of the top of the safety valve may cause the top portion to be pushed downwards when not forced upwards by pressure inside of the keg. As another example, an actuator within the keg may reset the safety valve cap and may do so when a sensor detects that the safety valve has been used to relieve pressure. As another example, the resetting may be performed manually by the user. Upon resetting, the safety valve may be configured to maintain the same PSI as previously, or a different PSI. More than one safety valve may be used in one container. For example, one safety valve may be used to release excess pressure in the beverage cavity of the keg 10 where the beverage is stored, and a second safety valve may be in an air cavity where air pressure is used to self-propel the beverage from the keg 10. The pressure relief safety valve 113 may be constructed in a variety of ways, and preferably constructed from the same material as the keg. An advantage may be that this aids in the ease of recycling, and single-stream regenerative recycling may be possible with the components of the safety valve, including springs and rubber bands, constructed entirely of the same bio-plastic material, for example. The user may recycle the entire container without separation of its parts.

Figure 24A:
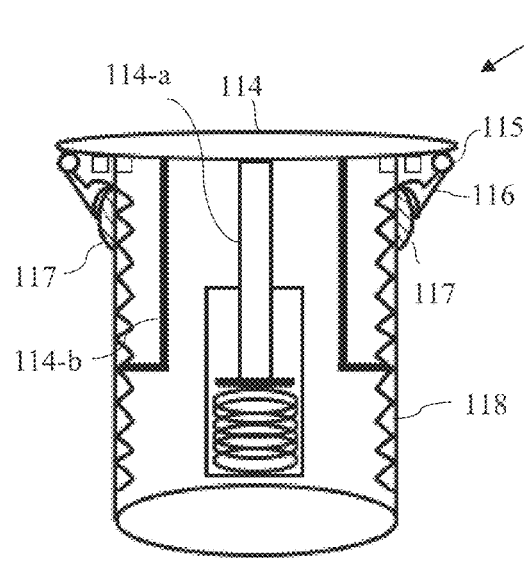
FIGS. 24A-24G show sectional top perspective views of examples of a bioplastic pressure relief safety valve, which may be manually adjusted for different PSI, and may be reset if activated to release pressure inside of the keg, according to an aspect.
Figure 24B:
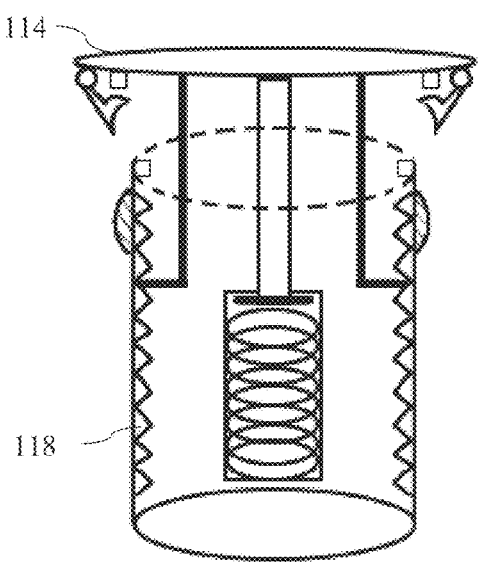

FIGS. 24A-24B illustrate side views of a pressure relief safety valve 113-a in a closed sealed position and activated open position, respectively, according to an aspect. High pressure may force the valve open, by raising the lid 114 into the activated open position of FIG. 24B to release the excess high pressure. The lid 114 may include spring hinges 115 that may hold arms 116 against the side of the valve 113-*a*. The arms 116 may clip onto a padded or ridged area 117 attached to the side of the valve 113-*a*. The inside of the valve 113-*a* housing may have ridges 118, which may create a friction hold for the lid 114, which may extend down into the housing by a shaft 114-*a*. The lid 114 may also have hooks 114-*b* which may hook into the ridges 118, holding the lid 114 in place. This may also help to hold the lid 114 against seal rings 119. As an example, either the hooks 114-*b* or the ridges 118 may be flexible, such that the hooks 114-*b* may move upwards or downwards past the ridges 118 as needed.

Figure 24C:
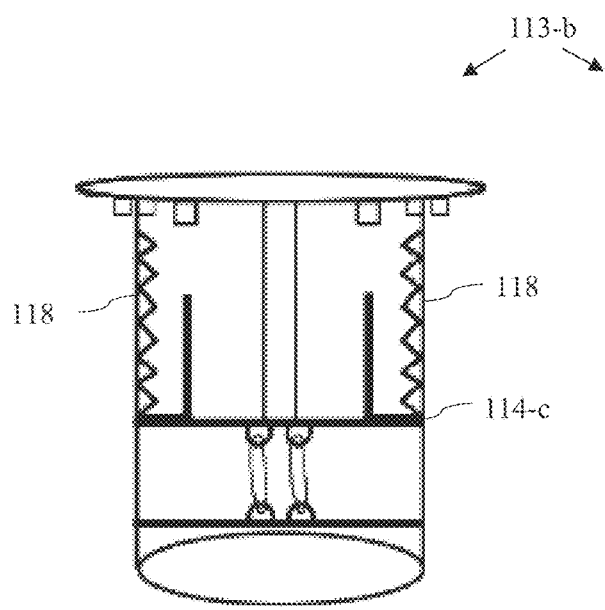
Figure 24D:
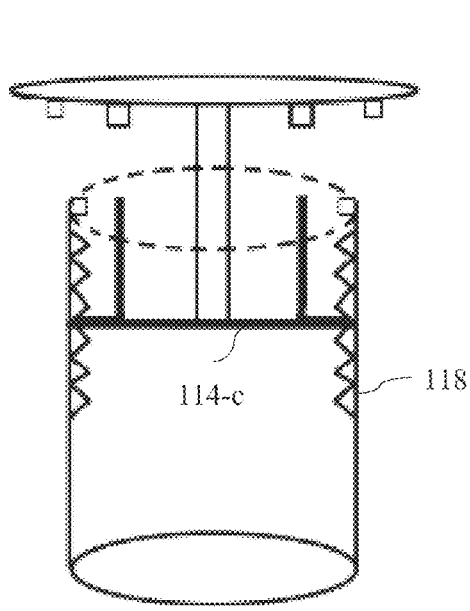

FIGS. 24C-24D illustrate a side view in a closed state and front view in an open state, respectively, of a pressure relief safety valve 113-*b*, according to an aspect. The keg may include two pressure relief safety valves, such that one may be for releasing air and another may be for releasing gas resulting from fermentation. As an example, a pressure relief safety valve 113-*b* may include a long hook or rod 114-*c* that may hook into the ridges 118, holding the lid 114 in place. Again, as the long hook 114-*c* or the ridges 118 may be flexible, such that the long hook 114-*c* may move upwards or downwards past the ridges 118 as needed.

Figure 24E:
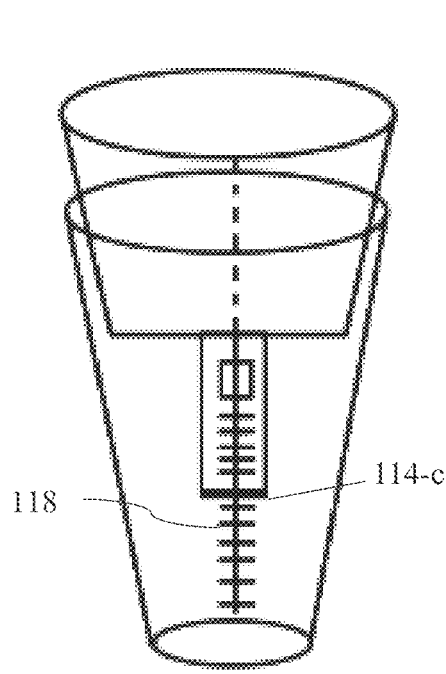
Figure 24F:
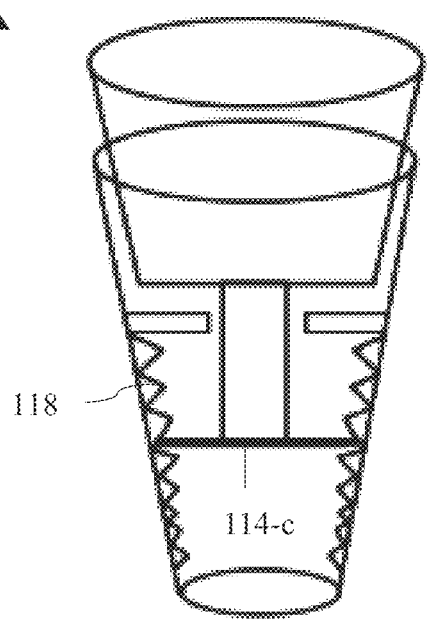

FIG. 24E-24F illustrate a side view and a front view, respectively, of another example of a pressure relief safety valve 113-*c*, according to an aspect. The pressure relief safety valve 113-*c* may include ridges 118 along the sides of the walls, which may catch a rod to keep the safety relief valve open or closed in a desired open or closed position.

Figure 24G:
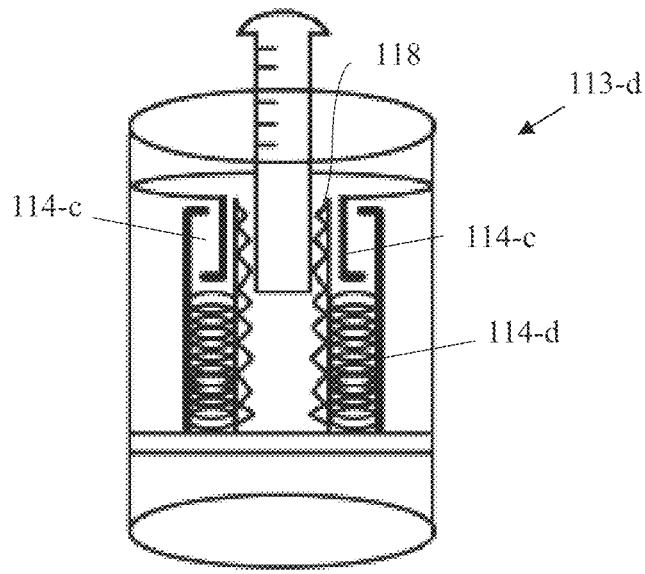

FIG. 24G illustrates a front view of another example of a pressure relief safety valve 113-*d*, according to an aspect. The hooks 114-*c* of the safety valve may be raised and lowered by springs 114-*d*.

Figure 25:
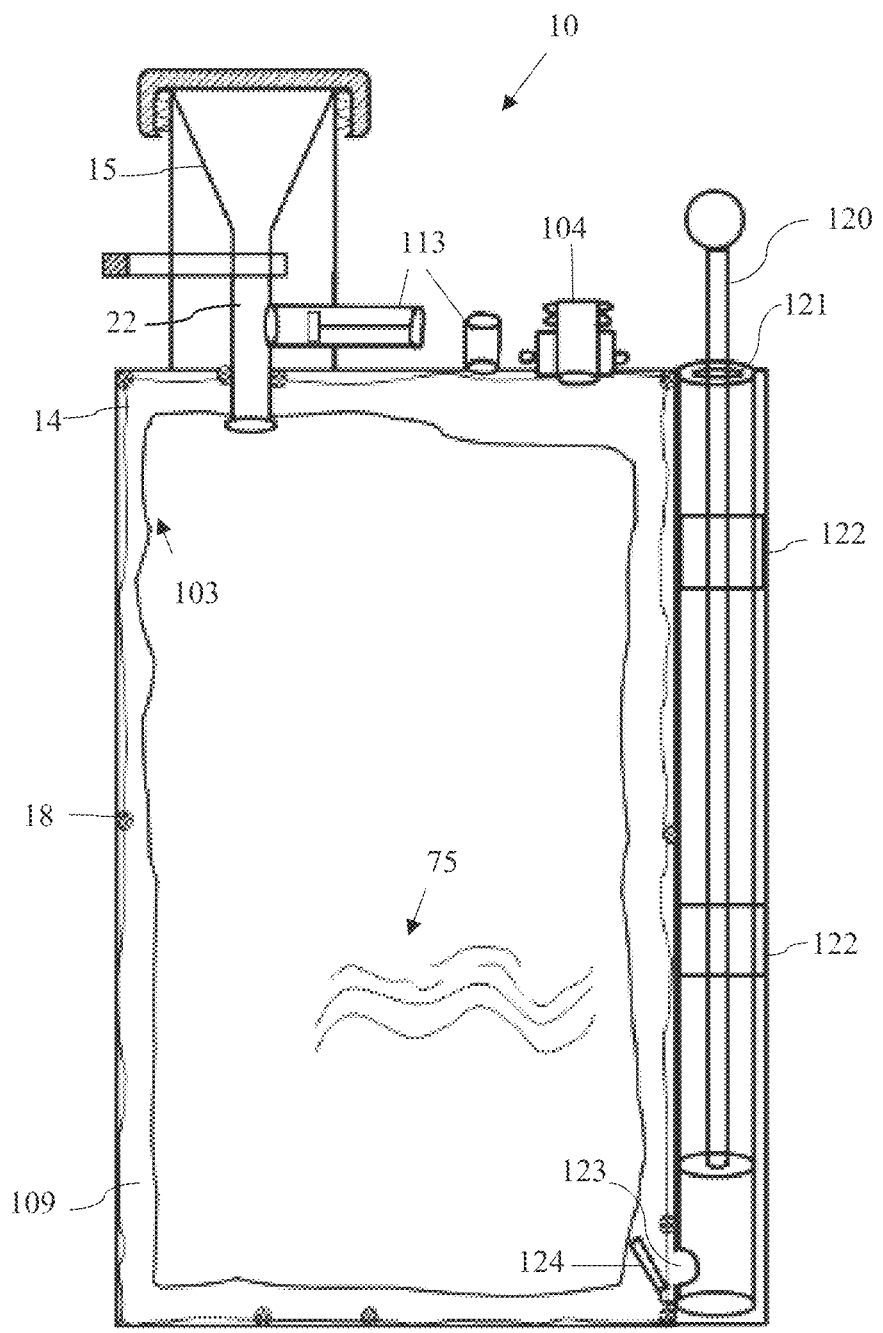
FIG. 25 illustrates a side sectional view of a keg that may self-propel beverages or foods without the need for electricity or carbon dioxide pressure, according to an aspect.

FIG. 25 illustrates a side sectional view of a keg 10 that may self-propel beverages or foods 75 without the need for electricity, according to an aspect. An advantage may be that additional expense for electricity may not be needed, and the keg may thus be portable. The keg may also reduce the carbon footprint by not using electricity or gas to propel a beverage. A user may pump an air pump handle 120, which may force air into the keg 10 in the space 109, between the inner bag 103 (also "beverage bag") and liner bag 14. The pumped air in the space 109 will press against inner beverage bag 103, propelling beverage 75 outward via well tube 22. The air bag may keep air in the air bladder chamber, which may create air pressure against the beverage bag. As air pressure is increased, the pressure may push the beverage 75 up through the V-friction coupling 15. The air pump 120 may be held in place by straps 122 and may be built into the keg and may be a part of the keg. The air pump 120 may have an intake hole 121 which provides the air needed for the air pump plunger action to fill the air bag inside of the keg. An air exit hole 123 and air pump gate flap 124 may restrict air from leaking out of the air bladder, which may maintain pressure against the beverage bag. This may aid in strong propulsion of the beverage. One-way air flow may also be provided by the air gate flap 124 as shown, or by a one-way air valve, or ball valve air lock, for example.

As an example, the keg 10 may have an outer liner bag 14, or the outer shell may be rigid. The outer liner bag 14 may create a hermetically sealed chamber and may be connected to the keg's inner walls by glue or any other suitable means, and the keg may also include safety pressure relief valves 113. As an example, the keg may include a plastic, solid container instead of an outer liner bag, with a beverage bag 103 inside of it. As the beverage is emptied from the beverage bag 103, the beverage bag 103 will be reduced in volume and may slide up the wall of the keg, forcing the beverage towards the opening in the female V-friction coupling 15, or cylindrical coupling (as shown in FIG. 34A as 215). Again, the plastic liner bag 14 is preferably fastened, using glue for example, to the interior wall (as shown as 24 in FIG. 2) of the container 10 at several fastening locations 18, including the corners of the container 10. An air nipple or air valve 104 may be used in order to automatically keep air pressure in the air chamber at a constant automated pressure. The air nipple or valve 104 may be used in a keg with or without an air pump 120. It should be understood that the keg may be used with or without an electric air compressor, or with or without a hand air pump.

Figures 26A, 26B:
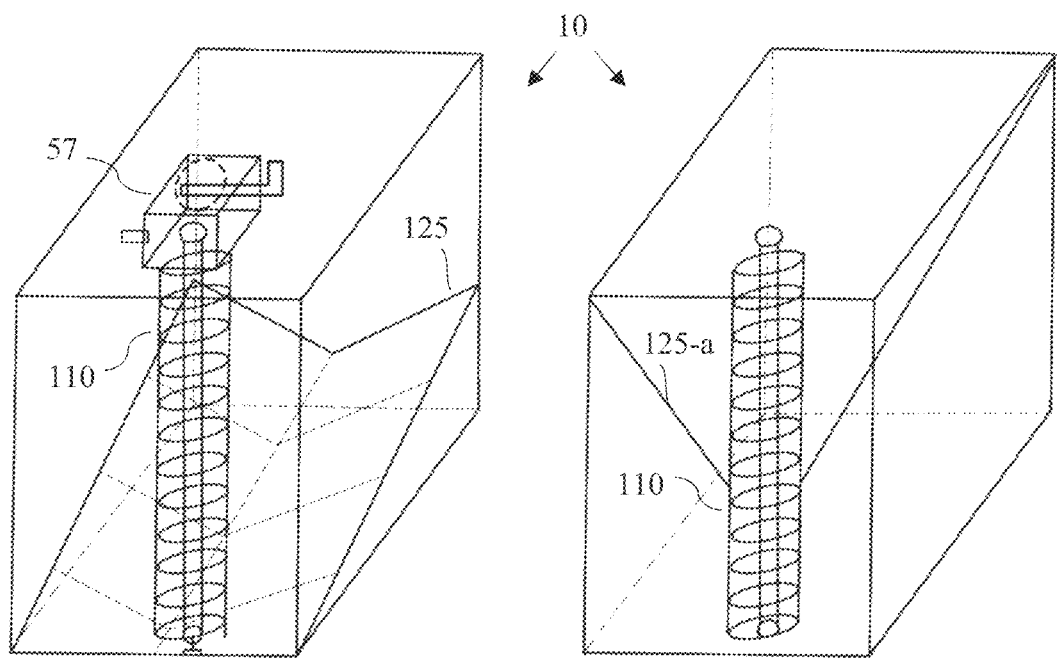
FIGS. 26A-26C illustrate various examples of a keg that may self-propel liquids or soft-serve foods with or without an external energy source, according to an aspect.
Figure 26C:
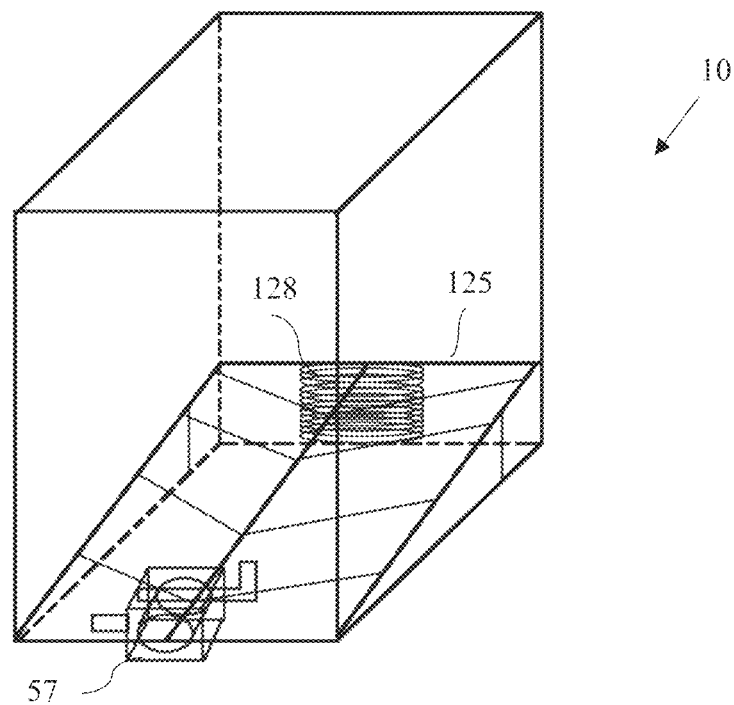

FIGS. 26A-26C illustrate various examples of a keg 10 that may self-propel liquids or soft-serve foods with or without an external energy source, according to an aspect. The keg 10 may include a pour spout opening 57 (not shown in FIG. 26B for clarity), which may accommodate a V- or cylindrically shaped friction coupling (not shown for clarity). The keg may have a sloped floor 125 directing liquids or foods to the pour spout opening and an auger conveyer/lifting silo 110. As shown in FIG. 26A, the sloped floor 125 may be in a V-shape such that the liquid or food is directed to the center point of the pour spout. The sloped floor 125 may be fixed or may move. As shown in FIG. 26B, the interior of the keg 10 may be cone-shaped as shown by 125-*a* to direct food or liquids towards the auger screw conveyor 110. As shown in FIG. 26C, the sloped floor may also be raised by a spring 128. To lift and create a sloped adjustable floor inside of the keg 10 for gravity flow of liquids or foods, the bottom plate may increase its slope as the liquids or foods are drained from the keg. The lifting pressure may be created by the rubber bands or springs to lift the bottom plate. The examples of kegs shown in FIGS. 26A-26B may need an external energy source to power the auger, and the example of the keg shown in FIG. 26C may not need an external energy source.

Figure 27A:
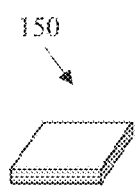
FIG. 27A illustrates an example of layered board that may be used for the construction of a keg.

FIG. 27A illustrates an example of layered board 150 that may be used for the construction of a keg 10. The layered board 150 may be constructed from bioplastic, wood, cardboard, steel, or any other suitable materials. The layered board 150 may be used as a lifting pressure plate and may be used to hold the top plate of the keg 10, coupled together for lifting strength. The layered board 150 (shown without layers in FIGS. 27B-27D for clarity) may form the top of the keg 10.

Figure 27B:
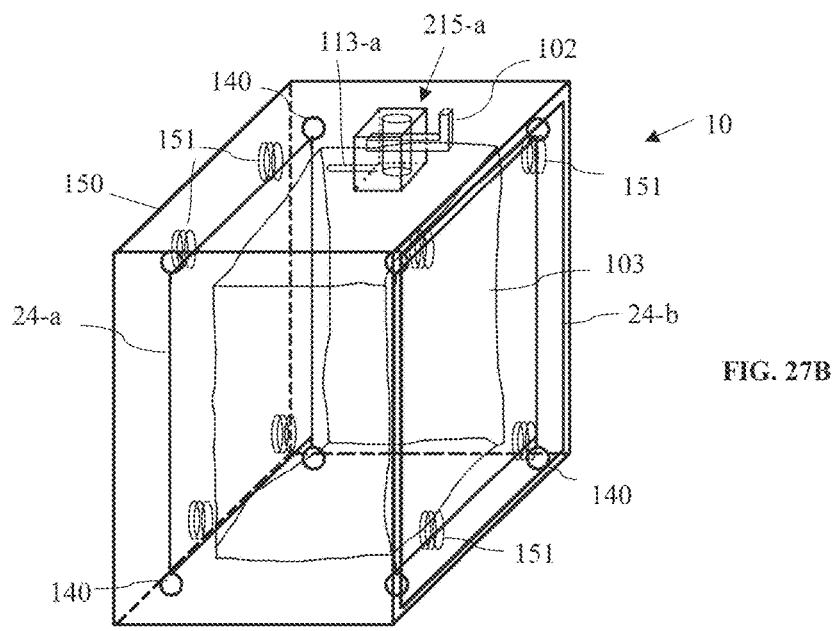
FIG. 27B illustrates an example of a keg that may self-propel beverages or foods using side wall pressure plates, according to an aspect.

FIG. 27B illustrates an example of a keg 10 that may self-propel beverages or foods using side wall pressure plates 24-*a*, according to an aspect. The side wall pressure plates 24-*a* may be bioplastic or any other suitable material. The keg 10 may include a V-shaped or cylindrical friction female coupling 215-*a* for receiving a corresponding male coupling. The coupling 215-*a* may include a safety relief valve 113-*a* and may include a petcock valve 102. It should be understood that all friction couplings may include a safety relief valve 113-*a* and may include a petcock valve 102. The side-to-side propulsion may be achieved by the side wall pressure plates 24-*a* pressing against the beverage bag 103. To assist the side wall pressure plates 24-*a* sliding along the top and bottom of the keg 10, the side wall pressure plates 24-*a* may be fitted with, for example, wheels 140, or as another example, skis (not shown). The side wall pressure plates 24-*a* may also be assisted in sliding by fitting into guide pins (not shown), or be free floating, as shown. Side-to-side propulsion may also be achieved by springs 151 applying pressure to the beverage bag 103, which may be, for example, a plastic bag, or a balloon bladder, which may be similar to a water balloon. The springs 151 may push between the outer walls of the keg 10 and the side wall pressure plates 24-*a*. A second bio-plastic outer side wall 24-*b* (shown on the right side of FIG. 27B only for clarity) may be needed on the inside of the keg wall to press against the side wall pressure plates 24-*a* inside of the keg wall.

Figure 27C:
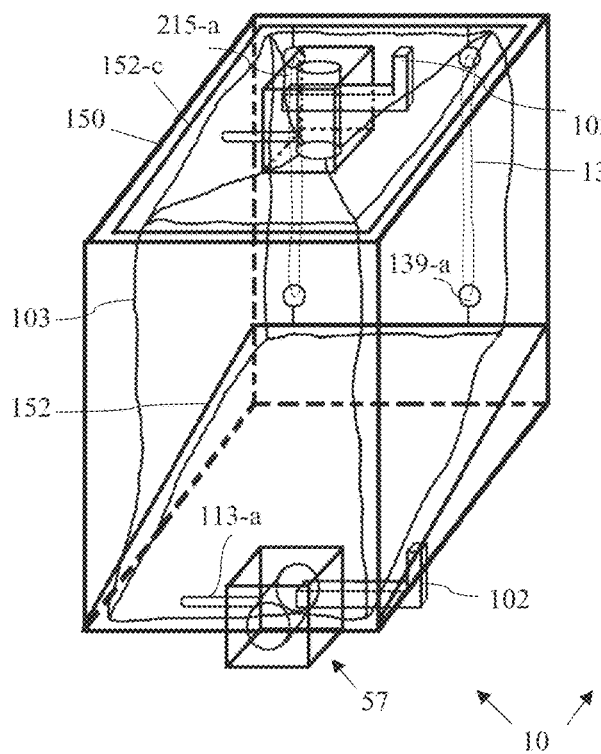
FIG. 27C illustrates an example of a keg that may self-propel beverages or foods using a gravity flow sloping floor plate to lift one end of the beverage bag at the bottom of the keg, according to an aspect.

FIG. 27C illustrates an example of a keg 10 that may self-propel beverages or foods using a gravity flow sloping floor plate 152 to lift one end of the beverage bag 103 at the bottom of the keg 10, according to an aspect. The floor plate 152 may be lifted, such that the elevation may create a sloping floor to direct the liquid or food in the beverage bag 103 towards the pour spout 57, which may also include a safety relief valve 113-*a* and may include a petcock valve 102. The floor plate may be lifted using elastic bands 139 which may be bio-rubber or any other suitable material. The elastic bands 139 may be attached to eyehooks 139-*a*, which may be round as shown, or may any other suitable shape. The elastic bands 139 may, through pressure, lift the sloping floor plate 152 as the weight of the beverage bag 103 decreases when beverage is removed from the container. When the floor plate 152 is lifted, the beverage bag 103 may be pressed against a stationary top plate 152-*c*, to help release the bag's contents.

Figure 27D:
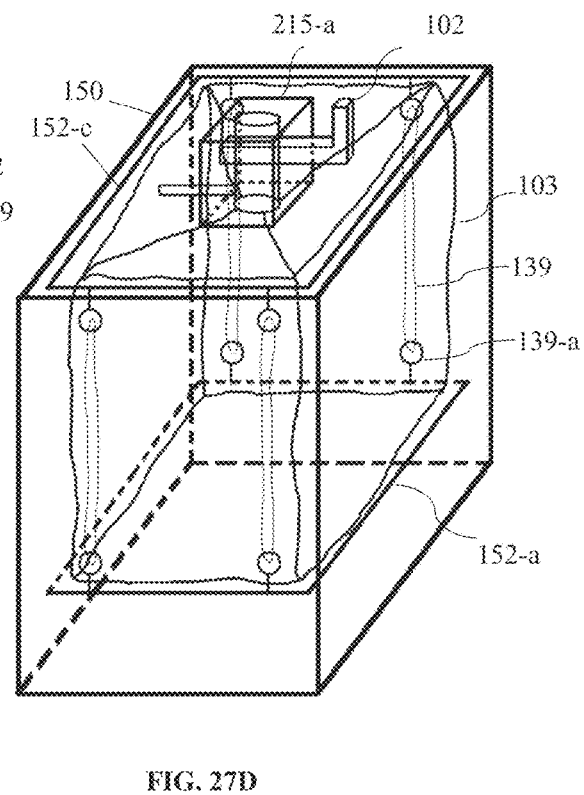
FIG. 27D illustrates a self-propelling keg having a lifting floor plate, according to an aspect.

FIG. 27D illustrates a self-propelling keg 10 having a lifting floor plate 152-*a*, according to an aspect. The lifting floor plate 152-*a* may be positioned at the bottom of the keg 10 as a bottom plate, and may be raised and push the contents of the beverage bag 103 by pressure applied by elastic bands 139-*a*, which may be connected to eye hooks 139-*a*, as discussed when referring to FIG. 27C. The eye hooks 139-*a* may be attached to the top plate 152-*c* on the other end of the keg, which may be stationary. The weight of the beverage inside of the beverage bag 103 may be lessened as the petcock valve 102 of the coupling 215-*a* is opened, and thus the lifting floor plate 152-*a* may be raised. Again, when the lifting floor plate 152-*a* is raised, the beverage bag 103 may be pressed against a stationary top plate 152-*c*, to help release the bag's contents.

Figure 27E:
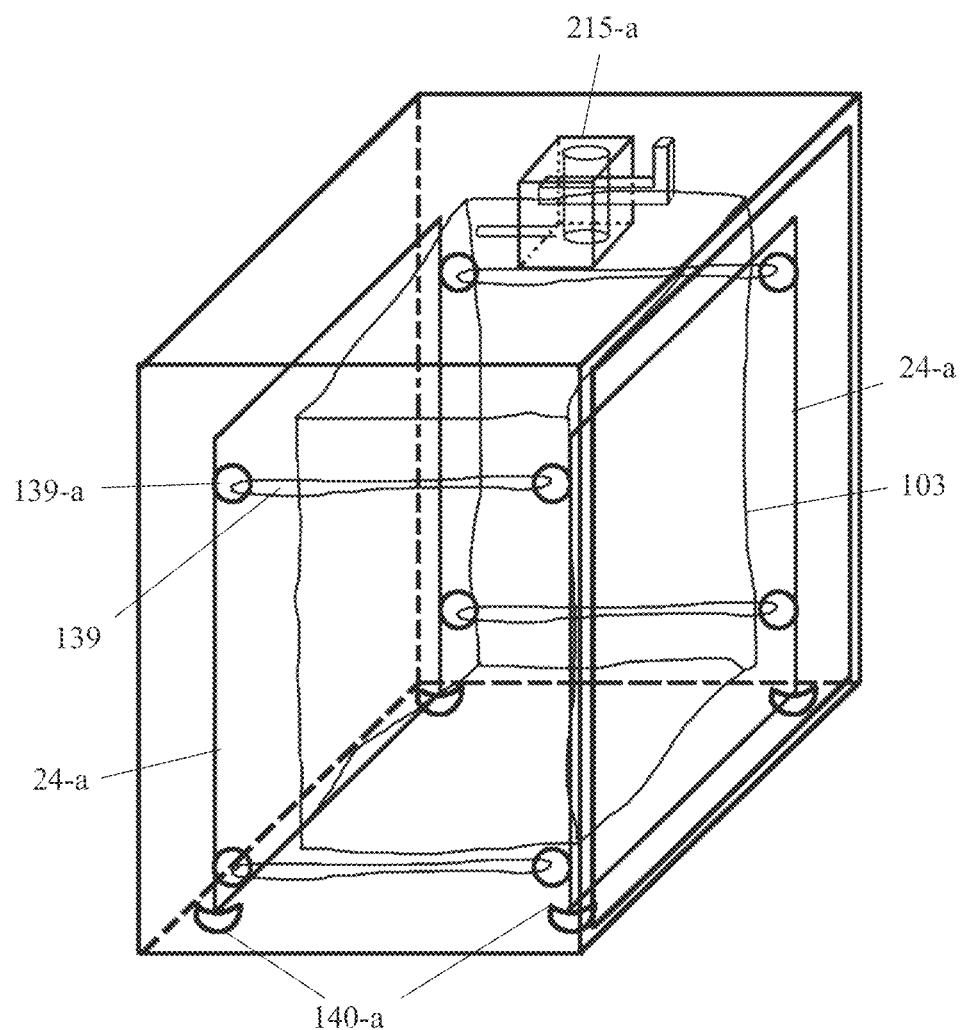
FIG. 27E illustrates a self-propelling keg having side walls, according to an aspect.

FIG. 27E illustrates a self-propelling keg 10 having side walls 24-*a*, according to an aspect. The keg 10 may contain a bio-plastic bladder-type bag 103 upon which the side walls 24-*a* may push from two sides, to evenly push liquid or beverage out from the friction coupling 215-*a*, which may be associated with a pour spout for pouring out the contents of the keg. The two side walls 24-*a* may be held together by elastic bands 139 hooked into eye hooks 139-*a*, for example, and be held in place by the inner bag 103. The side walls 24-*a* may then squeeze together as the contents of the inner bag 103 are released and the volume of the bag 103 decreases. The side walls 24-*a* may be on skis 140-*a* in order to facilitate sliding across the bottom of the keg 10. As another example, wheels 140 (as shown in FIG. 27B) may also be used for the side walls 24-*a*.

Figure 27F:
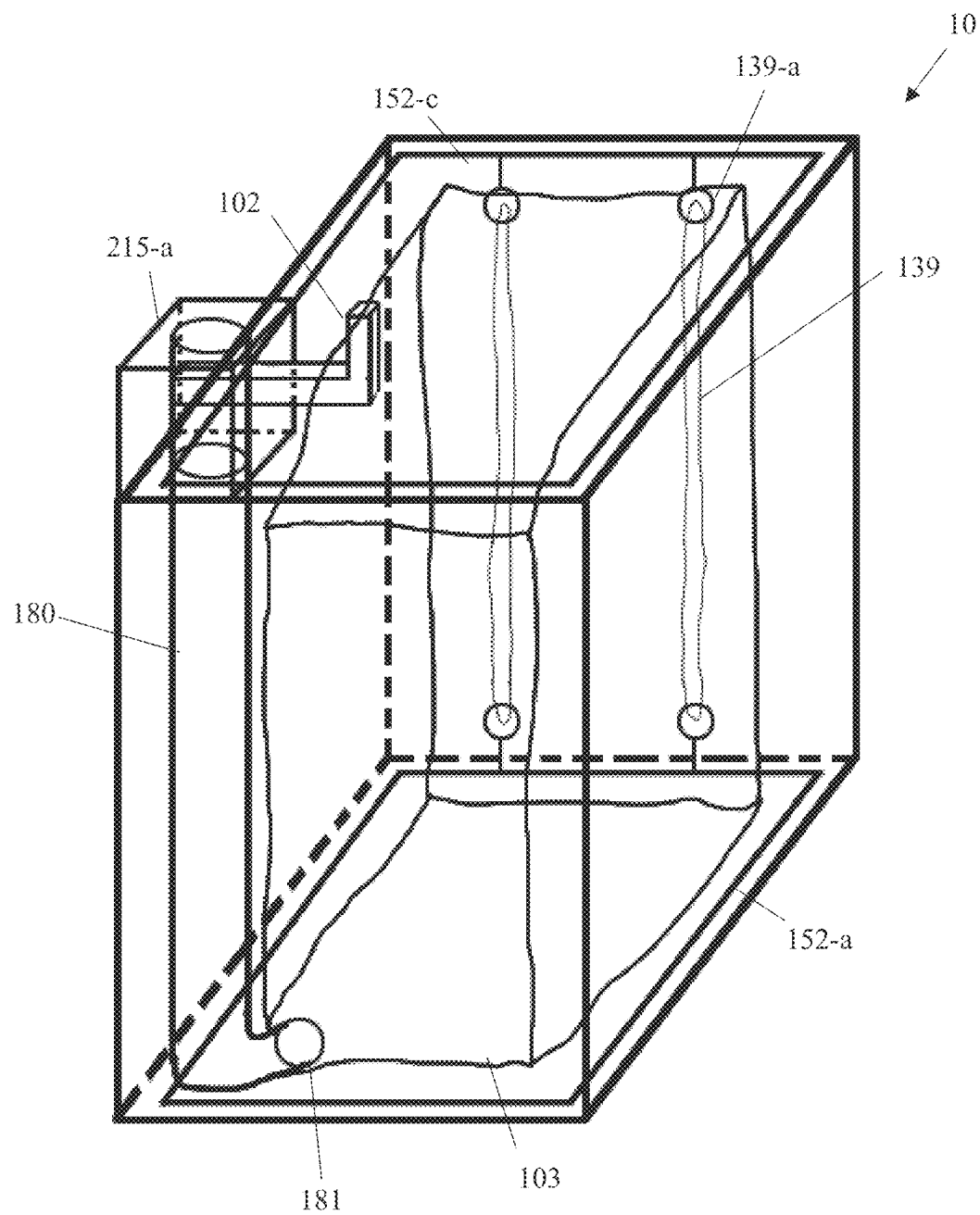
FIG. 27F illustrates a self-propelling keg having a moveable top plate at the top and a stationary bottom plate, and a flexible hose, according to an aspect.
Figure 27G:
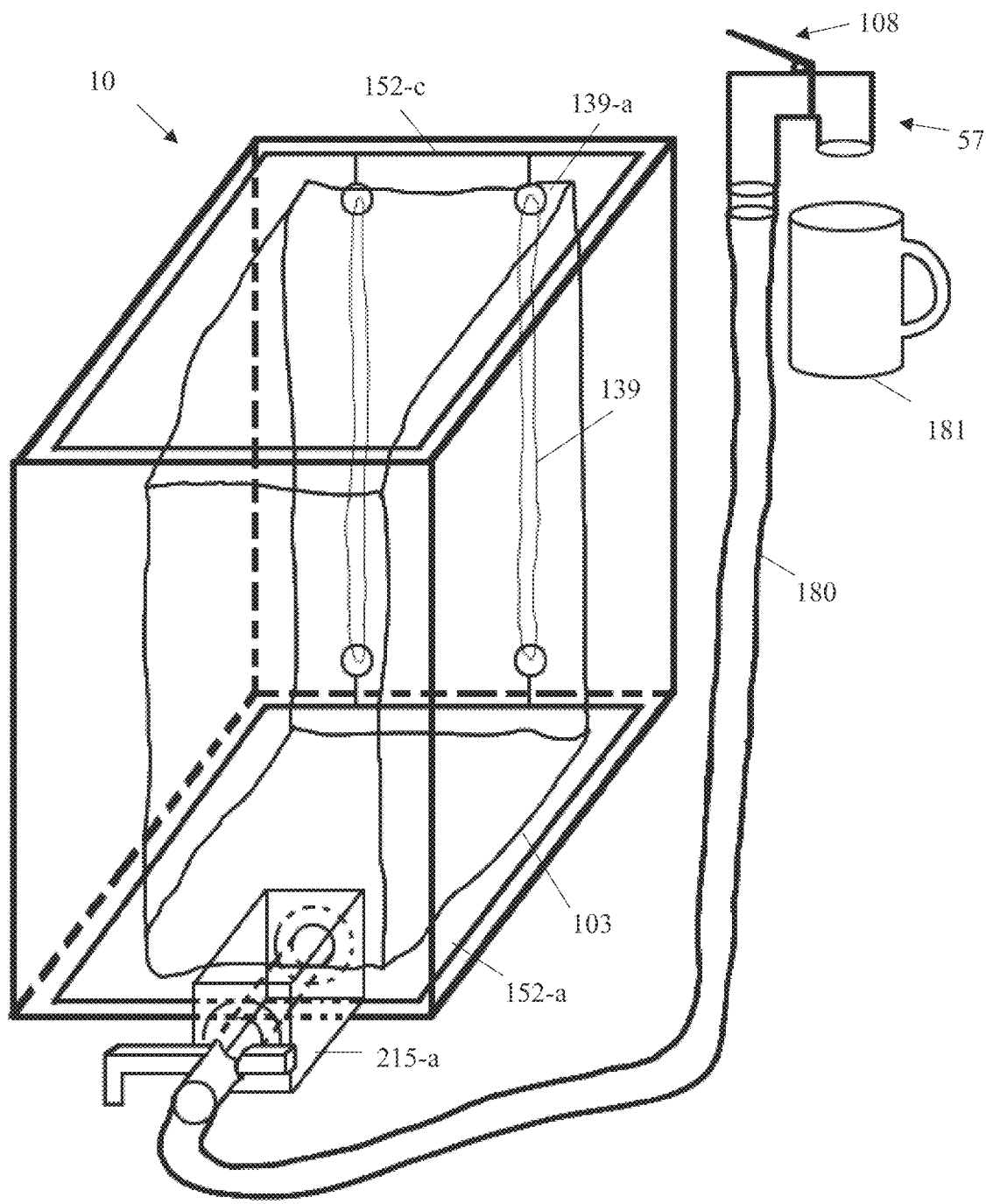
FIG. 27G illustrates another example of a self-propelling keg with a flexible hose connected to a bottom coupling, according to an aspect.

FIG. 27F illustrates a self-propelling keg 10 having a moveable top plate 152-*c* at the top and a stationary bottom plate 152-*a*, and a flexible hose 180, according to an aspect. Again, the keg 10 may include a V-shaped or cylindrical friction female coupling 215-*a* for receiving a corresponding male coupling. The coupling 215-*a* may include a safety relief valve 113-*a* (as seen in FIG. 27B) and may include a petcock valve 102. Similar to the keg shown in FIG. 27D, the beverage bag 103 may be pressed downwards onto the bottom plate 152-*a*, by the downward force of the top plate 152-*c* moving downwards. The top plate 152-*c* and the bottom plate 152-*c* may be held together by eye hooks 139-*a* and bands 139 (shown only in rear of FIG. 27F for visual clarity, and also shown in the example of FIG. 27G) such that the keg 10 may self-propel the contents of the bag 103 as it is emptied. As the top plate 152-*c* presses downwards on the bag 103, the contents of the bag may be propelled through a flexible hose 180, which may be attached to the bag 103 at a joint or hole 181. The hose 180 may then connect to a female coupling 215-*a* through which the contents of the bag 103 may be dispensed. The flexible hose 180 may, as an example, connect to a coupling at the top of the keg 10 with another outer flex hose, which may connect to a gate valve (as shown in FIG. 27G). As shown as an example, the flexible hose 180 may be included inside of the keg 10.

FIG. 27G illustrates another example of a self-propelling keg 10 with a flexible hose 180 connected to a bottom coupling 215-*a*, according to an aspect. Again, the keg 10 may self-propel by a downward-pressing top plate 152-*c*, for example, exerting pressure onto a bag 103. The downward pressure may push a beverage or food out of a coupling petcock valve 215-*a*, which may be located towards the bottom of the keg 10. The coupling 215-*a* may have a flexible hose 180 attached to it, through which a beverage or food may be dispensed as the weight of the bag 103 contents are pushed down by gravity and by the downward force of top plate 152-*c*. With the assistance of the force of gravity, less pressure tension is required on the rubber bands 139. The bands 139 and eyehooks 139-*a* may be provided at one end of the keg 10 or may be provided at more than one end of the keg 10 (shown only in rear of FIG. 27G for visual clarity). The end of the hose 180 may be attached to a pour spout having a gate valve, which may then dispense a food or beverage into a cup 181. As an example, the bag 103 may be capable of holding 10 gallons, the weight of which may be approximately 90 pounds with downward pressure. With downward movement instead of upward, less tension may be exerted on the bands 139. As shown as an example, the flexible hose 180 may be outside of the keg 10.

The beverage bag 103 of FIGS. 27B-27G may be of an elastic type material that may expand. The elasticity may add propulsion force, which may help to lift or push the beverage towards the pour spout 57 or coupling 215-*a*. The keg 10 may have multiple pour spouts 57 such that the user may position the keg 10 in different ways. No external energy source may be needed to propel or dispense a beverage or food from the container when pressure is applied to the beverage bag 103.

It should be understood that any keg 10 may include any combination of couplings, pressure relief safety valves, mixing paddles, and any other feature described herein.

Figure 28A:
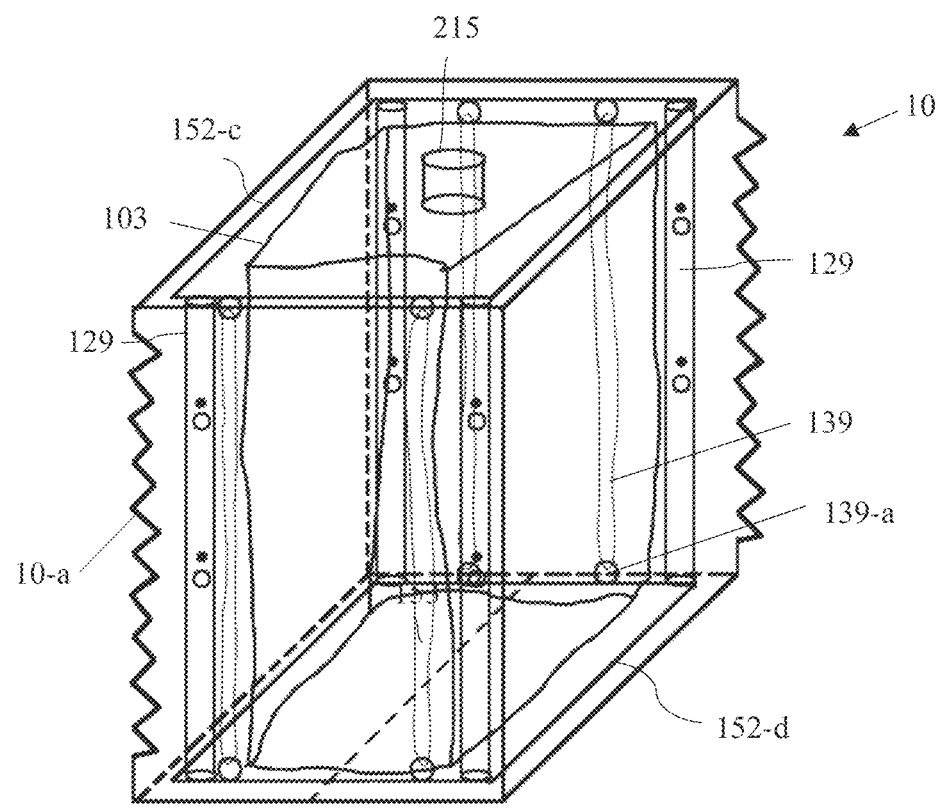
FIG. 28A illustrates a self-propelling keg having telescoping legs and in a filled state, according to an aspect.

FIG. 28A illustrates a self-propelling keg 10 having telescoping legs 129 and an accordion outer shell 10-*a*, in a filled state, according to an aspect. A keg having telescoping legs may or may not have an accordion outer shell 10-*a*. It should be understood that the keg 10 having telescoping legs 129 may also include any of the other features described herein, such as, for example, a coupling 215, and elastic bands 139 and eyehooks 139-*a*. The keg may include a top plate 152-*c* and a bottom plate 152-*d*. The plates may squeeze the inner bag 103 that may contain a liquid or food. As the top plate 152-*c* and bottom plate 152-*d* work together, the inner bag 103 may be squeezed evenly to push all of the contents of the inner bag. The telescoping legs 129 may allow for the keg to be collapsible, to be stored and shipped flat. For example, the outer shell 10-*a* may be flattened or collapsed by using the accordion folds, and then the keg may also be folded into a smaller shape by folding along seams such as seam 153. The telescoping legs 129 may act as stanchion posts, supporting the structure of the keg 10, by connecting to the top plate and the bottom plate inside of the keg 10.

In another example, posts that are fixed in length may be used in place of the telescoping legs 129. When fully extended, the legs 129 may be used to support the vertical stacking of the keg when it is full of products such as beverages or food. The keg 10 may be constructed of any suitable material that may be folded or collapsed, and again, may include seams for collapsing the keg 10, such as at 153. The outer shell 10-*a* of the box may expand similarly to an accordion, due to its accordion-like folds (shown on two edges of outer shell only for clarity), when the legs telescope and extend. When the legs collapse, the accordion box may compress. Thus, the accordion box and telescoping legs may assist in the keg taking up less space than a traditional steel or plastic keg. As an example, a keg 10 may be constructed by folding full folds of box sides over one another, such that an entire side of the keg 10 has two layers of cardboard or any other suitable material the keg may be constructed from. Multiple pieces of the adhesive used to secure the folds may be overlapping with each other for added durability.

Figure 28B:
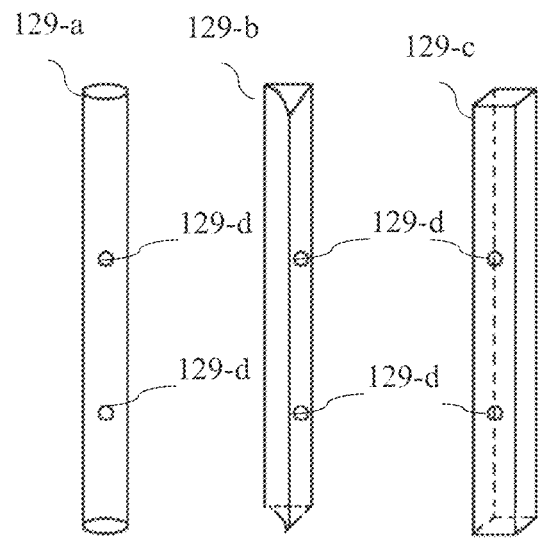
FIG. 28B illustrate three examples of telescoping legs, according to an aspect.

FIG. 28B illustrates three examples of telescoping legs 129-*a*-129-*c*, according to an aspect. The telescoping legs may be constructed in a variety of ways as shown, or in any other suitable design. The legs may also be fixed as an alternative to telescoping. The legs may be constructed from any suitable materials, such as metal, cardboard, bamboo, and so on. The telescoping legs 129-*a*-129-*c* may be locked into a desired length by fitting pegs or pins (not shown) that may be pushed into a hole 129-*d*. The pegs or pins may be spring-loaded and may snap or lock into place when inserted into a hole 129-*d*. The legs may be extendable without being telescoping, such as, for example, by having accordion folds, or any other suitable means.

Figure 28C:
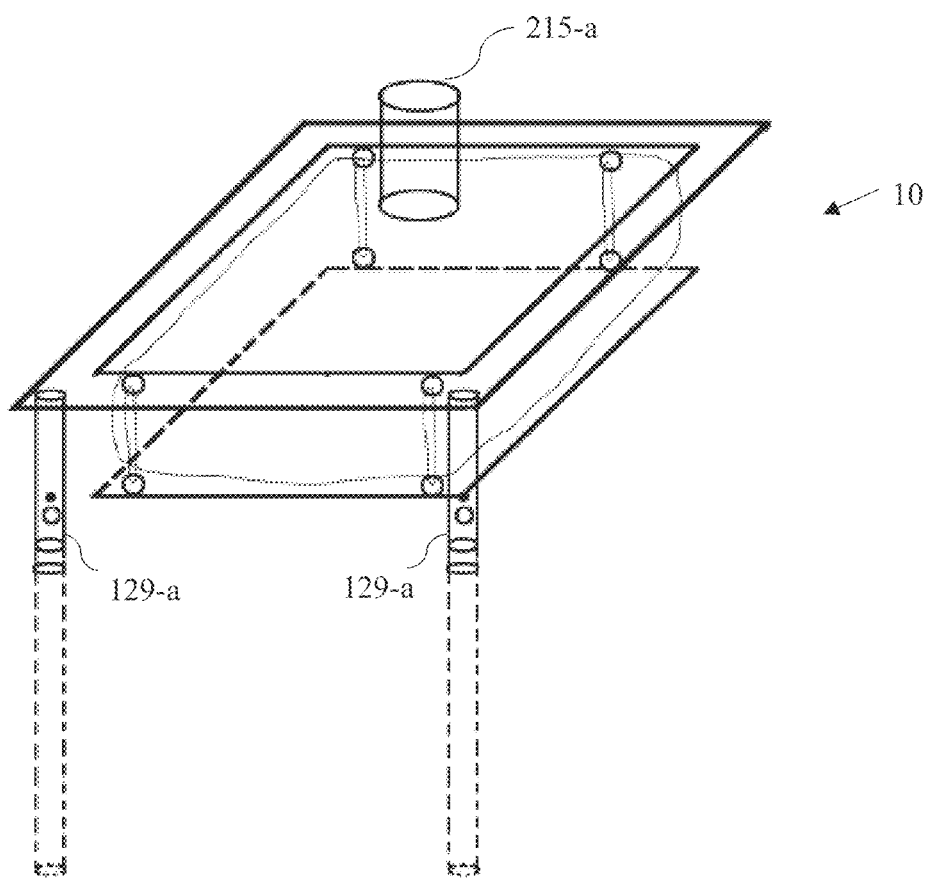
FIG. 28C illustrates an example of a keg in an empty state, with a frame having legs, showing the telescoping feature of the legs, according to an aspect.

FIG. 28C illustrates an example of a keg 10 in an empty state, with a frame having legs, showing the telescoping feature of the legs, according to an aspect. The telescoping legs 129 may be used for collapsing or folding the keg 10 such that the keg may be shipped or stored in a flat state, in an accordion box or flat packed in a folding box.

Figure 29A:
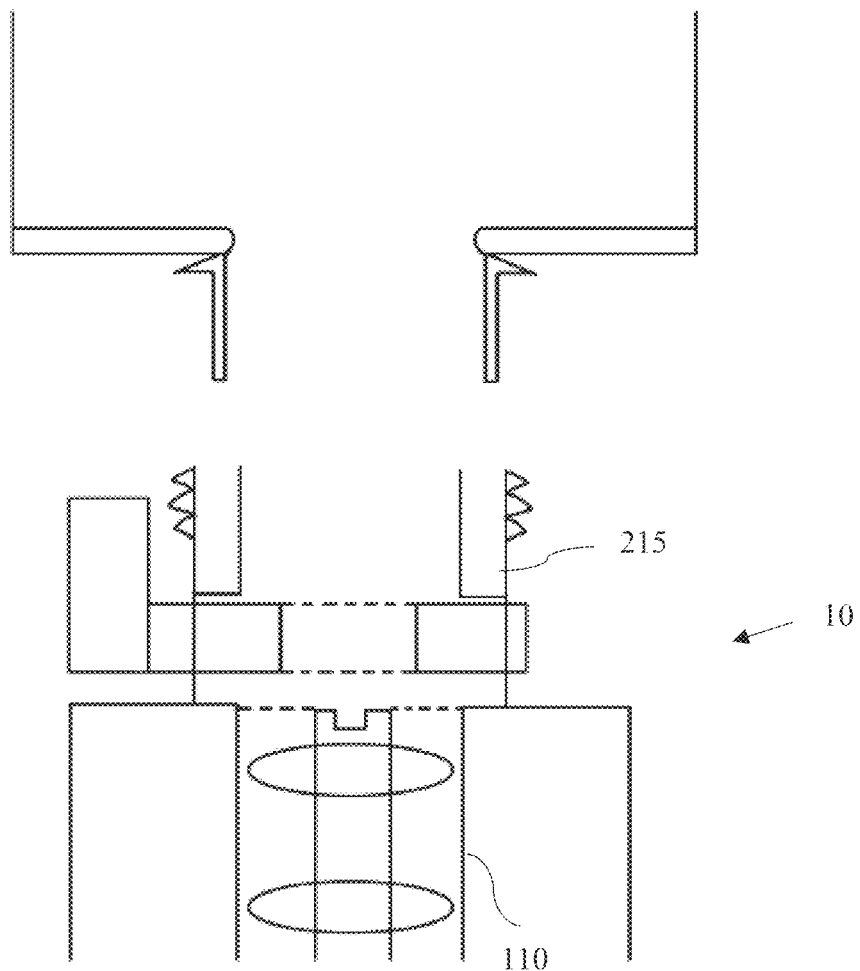
FIG. 29A illustrates a detailed partial side view of the keg of FIG. 22C, which may include an alternative example of a top opening and friction coupling, according to an aspect.

FIG. 29A illustrates a detailed partial side view of the keg 10 of FIG. 22C, which may include an alternative example of a top opening and friction coupling 215, according to an aspect.

Figure 29B:
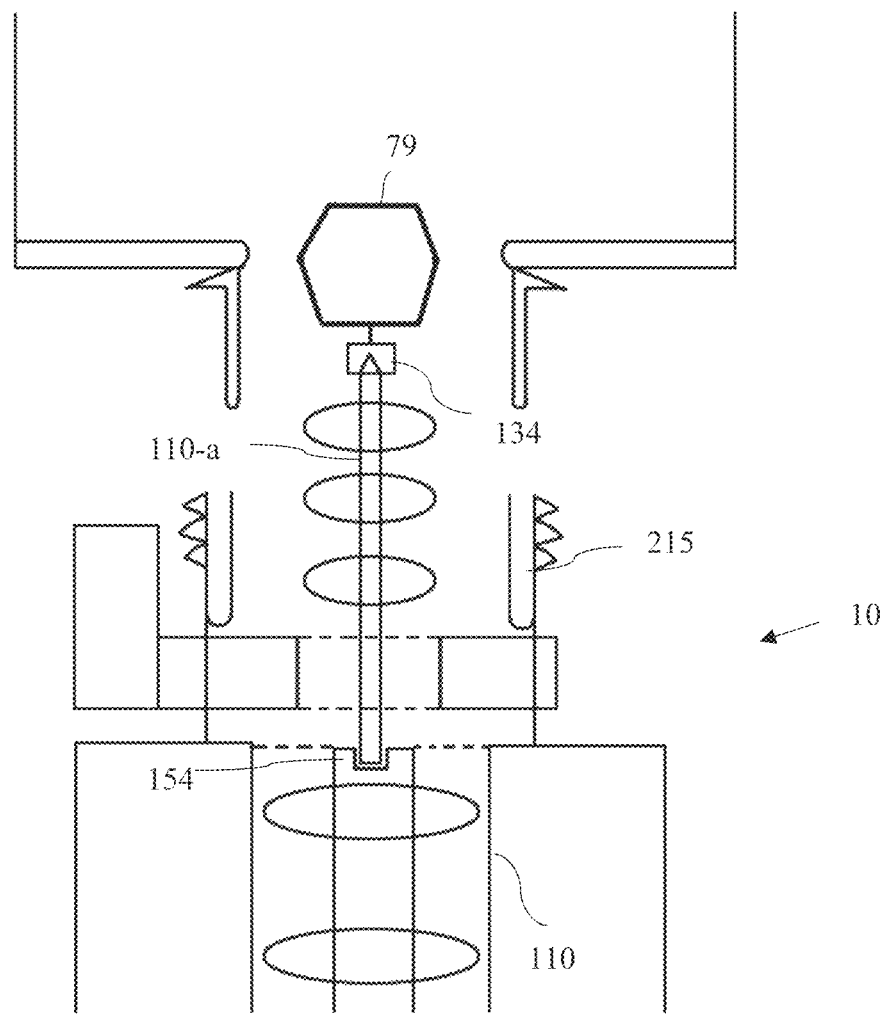
FIG. 29B illustrates a detailed partial side view of the keg as shown in FIG. 29A, with a motor and upper auger coupling associated with the auger, according to an aspect.

FIG. 29B illustrates a detailed partial side view of the keg 10 as shown in FIG. 29A, with a motor 79 and upper auger 110-*a* coupling associated with the auger 110, according to an aspect. The motor 79 may be associated with a fin pin 134, which may connect with an upper auger 110-*a*. The upper auger 110-*a* may be the driving auger and may drive the auger 110. The friction coupling may be a vertical slot and may be cylindrical, with a sleeve where the top fin-pump male friction coupling glides into the sleeve slot 154 of the keg 10, similar to a male coupling into a female coupling. The wide opening of the fin male vertical coupling may be needed to allow the auger screw conveyer 110 to move in and out of the keg and connect to the lifting auger screw conveyer, and may also allow the driving auger to connect to the lifting auger in the keg.

Figure 30A:
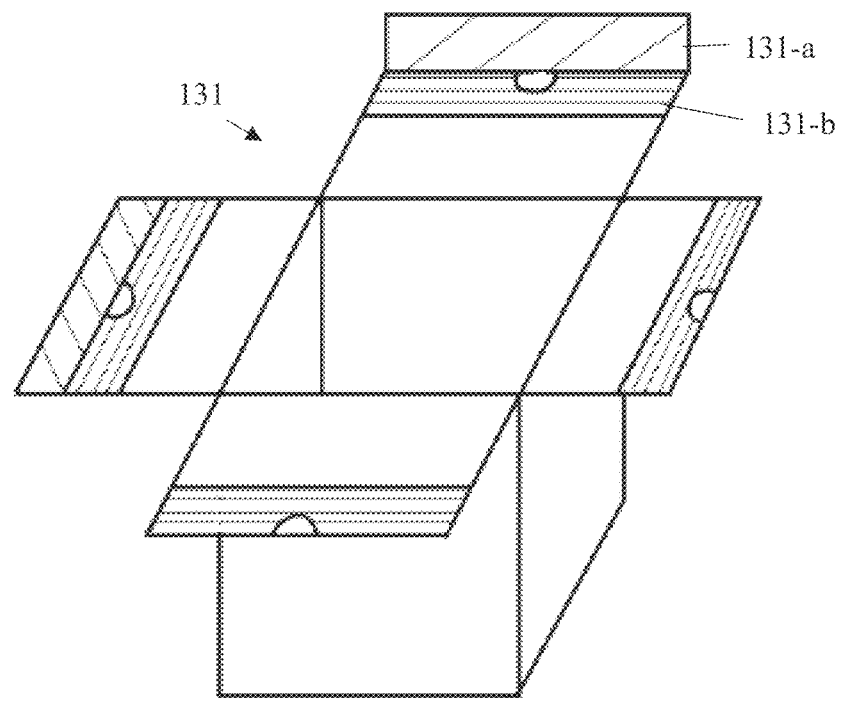
FIGS. 30A-30B illustrate a box, with the top unfolded and partially folded, respectively, constructed of bio-cardboard that may make up the outer shell of a keg, which may have a bio-plastic bag or bio-plastic bottle inside, according to an aspect.
Figure 30B:
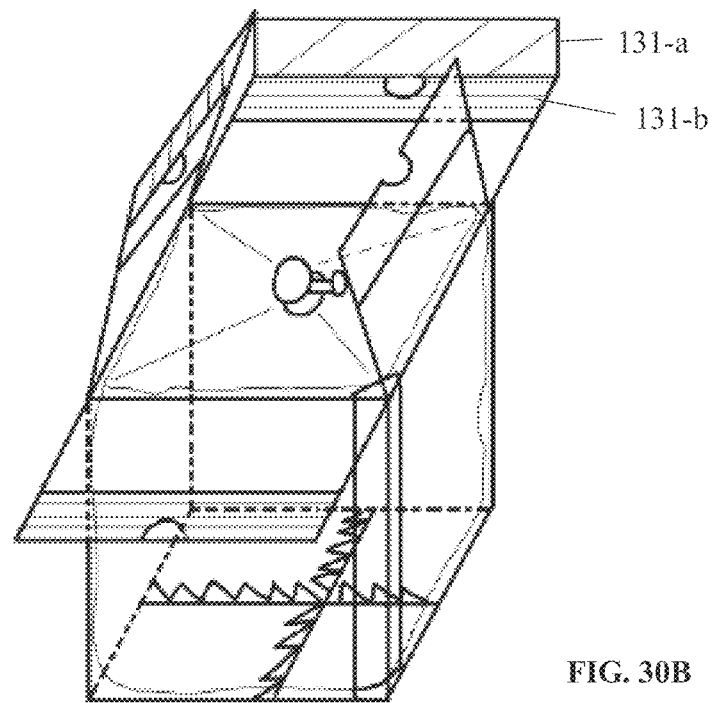

FIGS. 30A-30B illustrate a box 131, with the top unfolded and partially folded, respectively, constructed of bio-cardboard that may make up the outer shell 131 of a keg, which may have a bio-plastic bag or bio-plastic bottle inside (shown only in FIG. 30B for clarity), according to an aspect. The bio-cardboard keg may be printed with eco-friendly ink and eco-friendly glue or tape strips. Where adhesive is pre-applied to the box flaps or folds, as shown by 131-*a* and 131-*b*, a protective film may be placed over it and removed when the adhesive is needed. The protective film may be biodegradable. An advantage of the box may be that the beverage contained inside may be protected from UV sunlight. An advantage of the adhesive may be that boxes may be flat packed for storage or shipping and later easily assembled. An advantage of having overlapping strips of adhesive 131-*a* and 131-*b* may be that the strength of the box is increased. The boxes may be constructed such that a user may assemble the boxes when needed and may be folded along seams and glued or taped together with pre-applied glue or tape strips, for example. The folds of the box may overlap such that the strength of the box is increased. The box may include telescoping legs (as shown by 129-*a* in FIGS. 28B-28C) that allow for the box to be collapsed flat, and then re-assembled by the user. An advantage may be that a separate tape dispenser and/or knife for tape is not needed by the user.

Figure 31A:
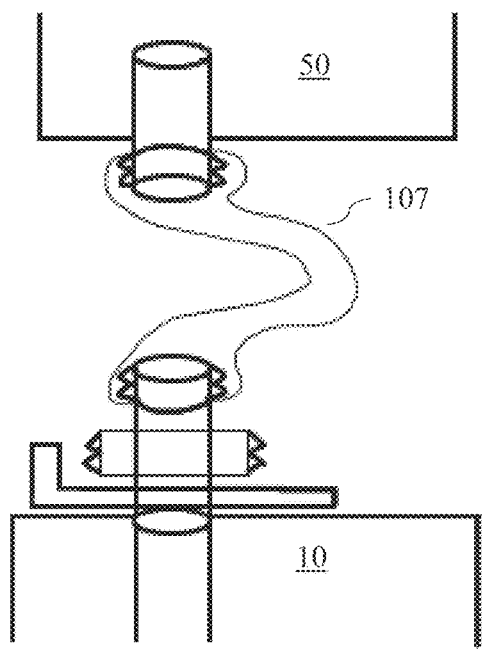
FIG. 31A illustrates a partial sectional side view of a keg connected to a beverage dispenser by a flexible bioplastic or rubber hose/tube, according to an aspect.

FIG. 31A illustrates a partial sectional side view of a keg 10 connected to a beverage dispenser by a flexible bioplastic or rubber hose/tube 107, according to an aspect. The bio-plastic friction coupling of the hose/tube 107 on the keg 10 may be pushed on or pulled off.

Figure 31B:
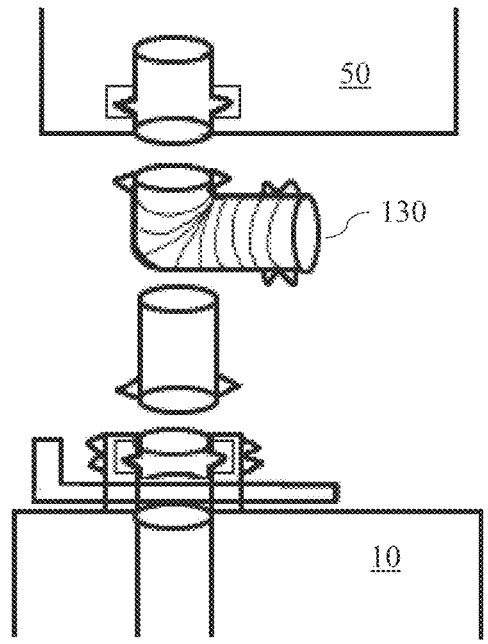
FIG. 31B illustrates a bio-plastic elbow, which may be used where space is limited in the beverage dispenser, according to an aspect.

FIG. 31B illustrates a bio-plastic elbow 130, which may be flexible, which may be used where space is limited in the beverage dispenser, connecting a dispenser 50 with a keg 10, according to an aspect. An advantage may be that the elbow allows flow of liquids where a hose/tube 107 may restrict liquid flow if bent at an angle. The keg 10 may include a straight twist lock coupling as part of the pump housing or as part of the keg pour spout opening.

Figure 31C:
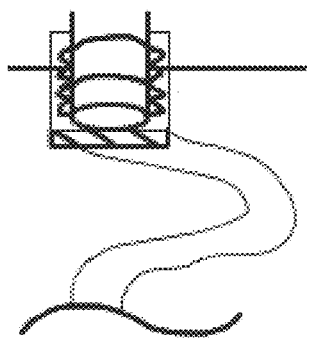
FIG. 31C illustrates a partial side view of a hose that may be attached to a screw-on cap, according to an aspect.

FIG. 31C illustrates a partial side view of a hose 107 that may be attached to a screw-on cap 11, according to an aspect. The hose 107 may allow for both horizontal and vertical product flow.

Figure 31D:
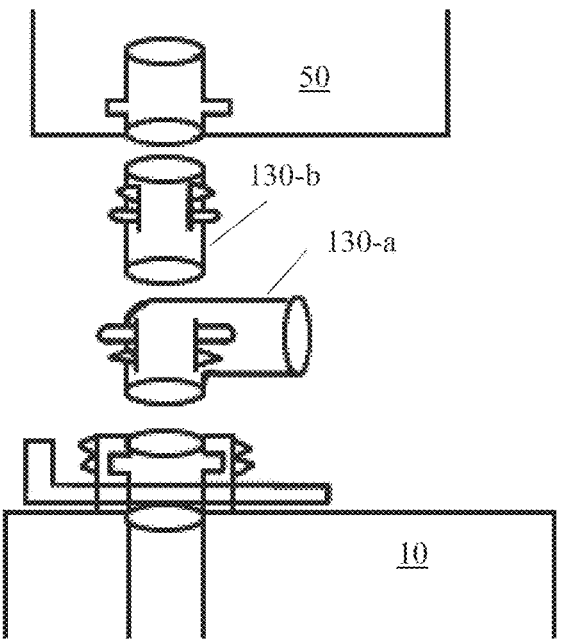
FIG. 31D illustrates a partial side view of an elbow that may be used for connecting a dispenser with a keg, according to an aspect.

FIG. 31D illustrates a partial side view of an elbow 130-*a* that may be used for connecting a dispenser 50 with a keg 10, according to an aspect. A fixed vertical elbow piece 130-*b* may allow for vertical product flow, and a bent elbow 130-*a* may be used for horizontal and vertical product flow between a dispenser 50 and a keg 10. Individual pieces used for connecting a dispenser 50 with a keg 10 may snap together and lock, for example, or may be connected by any other suitable means.

FIG. 32A illustrates a side view of a bottle 127 fitted with a bio-plastic pour spout with a manually operated nozzle 138 having a gate valve 108, according to an aspect. The pour spout may be connected to a bioplastic or bio-rubber hose 107 which may be connected to a screw on male V-friction coupling which may be received by a corresponding female V-friction coupling. The male coupling may include a petcock valve 102. This gate valve 108 pour spout 138 with gate valve 108 may be used with any keg whether the keg operates by gravity flow or self-propulsion. A keg or water bottle may also use a bio-plastic bladder bag liner ("bladder bag," "bladder bag liner," "balloon bladder," or "bladder liner") 133 inside of the keg or water bottle, to create a self-propulsion system. The keg or bottle using a rubber balloon self-propulsion system may be capable of holding ½ gallon to 10 gallons, for example, and or may be shaped and sized like small bottle and be capable of holding 12 ounces to 24 ounces, for example. The bio-plastic pour spout may be used with any existing bottle or container in standard market packaging.

FIG. 32B illustrates a bottle 127 with a bio-plastic screw-on top that may be used with a bottle 127 for storing or shipping, according to an aspect. The bottle may include a petcock valve 102 and may include a rubber balloon bag 133 for self-propulsion.

FIG. 32C illustrates an airtight seal such as a male friction coupling pour spout, which may be V-shaped or cylindrical, having a gate valve 108, which may include a petcock valve 102, and finger pull tabs 127-a for pulling over a spout, according to an aspect. The hose may include a bio-plastic ribbed surface, such as, for example, ribbed ridges, to accommodate a tight connection of the hose to the fitting, and may be pulled over another container, such as, for example, the opening and threads of a bottle neck, and may be used, for example, with any existing bottle such as for soda, water, beer, wine, and so on.

FIG. 32D illustrates an airtight seal bottle cap and pour spout 136 that may be used with any existing bottle, such as, for example, a wine, champagne, or water bottle, according to an aspect. The bottle cap pour spout 136 may include a gate valve 108 and a lever 137 for manual operation of the spout. The pour spout 136 may also include finger pull tabs 127-a.

FIGS. 33A-33B illustrate side views of a cylindrical friction coupling, having a male coupling 215-a and female coupling 215 in a coupled state and uncoupled state, respectively, that may be used with a keg, according to an aspect. In order to assist in an airtight seal, the male cylindrical coupling 215-a may be inserted into the female cylindrical coupling 215 and also may slide into a channel sleeve 167 that is deeper inside of the female cylindrical coupling 215. The channel sleeve 167 may be even with the leading edge of the female cylindrical coupling 215. An advantage may be that the cylindrical coupling may be more adaptive to the operation of the petcock valve and auger shaft, which may allow for better control of soft serve food, for example. The coupling may also be a rounded bull nose type coupling, as shown by 215-b, which may be in a U-shape, for better airtightness.

The cylindrical coupling may include metal plates where a metal-to-metal seal may take place, between a stainless-steel male cylindrical coupling and a female stainless steel cylindrical coupling. The components may also be constructed from polymer plastic materials, for example, and may have flexible semi-plastic rubber seals where the male and female components meet.

Figure 33C:
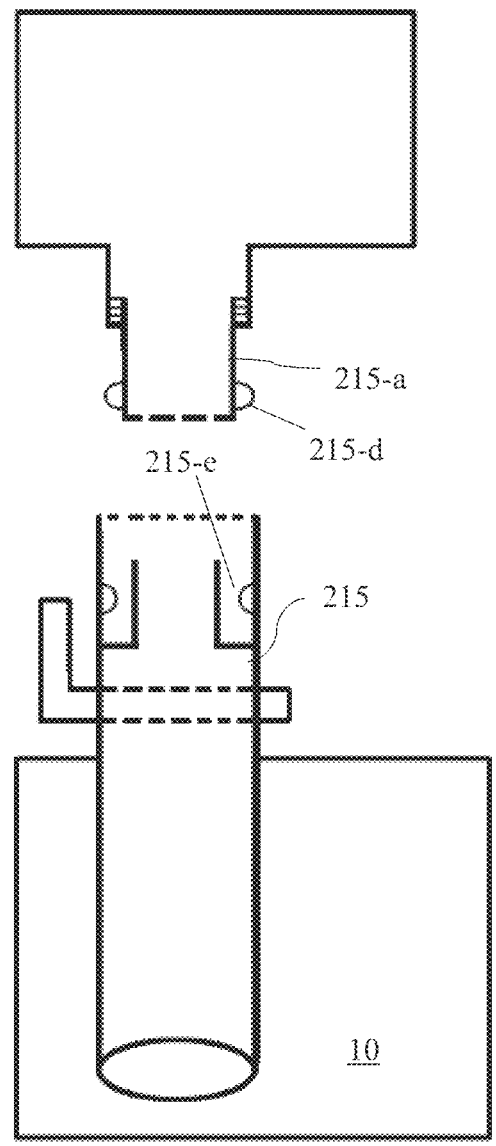
FIG. 33C illustrates a side view of another example of cylindrical friction coupling in an uncoupled state that may be used with a keg, according to an aspect.

FIG. 33C illustrates a side view of another example of cylindrical friction coupling with a female friction coupling 215 and a corresponding male friction coupling 215-a in an uncoupled state that may be used with a keg 10, according to an aspect. The coupling may for example snap and lock into place into a receiving channel. Snap pins 215-d may fit into snap pin cavities 215-e. Flexible rubber washers which may be constructed from rubber, for example, may be placed at the top of the channel to create an airtight barrier. Pins may also be used or a sleeve in the channel to create airtightness.

Figure 33D:
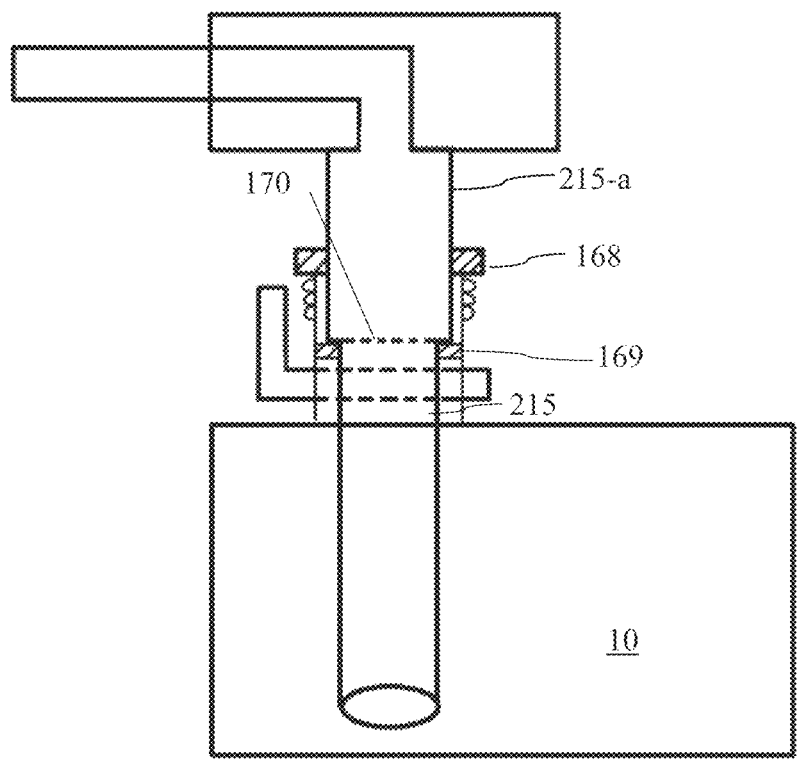
FIG. 33D illustrates a cylindrical coupling having a female friction coupling and a corresponding male friction coupling, with friction plates that may be used with a keg, according to an aspect.

FIG. 33D illustrates a cylindrical coupling having a female friction coupling 215 and a corresponding male friction coupling 215-a, with friction plates 170 that may be used with a keg 10, according to an aspect. With the use of the friction plates 170, the male coupling may not need to go into the female coupling, and instead, a seal may be provided by weight and friction. As another example, instead of a seal taking place with the sides of the male and female couplings, the airtight seal may be caused by a side shaft gasket plate on the male coupling and a bottom rubber seal or gasket at the end of the male coupling adjacent to a female flat plate. The friction plates 170 may be sandwiched between other elements in order to ensure a tighter seal, such as, for example, a gasket 169, a rubber seal 168, or any other suitable means for an airtight seal. The two friction plates 170 may be pressed together by weight, and the gasket 169 and rubber seal 168 may be flexible. The presence of the friction plates 170 may also allow for the channel of the female coupling 215 to be smaller.

Figure 33E:
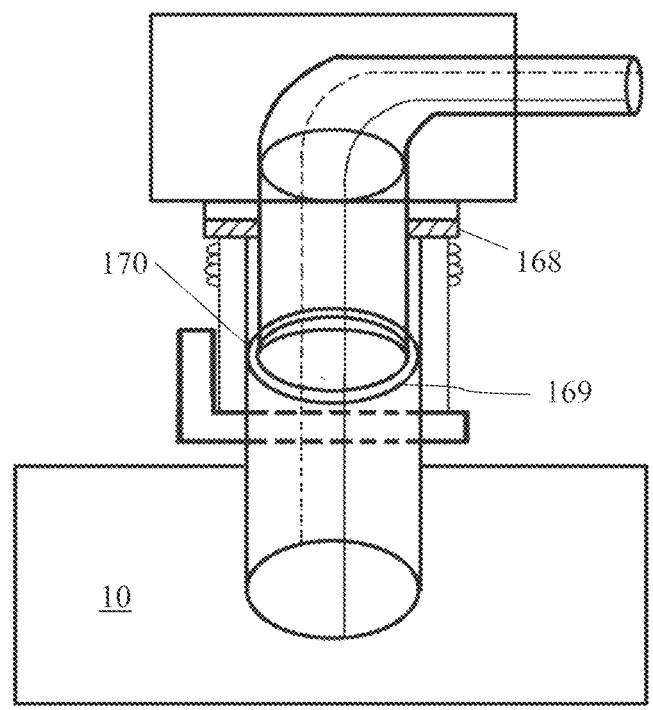
FIG. 33E illustrates a detailed view of the cylindrical coupling of FIG. 33D showing friction plates with a gasket, according to an aspect.

FIG. 33E illustrates a detailed view of the cylindrical coupling of FIG. 33D showing friction plates with a gasket 169, according to an aspect. The gasket 169 may allow for a tighter seal of the coupling. The bottom seal created by the friction plate 170 is also shown, and the rubber seal 168 at the top of the channel.

Figure 33F:
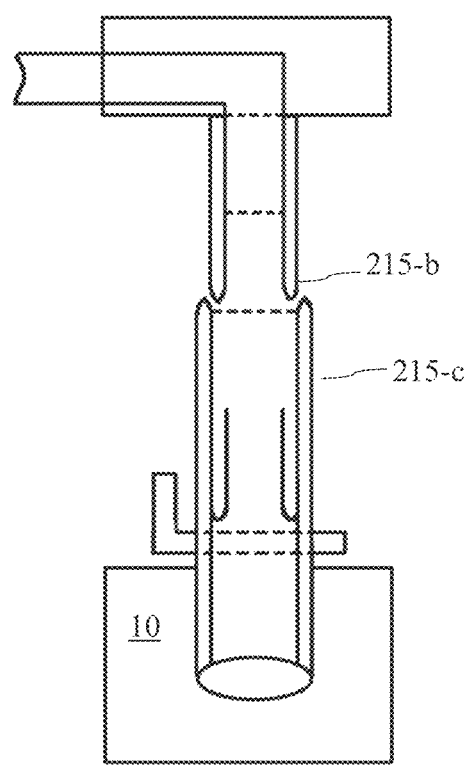
FIG. 33F illustrates a detailed view of the cylindrical coupling of FIGS. 33A-33B having a female bull nose or dolphin nose coupling and a corresponding male bull nose or dolphin nose coupling.

FIG. 33F illustrates a detailed view of the cylindrical coupling of FIGS. 33A-33B having a female bull nose or dolphin nose coupling 215-c and a corresponding male bull nose or dolphin nose coupling 215-b. The bull nose or dolphin nose shape may allow for better guiding of the male friction coupling 215-b while entering the female bull nose or dolphin nose friction coupling 215-c. The rounded U-shape of the bull nose or dolphin nose may have more surface area at the point than a V-shaped point, which may allow for a better and tighter seal. The better and tighter seal by a bull nose or dolphin nose may also prevent liquids from spilling out around the point of contact. An advantage may be that the airtightness may extend the shelf life of liquids or foods contained within the keg. Another advantage may be that a bull nose type coupling is universal and may be used with many different types of kegs or containers and may allow the use of an auger conveyer within the container for a more even flow of the liquid or food inside.

Figure 34:
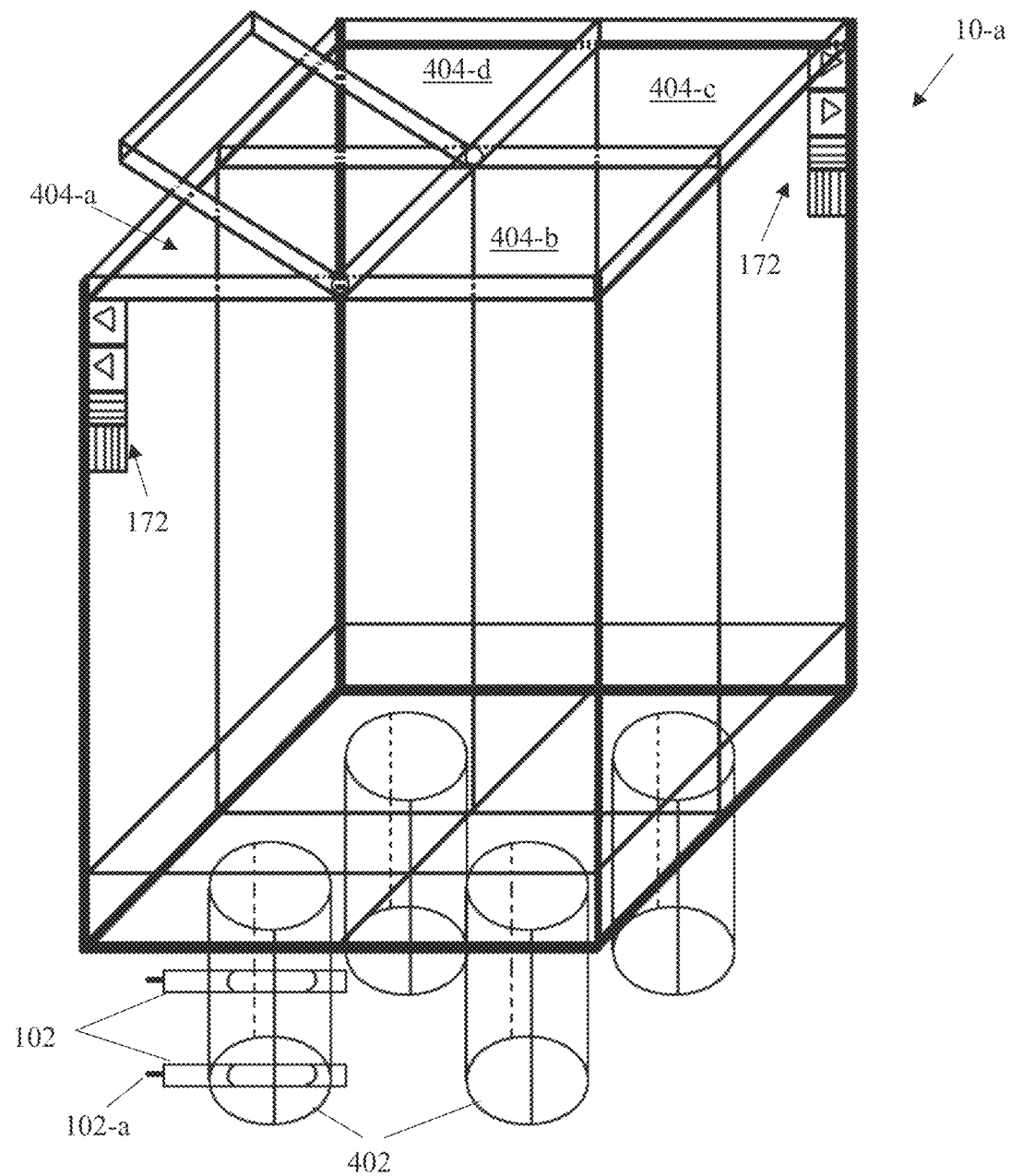
FIG. 34 illustrates a multi-use keg that may include multiple pods, according to an aspect.

FIG. 34 illustrates a multi-use keg 10-a that may include multiple pods ("pods" or "chambers") 404-a-404-d, according to an aspect. As shown as an example, one multi-use keg 10-a may include four pods 404-a-404-d. A pod 404-a may include a chamber 402 having a petcock gate valve 102 (shown only in pod 404-a for visual clarity), and may include two petcock valves 102, which may be automatically opened by, for example, a stepper motor and may regulate flow of the keg contents. The gate valve may allow added flavor ingredients to flow from the main reservoir of the keg 10-a into a second reservoir chamber for mixing, which may be, as an example, ½ ounce to 2 ounces in capacity. The gate valve may include a fin 102-a, which may jut out as a plate, and may be at a 90-degree angle to the gate valve 102 and may perform the action of a handle at the end of the petcock valve.

Each pod 404-a-404-d may also include an auger to assist in keeping product thoroughly mixed, as shown in FIG. 22C. An auger may be omitted for liquids or may, alternatively, be included when using a keg 10-a for thicker foods.

The keg 10-a may include a lift lid that may be secured or opened with any suitable means, such as, for example, a hinge with a push button locking latch, for opening a pod 404-a and inserting a beverage or food to be dispensed.

The keg 10-a may include at least one scanner 172 for reading bar codes, QR codes, radio-frequency identification (RFID) near field communication (NFC), and any other similar machine-readable data. The scanner 172 may therefore be able to read information about the contents of each chamber 404-a, such as, for example, ingredients, the amount of sugar, recipes including the contents of the chamber, volume of each ingredient, and so on.

It should be understood that any of the materials used for constructing the keg may be biodegradable, such as, for example, bioplastic that may be recycled by single-stream recycling processes.

It should be understood that a friction coupling in any of the above examples may be V-shaped or cylindrical, the male and female couplings corresponding with one another.

Figure 35A:
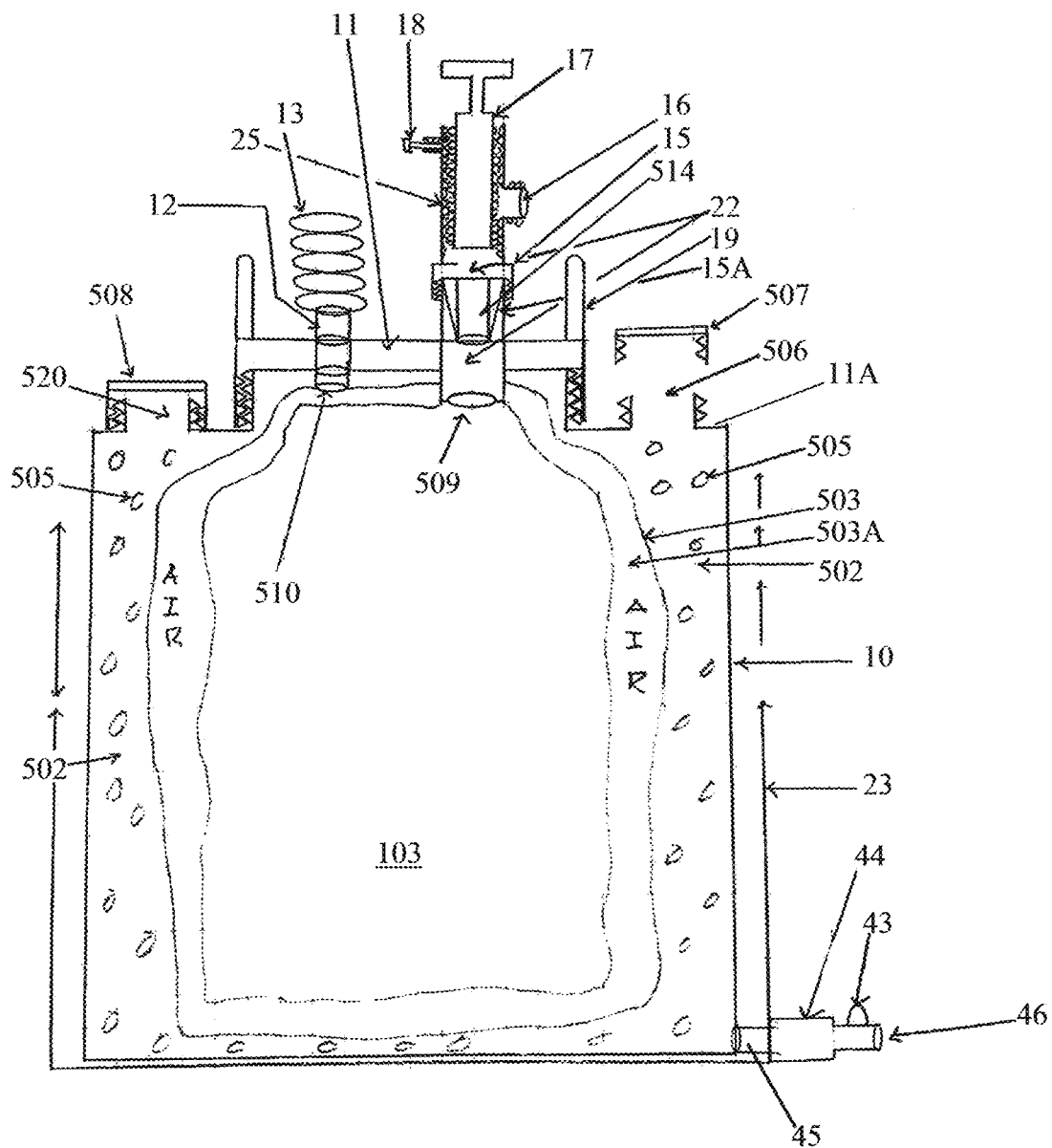
FIGS. 35A-35B illustrate a front sectional view and a top sectional view, respectively, of a container or keg having an ice chamber and an air bag, according to an aspect.
Figure 35B:
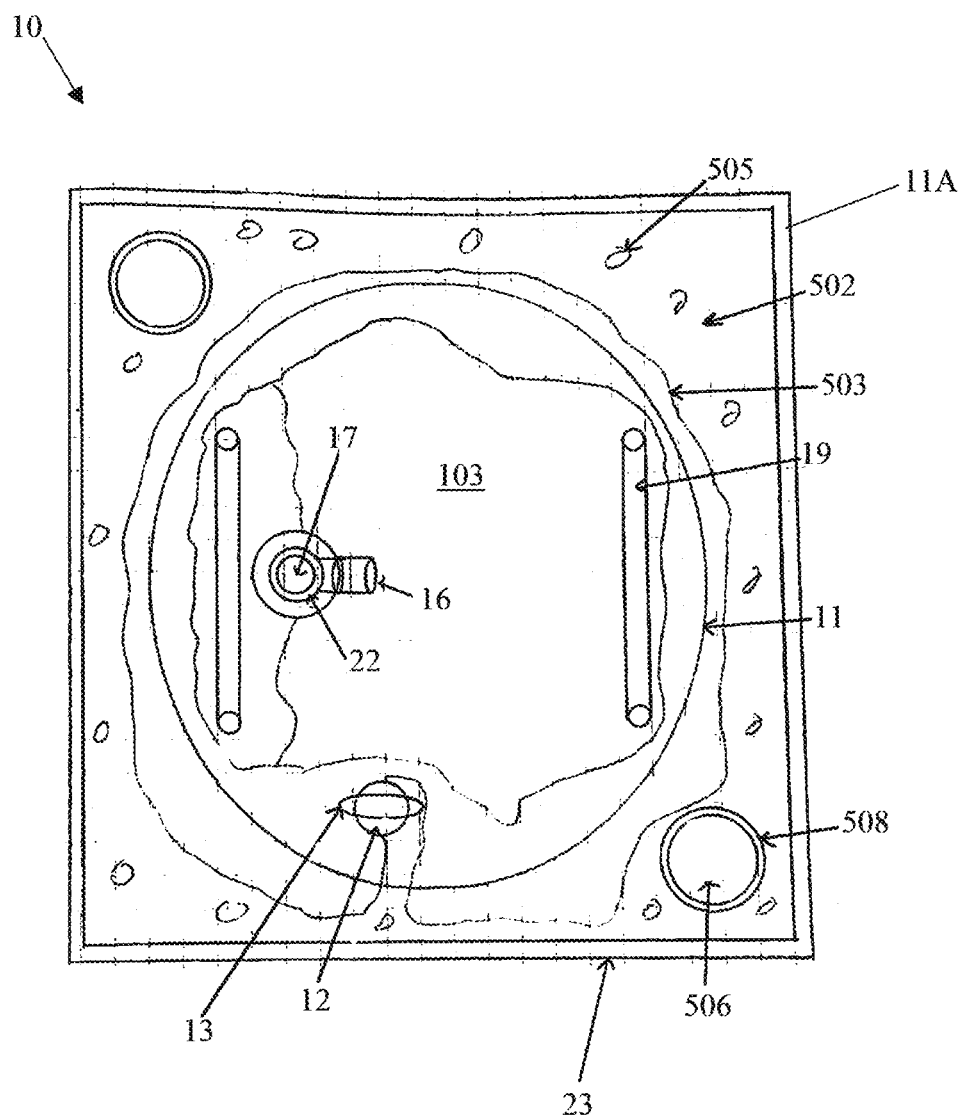

FIGS. 35A-35B illustrate a front sectional view and a top sectional view, respectively, of a container or keg 10 having an ice chamber 502 and an air bag 503, according to an aspect. As shown, the container 10 may also be provided with a beverage bag 103 that may be filled with a beverage or soft food product, as an example, or may alternatively dispense such contents. As shown in FIGS. 35A-35B, the ice chamber 502 may house a plurality of ice cubes or chunks 505 that cool down the beverage or food in the bag 103, and keep the beverage or food chilled during use of the container 10. As will be discussed in further detail later in this disclosure, the container 10 may allow a user to enjoy chilled beverages or food that is free of microplastics, wherein the container 10 operates in a casual outdoor setting like a picnic or a barbeque.

As shown in FIGS. 35A-35B, the container 10 may also be provided with ice portals 520, 506 for filling the ice chamber 502 with ice 505, as an example. As shown in FIG. 35A, each ice portal 520, 506 may be provided with a threaded cap 508, 507 that may be removable. As an example, the threaded cap 507 may be removed from the ice portal 506 to fill the right half of the ice chamber 502 with ice 505 in order to primarily chill the right side of the beverage bag 103. Similarly, the threaded cap 508 may be removed from the ice portal 520 to fill the left half of the ice chamber 502 with ice 505, as shown as an example. It should be understood that, although two ice portals are depicted in FIGS. 35A-35B, more or fewer ice portals may be provided with the container 10 to fill the ice chamber 502 with ice 505.

The container or keg 10 may also be provided with a beverage bag portal connector 509, as shown in FIG. 35A as an example. The beverage bag portal connector 509 may attach to the beverage bag 103, as shown, and functions as the sole attachment point between the container 10 and the bag 103. As an example, the beverage bag 103 may be manufactured from environmentally friendly, plant-based bioplastic. The bioplastic may provide the beverage bag 103 with a moisture barrier and an oxygen barrier, since the beverage bag 103 is only attached to the keg 10 at the portal connector 509. Thus, an advantage is that the single connection point at 509 gives the beverage bag 103 the flexibility to move and adjust within the keg 10, and also allows ice 505 to be firmly packed around the flexible bags 103, 503.

As shown in FIG. 35A, the container 10 may also comprise an air bag portal connector and air hose 510, as an example. The air bag portal connector and air hose 510 may attach to the air bag 503, as shown, and functions as the sole connection point between the container 10 and the bag 503. As shown, the ice chamber 502 is formed by the volume between the beverage bag 103, the air bag 503 and the walls 23. As an example, the air bag 503 may be manufactured from environmentally friendly, plant-based bioplastic. As shown, the air bag 503 may fully surround the beverage bag 103, such that as air enters the air bag 503, the air chamber 503A expands, causing beverage or food within the beverage bag 103 to be dispensed. Thus, an advantage is that the single connection point at 510 gives the air bag 503 the flexibility to move and expand within the keg 10, allowing the air chamber 503A to exert the optimum pressure onto the beverage bag 103 to force the beverage bag 103 to dispense its contents.

It should be understood that the air bag may be placed anywhere within the container, such that the air bag is adjacent to the beverage bag. As an example, the air bag 503 may be positioned below the beverage bag 103 (e.g., with a long air hose 510), such that when air is pumped into the air bag, the air bag applies upward pressure onto the beverage bag, forcing the beverage bag to dispense its contents.

The container 10 may also be provided with a threaded removable container cap 11, as shown in FIGS. 35A-35B. The threaded container cap 11 may seal the contents of the container or keg 10, such as the air bag 503 and the beverage bag 103, as shown. Upon assembly of the container 10, as an example, the container cap 11 may be removed, exposing the hollow chamber of the container. The beverage bag 103 may be placed in the container 10 and secured to the beverage bag portal connector 509. The air bag 503 may then be placed around the beverage bag 103 and secured to the air bag portal connector and air hose 510, as an example. Then, the threaded container cap 11 may be reattached to the opening of the container 10, thus sealing the components inside.

As shown in FIGS. 35A-35B, the threaded removable container cap 11 may be provided with an air hole portal 12, as an example. The keg or container 10 may also be provided with an air pump bellows 13 that connects to the air hole portal 12, as shown. As an example, a user may pump air into the air bag 503 through the air hole portal 12 by contracting and expanding the air pump bellows 13. As discussed previously above, pumping air into the air bag 503 expands the air chamber 503A and causes beverage or food within the bag 103 to be pushed upward out of the beverage bag 103, as an example. The threaded container cap 11 may also be provided with lifting handles 19 that may aid in the removal of the threaded cap 11, as well as the general movement and positioning of the container 10 as a whole, as an example.

As shown in FIG. 35B, the removable container cap 11 may form a central part of the top 11A of the container 10, provided with an ice chamber portal 508 diagonally on either side of the cap 11. The container cap 11 may form the center of the container top 11A in order to keep the beverage and air bags 103, 503 in, or approximately in, the center of the container, as an example. As shown in FIG. 35B, maintaining the bags 103, 503 in the center of the container allows even distribution of ice around the bags, providing a uniform cooling effect to the free-flowing contents in the beverage bag 103, as an advantage.

The container 10 may also be provided with a top beverage flow system comprising a threaded adjustable gate valve 17, a gate valve stopper 18, a gate valve shaft 25, a beverage flow portal 16, a beverage filter cap 15, a beverage filter housing 15A, a beverage filter 514 and a beverage flow tube 22, as shown. As shown in FIGS. 35A-35B, the beverage flow tube 22 may extend from the beverage bag portal connector 509 up to the gate valve shaft 25. As will be discussed in further detail below, beverage or food being forced out of the bag 103 may travel up through the beverage flow tube 22 for dispensing out of the container 10. The beverage filter 514 may be positioned within the beverage filter housing 15A, which is encased within the flow tube 22, as shown. The beverage filter cap 15 may seal the beverage filter 514 within the filter housing 15A, as an example, and may hold the filter 514 in place. As an example, the filter cap 15 may be removed in order to clean or replace the filter 514.

The filter housing 15A may be conically shaped, as shown, in order to establish a tight fit for the filter 514 within the housing 15A, such that beverage or food flowing through the flow tube 22 must pass through the filter 514.

Thus, an advantage is that beverage or food passing through the filter may be filtered, resulting in beverage or food that is free of potential contaminants like microplastics that are commonly found in beverages, lead, or other potentially harmful chemicals or bacteria.

The beverage flow portal 16, shown in FIGS. 35A-35B, allows beverages to flow out, or alternatively into, the container 10, as an example. The positioning of the portal 16 in the gate valve shaft 25 above the filter 514 allows beverages to be filtered when dispensing out of the keg 10, or alternatively allows beverages to be filtered upon entering the keg 10. As such, a beverage may be filtered a minimum of two times before being consumed by the user, since the beverage is filtered upon filling the container and again upon dispensing. As will be discussed in further detail later in this disclosure, a friction coupling with a filling hose may be attached to the beverage flow portal 16 to allow beverages or food to be dispensed out of the container 10, or alternatively, to be filled into the container 10.

The gate valve shaft 25, shown in FIG. 35A, may be provided with threads to form a friction fit with the threaded adjustable gate valve 17, as an example. As shown, the gate valve shaft 25 may also comprise the gate valve stopper 18 to lock the vertically moving gate valve 17. As an example, the gate valve shaft 25 allows the gate valve 17 to traverse in order to expose the beverage flow portal 16. The gate valve stopper 18 prevents the user from completely unthreading the gate valve 17, which would cause the beverage to flow out through the top of the shaft 25, rather than the flow portal 16. Thus, an advantage is that the user is prevented from completely removing the gate valve 17, which ensures the user may properly fill or dispense the container contents, reducing the amount of any wasted beverage or food. It should be understood that the gate valve stopper 18 may be any suitable stopping means, and may be threaded, push-pinned, friction locked, etc.

As shown in FIG. 35A, the keg 10 may also be provided with a water filter pour spout 44 disposed through the outer wall 23 of the keg 10, as an example. The outer wall 23 of the keg may be made of any recyclable and/or eco-friendly material, such as cardboard, as an example. As shown, the outer wall 23 may be smooth and flat, as opposed to the curved wall of traditional steel kegs. Thus, an advantage is that the flat outer wall allows for easy brand advertising via stickers, printed labels, etc. The water filter pour spout 44, shown in FIG. 35A, may connect to the ice chamber 502 via an ice chamber portal 45, and may be provided with a push button 43 and pour spout nozzle 46. During use of the container 10, the ice 505 inside the ice chamber 502 may naturally melt over time. Rather than pouring out and potentially wasting the melted ice water, the water filter 44 may allow for the filtering of the ice water to make it suitable for consumption. As an example, once the contents of the beverage bag 103 have been completely emptied, the user may actuate the push button nozzle 43 to release the ice water passing through the water filter 44. The filtered ice water may then be dispensed out of the pour spout 46 into a separate bottle, cup, or other container.

Figure 36:
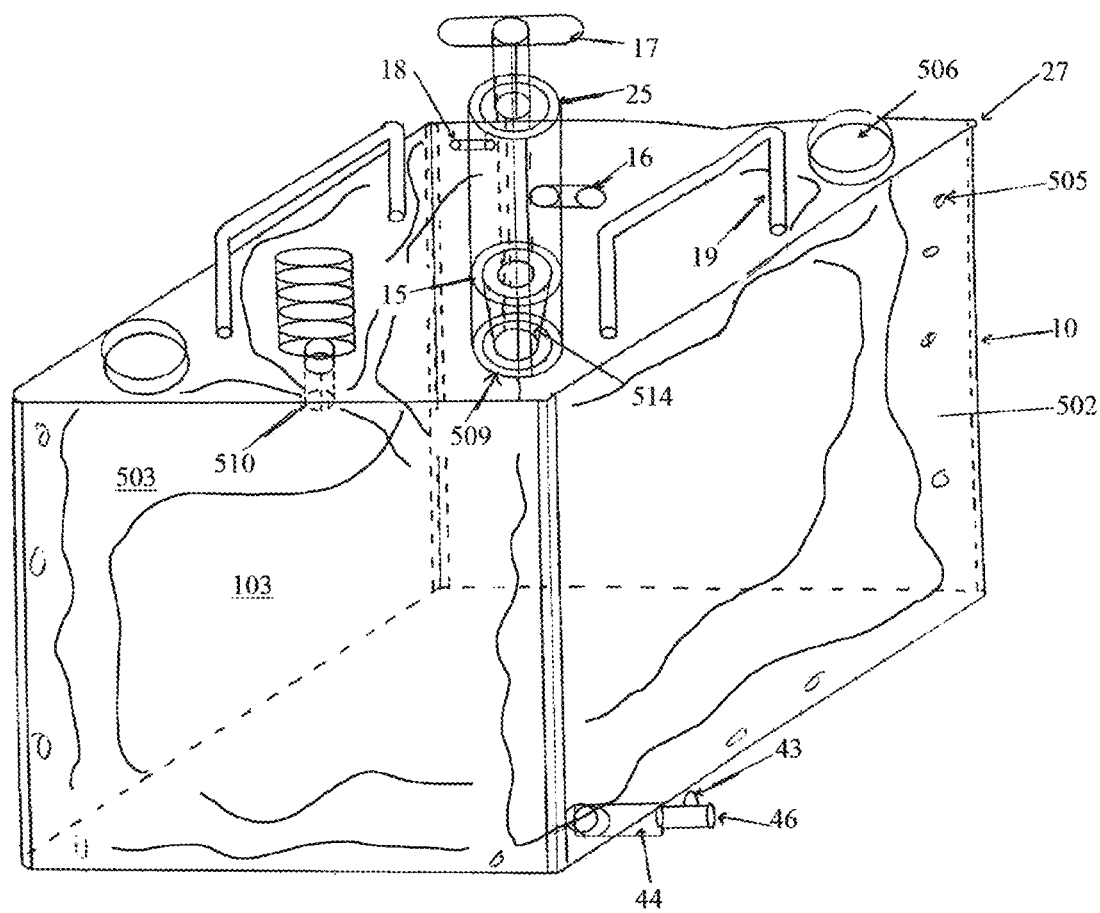
FIG. 36 illustrates a detailed top perspective view of the container or keg shown in FIGS. 35A-35B, according to an aspect.

FIG. 36 illustrates a detailed top perspective view of the container or keg 10 shown in FIGS. 35A-35B, according to an aspect. As shown in FIG. 36, pieces of ice 505 may be disposed inside the ice chamber 502, surrounding all portions of the air and beverage bags 503, 103, as an example.

As shown, the container or keg 10 may be provided with rounded corners 27. As described previously above, the ice 505 functions to chill the contents of the beverage bag 503, and the ice may be densely packed within the ice chamber to maintain the cooling of the beverage bag contents. Traditional kegs need to be chilled from the outside, such as, by being placed in a bucket full of ice. Once the ice has melted, the water is typically poured out and wasted. Thus, an advantage is that the container is chilled internally, and the resulting melted ice is filtered and may be consumed as drinking water.

Figure 37:
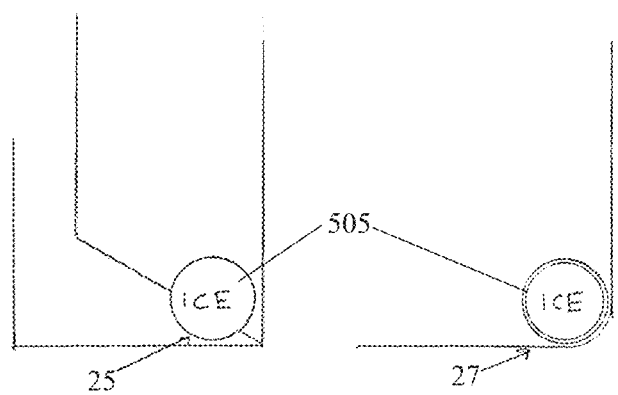
FIG. 37 illustrates front views of a rounded corner of the container shown in FIG. 36 in comparison with a traditional sharp corner of another exemplary container, according to an aspect.

FIG. 37 illustrates front views of a rounded corner 27 of the container 10 shown in FIG. 36 in comparison with a traditional sharp corner 25 of another exemplary container, according to an aspect. As shown, a piece of ice 505 sits in each corner 25, 27. As demonstrated by the comparison, the piece of ice 505 fits more snuggly and fully into the rounded corner 27 of the container. The rounded corner may allow more ice to be packed into the ice chamber of the container, which translates into a greater area of cooling of the air bag, and therefore of the beverage bag. The sharp corner 25 results in the loss of coverable space, meaning less ice 505 can be packed into the ice chamber. Thus, an advantage is that ice may be space-effectively packed inside the container, allowing the beverage to be more fully chilled and for longer periods of time.

Figure 38:
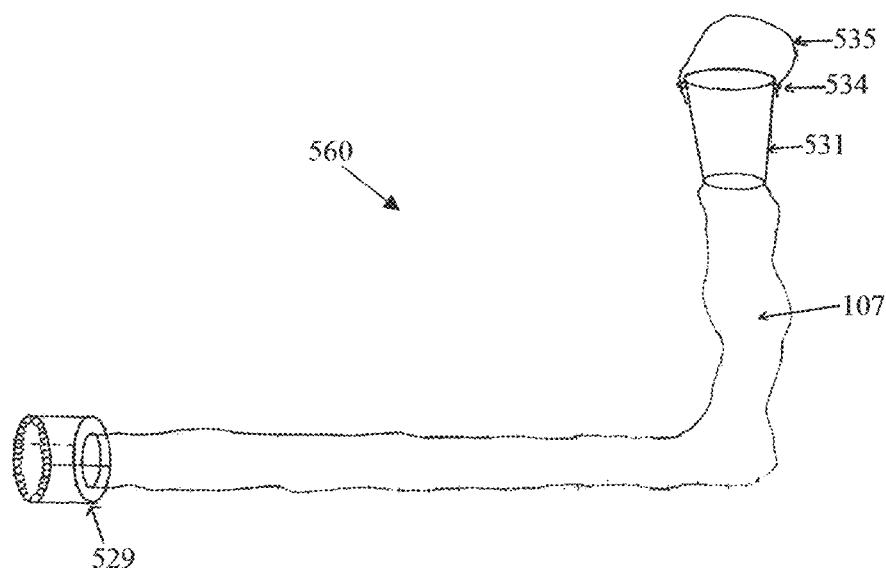
FIG. 38 illustrates an attachable filling assembly having a threaded coupling, a flexible hose and a friction coupling, according to an aspect.

FIG. 38 illustrates an attachable filling assembly ("filling assembly," "filler assembly") 560 having a threaded coupling 529, a flexible hose 107 and a friction coupling 531, according to an aspect. As described above when referring to FIGS. 35A-35B, the container or keg 10 may be adapted to dispense beverage or soft food or may be adapted to be filled with beverage or soft food. As will be discussed in further detail below, the attachable filler assembly 560 enables the keg to be filled with a beverage, as an example.

As shown in FIG. 38, the threaded coupling 529 may be attached one end of the flexible hose 107. The flexible hose 107 may be transparent to allow the user to visually determine when the beverage bag within the container is full (e.g., when the beverage stops flowing in the hose). The other end of the flexible hose 107 may be connected to the friction coupling 531, as shown as an example. As an example, the friction coupling 531 may be flexible to allow the coupling 531 to attach to a beverage tap system, such as a beer tap. The V-shape of the friction coupling 531 may allow the coupling 531 to form a tight, hermetic seal with the external beverage tap system. The tight seal may prevent ambient air or contaminants from entering the container or keg while the container or keg is being filled with a beverage, as an example. As shown, the friction coupling 531 may be provided with a pair of support strap clips 534, one on each side of the coupling 531. The support strap clips 534 may attach to each end of a support strap 535, as shown in FIG. 38. The support strap 535 may offer additional support for the friction coupling 531, providing the coupling 531 with an even tighter fit around a tap of a beverage tap system, as an example.

Thus, an advantage of the attachable filler assembly 560 is that the quick connect and disconnect filling components allow a user to easily and efficiently connect the assembly to a beverage tap system to fill the container or keg.

Figure 39:
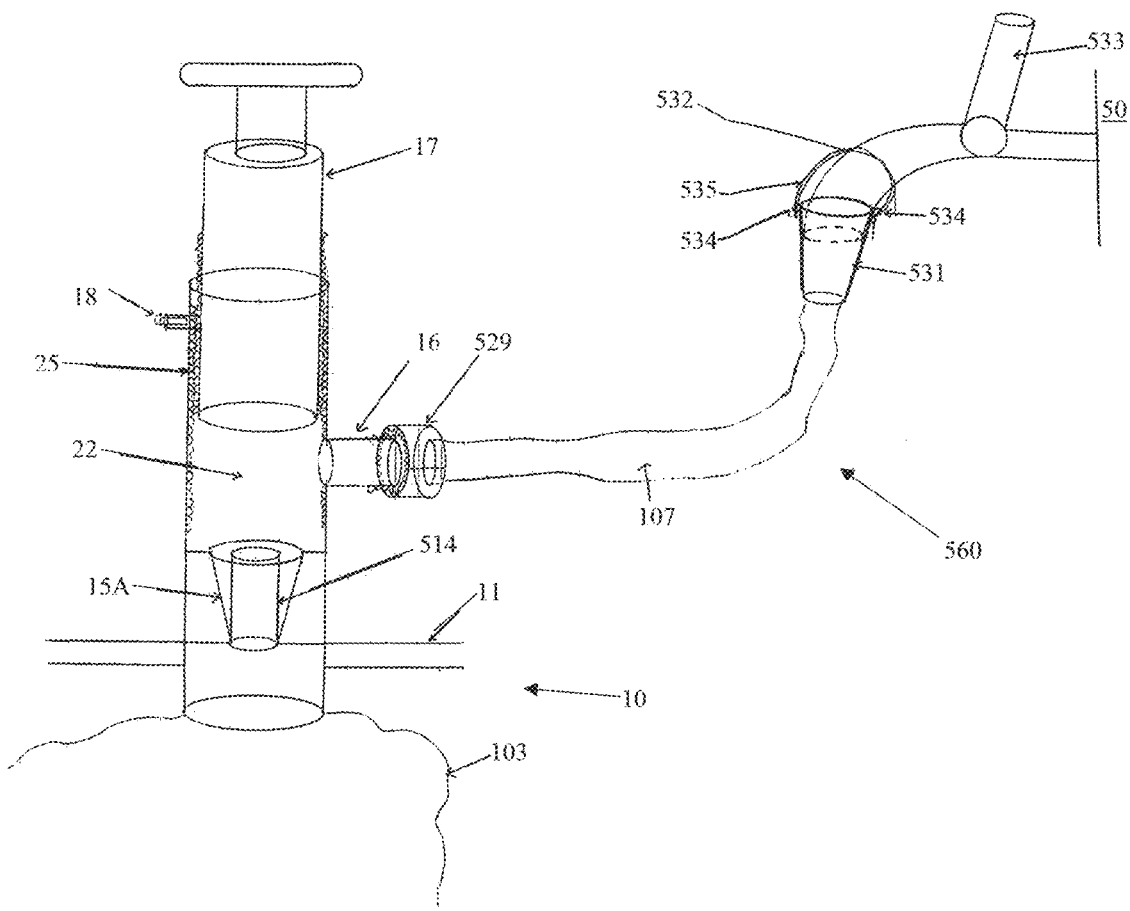
FIG. 39 illustrates the attachable filling assembly shown in FIG. 38, in an operational state attached to the container of FIG. 36, according to an aspect.

FIG. 39 illustrates the attachable filling assembly 560 shown in FIG. 38, in an operational state attached to the container 10 of FIG. 36, according to an aspect. As described previously above when referring to FIG. 38, the attachable filler assembly 560 may be connected to a beverage tap system to fill the container 10. As an example, the attachable filler assembly allows a user to fill the container from a beer tap at a craft beer brewer or a restaurant or bar, rather than having to fill the container at a beer brewer factory, as done currently. As shown as an example in FIG. 39, the attachable filling assembly 560 is connected to a nozzle 532 of a beer tap 50. As an example, a user may desire to fill the container 10 with beer for an outdoor birthday party. As discussed, the filling assembly 560 may be used to fill the container 10 with beer. As shown, the threaded coupling 529 may be fastened to a mouth of the beverage flow portal 16 of the gate valve shaft 25. The friction coupling 531 may be secured onto the beer tap nozzle 532, as shown, with the support strap 535 fitted over the nozzle 532 to provide additional support. The beer tap handle 533 may be operated such that beer may flow from the tap 50, through the flexible filling hose 107, into the beverage flow portal 16, as an example.

As the beer flows into the beverage flow portal 16 and through the beverage flow tube 22, the beer will pass through the beverage filter 514 in the beverage filter housing 15A, as shown. As described previously above, as the beer passes through the filter 514, microplastics and potential contaminants may be captured and kept within the filter housing 15A. Finally, after passing through the filter 514, the beer may enter into the beverage bag 103, as shown, and may fill the bag 103 to capacity. Because the flexible filling hose 107 is transparent, the user can see the beer flowing into the container 10, as mentioned above. Once the beverage bag 103 is completely filled with beer, the beer will naturally cease to flow into the beverage flow portal 16, causing the beer to be stagnant in the hose 107. Once the user observes the cease flow of the beer in the hose 107, the user can switch off the beer tap handle 33, remove the support strap 535 and the friction coupling 531 from the beer tap nozzle 532, and disconnect the threaded coupling 529 from the beverage flow portal 16. The gate valve stopper 18 may be released and the vertical gate valve 17 may be pushed downward within the shaft 25 to close the beverage flow portal 16. The container 10 is now ready for transportation and use at the birthday party, per the example.

Thus, an advantage is that the container may be filled with beverage or food without the need to remove the lid from the container, preventing ambient air or contaminants from entering the container.

Figure 40:
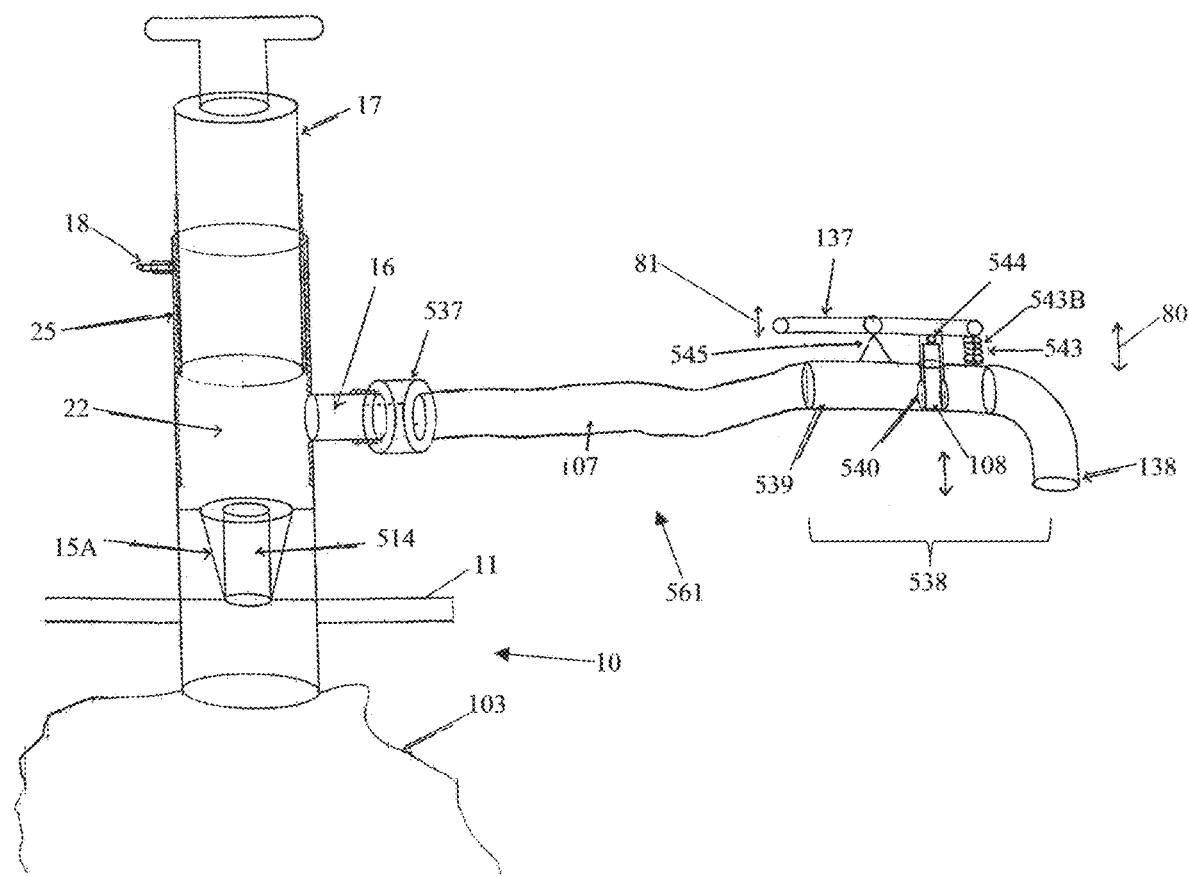
FIG. 40 illustrates an attachable dispensing assembly attached to the container or keg of FIG. 36, according to an aspect.

FIG. 40 illustrates an attachable dispensing assembly ("dispensing assembly," "dispenser assembly") 561 attached to the container or keg 10 of FIG. 36, according to an aspect. As mentioned previously in this disclosure, the container or keg 10 may also be configured to dispense beverage or food into an external cup, bottle, or other container, as an example. The container 10 may be provided with the attachable dispensing assembly 561 to dispense beverage or food out of the beverage bag 103, as shown as an example.

As shown in FIG. 40, the attachable dispenser assembly 561 may comprise a threaded coupling 537, a flexible dispensing hose 107, and a pour spout assembly 538. As shown, the threaded coupling 537 may be adapted to connect to the mouth of the beverage flow portal 16 of the container 10, such that the coupling 537 and the portal 16 form a tight seal via the threads, as an example. The flexible hose 107 may extend between the threaded coupling 537 and the pour spout assembly 538, as shown. As will be discussed below, beverage or food flowing out of the beverage flow portal 16 may pass through the hose 107 and out of the pour spout assembly 538.

As an example, the pour spout assembly 538 may be provided with a barrel tube 539, a flow through portal 540, a beverage flow gate valve 108, a nozzle 138, a spring rubber band 543 in a flexible tube 543B, a swivel connector ("swivel connector," "swivel ball," "swivel ball connector") 544, an actuator arm swivel 545 and an actuator arm 137, as shown. As will become apparent later in this disclosure, the pour spout assembly 538 functions to dispense beverage or soft food flowing through the flexible hose 107. As shown, the flexible hose 107 may connect to the pour spout assembly 538 at a first end of the barrel tube 539, as an example. The nozzle 108 may be connected to a second end of the barrel tube 539, as shown as an example. The flow through portal 540 may be provided within the barrel tube 539, such that liquid or food passing through the barrel tube 539 must pass through the portal 540, as an example. As shown, the flow through portal 540 may also be provided with the associated gate valve 108, wherein the gate valve 108 must be lifted to allow beverage to pass through the portal 540.

The top of the gate valve 108 may be attached to the swivel connector 544, as shown. The swivel connector 544 may also attach to a part of the actuator arm 137, as an example, such that when the actuator arm is raised or lowered (indicated by 81), the swivel connector 544 causes the gate valve 108 to also be raised or lowered (indicated by 80). As shown, the actuator arm 137 may rest on the actuator arm swivel 545, which is attached to the top surface of the barrel tube 539, as an example. The actuator arm 137 is adapted to rise and lower via the actuator arm swivel 545, as shown by the arrow 81. The actuator arm 137 may lastly be attached to the spring rubber band 543 within the flexible tube 543B, as shown as an example. As shown in FIG. 40, the spring rubber band 543 within the flexible tube 543B may be attached to the top surface of the second end of the barrel tube 539 and may extend upward and attach to an end of the actuator arm 137, as an example.

The spring rubber band 543 may be biodegradable and made from an eco-friendly material and is encapsulated within the flexible tube 543B, which is able to expand and contrast synchronously with the rubber band 543. The spring rubber band 543 allows the actuator arm 137 to be controllably depressed to open the gate valve 108. The use of the spring rubber band 543 made from biodegradable material eliminates the need for a metal spring, which is not biodegradable and may be toxic to the environment. Thus, an advantage is that manufacturing the spring rubber band, as well as the rest of the materials making up the attachable dispenser assembly, may allow for a recyclable and biodegradable end of life use, which is non-toxic to the environment. Another advantage is that beverage or soft food may be efficiently dispensed from the container in a manageable amount and in a controlled manner. Another advantage is that the free-flowing contents may be dispensed without exposing the beverage or soft food to air.

As mentioned above, beverage or soft food prefilled in the beverage bag 103 may be dispensed into an external cup, bottle, or smaller container via the attachable dispensing assembly 561. As an example, when a user desires to dispense the beverage, the user may slide the gate valve 17 upwardly to open the beverage flow portal 16, which is attached to the threaded coupling 537. The user may then apply force to contract and expand the air pump bellows (shown by 13 in FIG. 35A) to fill the air bag (503) and expand the air chamber (503A). When the air chamber (503A) expands, pressure will be applied onto the beverage bag 103, causing the beverage to flow up into the beverage flow tube 22, as shown. As the beverage flows, it will be forced into the beverage filter housing 15A, and flow through the beverage filter 514, as shown as an example. As the beverage passes through the filter 514, any microplastics and other potentially harmful contaminants may become trapped by the filter 514, resulting in a cleaner beverage. The filtered beverage may then be directed through the beverage flow portal 16 and into the flexible hose 107. As previously discussed, the flexible hose 107 may be made of a transparent material to allow the user to see the beverage or food passing through it. Once the beverage fills the entire length of the hose 107, the beverage is ready to be released out of the pour spout assembly 538, which will be described in detail below.

Figure 41:
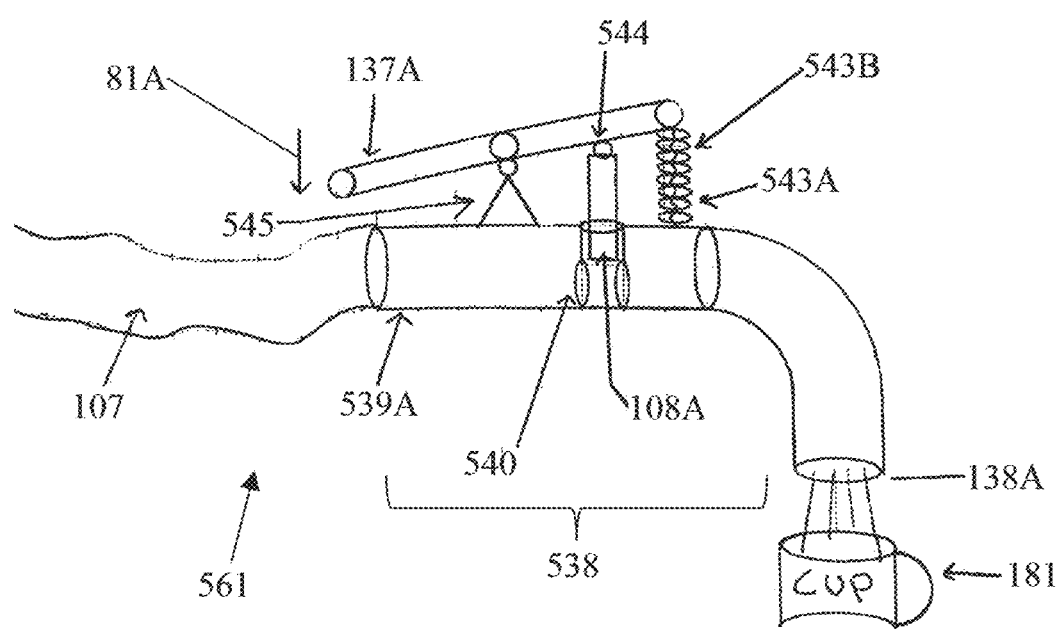
FIG. 41 illustrates the pour spout assembly of the attachable dispensing assembly shown in FIG. 40, in an open state, according to an aspect.

FIG. 41 illustrates the pour spout assembly 538 of the attachable dispensing assembly 561 shown in FIG. 40, in an open state, according to an aspect. As described previously when referring to FIG. 40, the attachable dispensing assembly 561 enables the contents of the container or keg to be dispensed into an external cup, bottle, etc. As previously shown in FIG. 40, the actuator arm 137 may be provided in a neutral initial position, such that the gate valve 108 is closed, blocking beverage in the hose 107 from passing through the flow through portal 540. As shown in FIG. 41, the actuator arm 137 may be depressed to allow beverage or soft food to dispense out of the pour spout assembly 538.

As an example, a user may grip the actuator arm and may apply downward force to depress the actuator arm 137A, as shown. The application of the downward force will cause the actuator arm 137A to tilt upward, as shown, about the swivel 545. As the actuator arm 137A is raised, the spring rubber band 543A, and the flexible tube 543B surrounding it, will expand, allowing the user to controllably open the gate valve. With the actuator arm 137A in the upward sloping position, the swivel connector 544 attached to the top of the gate valve will be raised, causing the gate valve 108A to rise as well, as shown. With the gate valve raised, as shown by 108A, the flow through portal 540 is opened, allowing beverage or soft food to flow from the flexible hose 107 out of the nozzle 138A, and into a cup or bottle 181, as an example. Once the cup 181 has been filled with the desired amount of beverage, the user may release the actuator arm 137A, and the expanded spring rubber band 543A will contrast to naturally bring the actuator arm to its neutral starting position. As the actuator arm returns to its neutral position, the swivel connector 544 will push downward on the top of the gate valve 108A, causing the gate valve to move downward and close the flow through portal 540. When the flow through portal 540 is completely closed, no more beverage or soft food is allowed to dispense out of the pour spout nozzle 138A.

Thus, an advantage is that beverage and/or food within the container may be easily and controllably dispensed into any sized bottle or container. Another advantage is that the pour spout assembly is designed to automatically stop the dispensing of beverage or food when the user releases downward pressure on the actuator arm, preventing unnecessary waste of the beverage or food.

Figure 42:
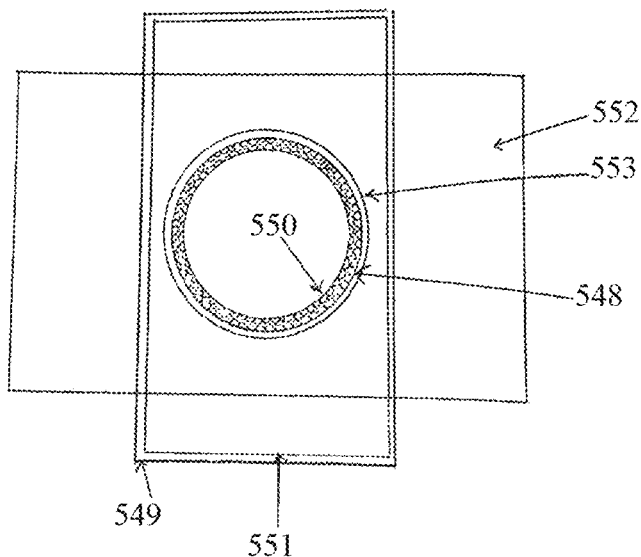
FIG. 42 illustrates a top sectional view of a portion of a bioplastic film sandwiched between a female and a male connector couplings, according to an aspect.

FIG. 42 illustrates a top sectional view of a portion of a bioplastic film 552 sandwiched between a female 548 and a male 550 connector couplings, according to an aspect. As shown in FIG. 42, the bioplastic film 552 may be provided with a center portal 553, as an example. As shown, the female connector coupling 548 and the male connector coupling 550 may interlock to seal the bioplastic film 552 between the two connector couplings 548, 550. As an example, the female 548 and the male 550 connector couplings may both be threaded, as shown, such that the male connector coupling 550 may be screwed or twisted into the female connector coupling 548.

As shown in FIG. 42, each connector coupling 548, 550 may be provided with a compression flange 549, 551. As an example, the female coupling 548 may be provided with a first compression flange 549, attached to the bottom of the coupling 548. Similarly, as shown, the male coupling 550 may be provided with a second compression flange 551, attached to the bottom of the coupling 550.

Figure 43:
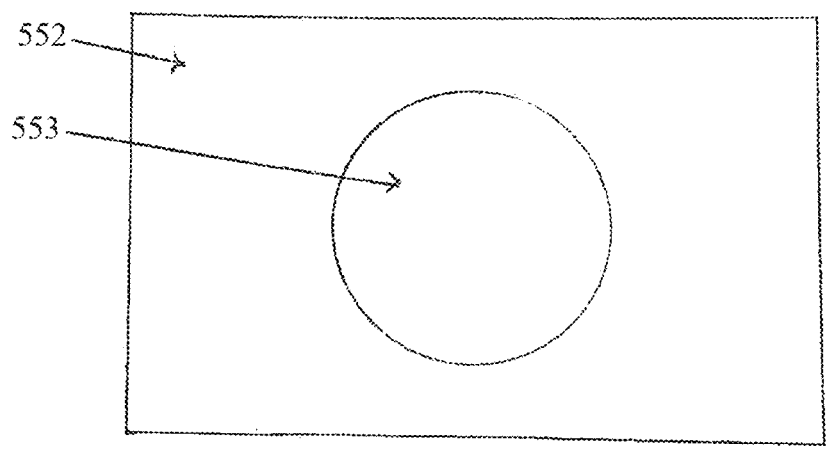
FIG. 43 illustrates a top view of the portion of the bioplastic film shown in FIG. 42, according to an aspect.

FIG. 43 illustrates a top view of the portion of the bioplastic film 552 shown in FIG. 42, according to an aspect. The bioplastic film 552 may comprise the central portal 553, as an example, to allow beverage, soft food or air to pass through it. The bioplastic film or sheet 552 may form the top portion of a beverage, food or air bag (such as 103, 503 shown in FIG. 35A) within the container or keg.

Figure 44:
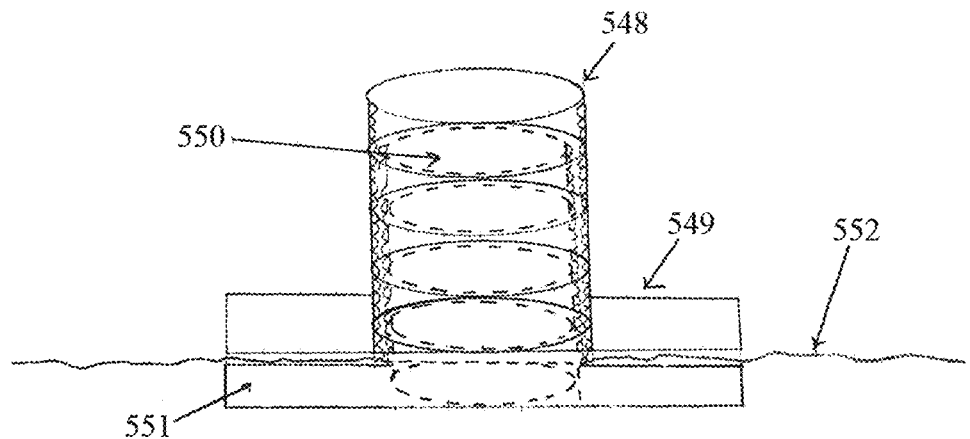
FIG. 44 illustrates a side sectional view of the female and the male connector couplings shown in FIG. 42, in a coupled state, according to an aspect.

FIG. 44 illustrates a side sectional view of the female 548 and the male 550 connector couplings shown in FIG. 42, in a coupled state, according to an aspect. As described previously when referring to FIG. 42, the threaded female 548 and the threaded male 550 connector couplings may be used to sandwich bioplastic film 552 having a center portal (not shown). As shown, the second compression flange 551 attached to the male connector coupling 550 may be placed underneath a bottom surface of the bioplastic film 552, such that the male connector coupling 550 is inserted into the center portal of the bioplastic 552. As such, when the male connector coupling 550 is fully inserted and fitted within the female connector coupling 548, the bioplastic film 552 may be sandwiched and sealed between the second 551 and the first 549 compression flanges, as shown.

The coupled female and male connector assembly shown in FIG. 44 may be particularly useful when filling a beverage or air bag or sack made of eco-friendly, plant-based bioplastic. As is known in the art, plant-based bioplastic may be manufactured from a plant-based polymer resin. Plant-based polymer resin can be difficult to bond a seal to when attempting to use traditional techniques like sonic wave welding or heat seal welding, as an example. Therefore, it may be advantageous to utilize the female 548 and the male 550 connector couplings to form an air-tight seal in the bioplastic 552 to allow the filling of the bioplastic with air or beverage. Thus, an advantage is that the female and the male connector couplings may be used to seal and connect a beverage bag made of any material to the container or keg.

As an example, the coupled female and male connector assembly sealed to a bioplastic beverage bag (shown by 103 in FIG. 35A) may form the beverage portal connector (509) in the container or keg (10). Similarly, the coupled female and male connector assembly sealed to a bioplastic air bag (503) may form the air bag portal connector (510), as an example. It should be understood that the female and male connector assembly may enable a beverage bag to also be attached to the pour spout assembly of the attachable dispenser assembly (see FIG. 41).

Figure 45A:
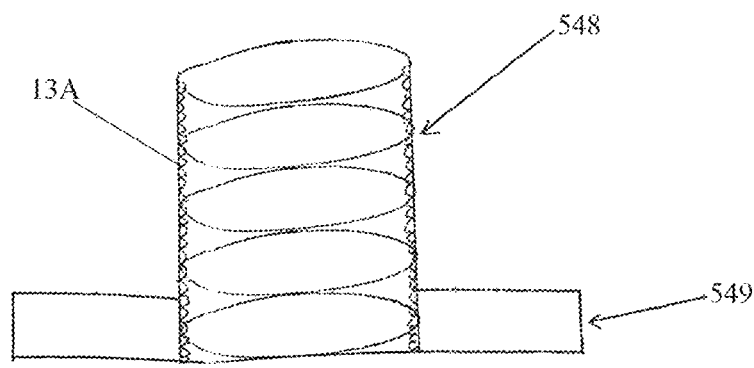
FIGS. 45A-45B illustrate side sectional views of the female and the male connector couplings, respectively, shown in FIG. 42, in an uncoupled state, according to an aspect.
Figure 45B:
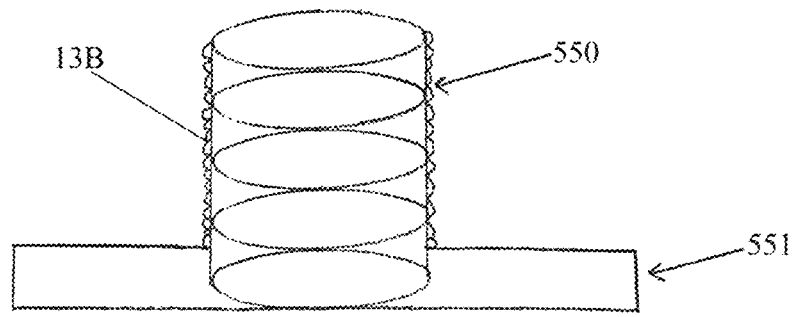

FIGS. 45A-45B illustrate side sectional views of the female 548 and the male 550 connector couplings, respectively, shown in FIG. 42, in an uncoupled state, according to an aspect. As described previously above, the female 548 and the male 550 connector couplings may be threaded to allow the two compression flanges 549, 551 to form an airtight and beverage-tight seal. As an example, the female connector coupling 548 may be provided with internal threads 13A, as shown in FIG. 45A. The male connector coupling 550 may be provided with outer threads 13B, as shown in FIG. 45B, such that when the male connector coupling 550 is inserted into the female connector coupling 548 and twisted, the two couplings 548, 550 may form a tight seal between the first 549 and the second 551 compression flanges.

Although the male and the connector couplings are depicted as having threads, it should be understood that the two couplings may be designed to have any suitable coupling means, such as friction coupling, a snap on configuration, etc., for example. It should also be understood that the male and the female connector couplings could be designed to be conical, rectangular, or some other suitable shape, rather than cylindrical, as depicted. Additionally, although the compression flanges are depicted as being rectangular, it should be understood that circular compression flanges could be used as well.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A system for filling a beverage bag with free-flowing contents from an external device, the system comprising a container and an attachable filler assembly removably associated with the container, the beverage bag being disposed within the container, the container comprising:
   a top and a bottom;
   a plurality of vertical walls extending between the bottom and the top;
   at least one ice portal disposed in the top, the at least one ice portal having a removable cap for filling an ice chamber within the container with ice;
   a removable container cap, the removable container cap forming a central part of the top;
   a tube vertically disposed in the container cap, the tube extending between the beverage bag and a gate valve shaft above the container cap;
   an air hose disposed in the container cap parallel with the tube;
   an air bag attached to a bottom end of the air hose within the container, the air bag being adjacent to an outer surface of the beverage bag, such that a volume between the air bag, the beverage bag and an interior of the plurality of vertical walls forms the ice chamber; and
   a beverage flow portal protruding longitudinally from a first side of the gate valve shaft;
   the attachable filler assembly being adapted to attach to a mouth of the beverage flow portal, such that the beverage bag is filled with the free-flowing contents from the external device through the mouth.

2. The system of claim 1, wherein the container further comprises a filter housing disposed within the tube, the filter housing having a filter and a removable cap encapsulating the filter within the filter housing, such that the free flowing contents filling the beverage bag can pass through the filter.

3. The system of claim 1, wherein the beverage bag is attached to the tube and wherein the air bag is attached to the bottom end of the air hose each attachment being via a female connector coupling and a male connector coupling pair, the male connector coupling fitting into the female connector coupling, such that the beverage bag and the air bag are each sandwiched between the male and the female connector couplings.

4. The system of claim 1, wherein the container further comprises an air pump bellows connected to a top end of the air hose, such that compression of the air pump bellows pumps air into the air bag.

5. The system of claim 1, wherein the container further comprises:
   a gate valve slidably disposed within the gate valve shaft, the gate valve sliding upwardly for opening of the beverage flow portal; and
   a gate valve stopper inserted through a second side of the gate valve shaft and into the gate valve for preventing a complete removal of the gate valve from the gate valve shaft, such that air is prevented from entering the beverage bag.

6. The system of claim 1, wherein the container further comprises an ice chamber portal disposed through one of the plurality of vertical walls, the ice chamber portal extending between the ice chamber and a pour spout on an exterior surface of the one of the plurality of vertical walls, the pour spout having a water filter, a nozzle and a pushbutton adapted to cause a releasing of any melted ice out of the ice chamber through the pour spout.

7. The system of claim 1, wherein the attachable filler assembly comprises:
   a threaded coupling removably attachable to the mouth of the beverage flow portal; and
   a flexible hose extending between the threaded coupling and a friction coupling, the friction coupling being configured to form an airtight connection with a male coupling of the external device.

8. The system of claim 7, wherein the friction coupling further comprises a pair of support clips, wherein a support strap extends between the pair of support clips, such that the support strap can fit around the male coupling.

9. A system for dispensing free-flowing contents out of a beverage bag, the system comprising a container and an attachable dispenser assembly removably associated with the container, the beverage bag being disposed within the container, the container comprising:
   a top and a bottom;
   a plurality of vertical walls extending between the bottom and the top;
   at least one ice portal disposed in the top, the at least one ice portal having a removable cap for filling an ice chamber within the container with ice;
   a removable container cap, the removable container cap forming a central part of the top;
   a tube vertically disposed in the container cap, the tube extending between the beverage bag and a gate valve shaft above the container cap;
   an air hose disposed in the container cap parallel with the tube;
   an air bag attached to a bottom end of the air hose within the container, the air bag being adjacent to an outer surface of the beverage bag, such that a volume between the air bag, the beverage bag and an interior of the plurality of vertical walls forms the ice chamber; and
   a beverage flow portal protruding longitudinally from a first side of the gate valve shaft;
the attachable dispenser assembly being adapted to attach to a mouth of the beverage flow portal, such that the free-flowing contents are dispensed out of the beverage bag through the mouth, and the attachable dispenser assembly comprising a pour spout assembly adapted to release the free-flowing contents.

10. The system of claim 9, wherein the container further comprises a filter housing disposed within the tube, the filter housing having a filter and a removable cap encapsulating the filter within the filter housing, such that the free flowing contents dispensed out of the beverage bag can pass through the filter.

11. The system of claim 9, wherein the beverage bag is attached to the tube and wherein the air bag is attached to the bottom end of the air hose each attachment being via a female connector coupling and a male connector coupling pair, the male connector coupling fitting into the female connector coupling, such that the beverage bag and the air bag are each sandwiched between the male and the female connector couplings.

12. The system of claim 9, wherein the container further comprises an air pump bellows connected to a top end of the air hose, such that compression of the air pump bellows pumps air into the air bag, the air within the air bag applying pressure onto the beverage bag to cause the dispensing of the free-flowing contents.

13. The system of claim 9, wherein the container further comprises:
   a gate valve slidably disposed within the gate valve shaft, the gate valve sliding upwardly to open the beverage flow portal; and
   a gate valve stopper inserted through a second side of the gate valve shaft and into the gate valve for preventing a complete removal of the gate valve from the gate valve shaft, such that air is prevented from entering the beverage bag.

14. The system of claim 9, wherein the container further comprises an ice chamber portal disposed through one of the plurality of vertical walls, the ice chamber portal extending between the ice chamber and a pour spout on an exterior surface of the one of the plurality of vertical walls, the pour spout having a water filter, a nozzle and a pushbutton adapted to cause a releasing of any melted ice out of the ice chamber through the pour spout.

15. The system of claim 9, wherein the attachable dispenser assembly further comprises a threaded coupling removably attachable to the mouth of the beverage flow portal and a flexible hose extending between the threaded coupling and the pour spout assembly.

16. The system of claim 14, wherein the pour spout assembly comprises:
   a barrel tube having a first end and an opposite second end, the first end being attached to a flexible hose;
   a nozzle attached to the second end of the barrel tube;
   a gate valve disposed vertically through a top of the barrel tube, the gate valve having a top end and a bottom end;
   a swivel attached on the top of the barrel tube near the first end;
   an actuator arm positioned on the swivel at a center of the actuator arm, the actuator arm also being attached to the top end of the gate valve via a swivel ball, such that engagement of the actuator arm raises the gate valve and releases the free-flowing contents out of the nozzle; and
   a spring band extending vertically between the top of the barrel tube near the second end and a distal end of the actuator arm.

17. A container configured to house free-flowing contents in a beverage bag, the beverage bag being disposed within the container, the container comprising:

a top and a bottom;

a plurality of vertical walls extending between the bottom and the top;

at least one ice portal disposed in the top, the at least one ice portal having a removable cap for filling an ice chamber within the container with ice;

a removable container cap, the removable container cap forming a central part of the top;

a tube vertically disposed in the container cap, the tube extending between the beverage bag and a gate valve shaft above the container cap;

an air hose disposed in the container cap parallel with the tube;

an air bag attached to a bottom end of the air hose within the container, the air bag being adjacent to an outer surface of the beverage bag, such that a volume between the air bag, the beverage bag and an interior of the plurality of vertical walls forms the ice chamber; and a beverage flow portal protruding longitudinally from a first side of the gate valve shaft.

18. The container of claim 17, further comprising a filter housing disposed within the tube, the filter housing having a filter and a removable cap encapsulating the filter within the filter housing, such that the free-flowing contents flowing through the tube can pass through the filter.

19. The container of claim 17, further comprising:

a gate valve slidably disposed within the gate valve shaft, the gate valve sliding upwardly for opening of the beverage flow portal; and a gate valve stopper inserted through a second side of the gate valve shaft and into the gate valve for preventing a complete removal of the gate valve from the gate valve shaft, such that air is prevented from entering the beverage bag.

20. The container of claim 17, further comprising an ice chamber portal disposed through one of the plurality of vertical walls, the ice chamber portal extending between the ice chamber and a pour spout on an exterior surface of the one of the plurality of vertical walls, the pour spout having a water filter, a nozzle and a pushbutton adapted to cause a releasing of any melted ice out of the ice chamber through the pour spout.

21. The container of claim 17, wherein each vertical wall of the plurality of vertical walls is flat, such that an outside of the container has a rectangular shape, such that each vertical wall can contain an advertisement.

22. The container of claim 21, wherein corners of an inside of the container are round shaped to accommodate the filling of the ice chamber with a maximum amount of the ice.

* * * * *